(12) United States Patent
Zhang et al.

(10) Patent No.: US 11,757,519 B2
(45) Date of Patent: Sep. 12, 2023

(54) BEAM FAILURE HANDLING

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 17/357,471

(22) Filed: Jun. 24, 2021

(65) Prior Publication Data

US 2021/0409097 A1 Dec. 30, 2021

Related U.S. Application Data

(60) Provisional application No. 63/044,996, filed on Jun. 26, 2020, provisional application No. 63/044,992, (Continued)

(51) Int. Cl.
*H04B 7/08* (2006.01)
*H04W 76/19* (2018.01)
(Continued)

(52) U.S. Cl.
CPC .......... *H04B 7/088* (2013.01); *H04B 17/336* (2015.01); *H04L 5/1423* (2013.01); *H04W 24/10* (2013.01);
(Continued)

(58) Field of Classification Search
CPC ........ H04B 7/088; H04B 7/10; H04B 7/0695; H04B 17/336; H04B 17/103;
(Continued)

(56) References Cited

U.S. PATENT DOCUMENTS 11,140,695 B1 * 10/2021 Eyuboglu ......... H04W 72/1257
2016/0226653 A1 * 8/2016 Bharadia ................ H04B 1/525
(Continued)

FOREIGN PATENT DOCUMENTS

WO 2019032503 A1 2/2019
WO WO-2019032882 A1 * 2/2019 ........... H04B 7/0695

OTHER PUBLICATIONS

International Search Report and Written Opinion—PCT/US2021/039179—ISA/EPO—dated Dec. 7, 2021.
Partial International Search Report—PCT/US2021/039179—ISA/EPO—dated Oct. 7, 2021.

*Primary Examiner* — Redentor Pasia
(74) *Attorney, Agent, or Firm* — Loza & Loza, LLP

(57) ABSTRACT

Aspects relate to reporting beam failure. Upon detecting a beam failure, a user equipment (UE) may transmit a beam failure recovery request to a base station. If the uplink is working, the UE may transmit the beam failure recovery request via uplink signaling (e.g., via a physical uplink control channel or a physical uplink shared channel). If the uplink is not working or if the beam failure is due to downlink quality degradation, the UE may transmit the beam failure recovery request via a random access channel (RACH) message.

19 Claims, 28 Drawing Sheets

Related U.S. Application Data filed on Jun. 26, 2020, provisional application No. 63/044,986, filed on Jun. 26, 2020.

(51) Int. Cl.
    *H04B 17/336*    (2015.01)
    *H04W 74/08*     (2009.01)
    *H04W 24/10*     (2009.01)
    *H04L 5/14*      (2006.01)

(52) U.S. Cl.
    CPC ....... *H04W 74/0841* (2013.01); *H04W 76/19* (2018.02)

(58) Field of Classification Search
    CPC ................ H04B 17/345; H04W 24/10; H04W 74/0841; H04W 74/0833; H04W 76/19; H04L 5/0014; H04L 5/0048
    See application file for complete search history.

(56) References Cited

U.S. PATENT DOCUMENTS

| | | | |
|---|---|---|---|
| 2017/0208494 A1* | 7/2017 | Moon | H04L 5/0048 |
| 2018/0115940 A1* | 4/2018 | Abedini | H04L 5/0094 |
| 2018/0235013 A1* | 8/2018 | Jung | H04W 74/006 |
| 2019/0081753 A1* | 3/2019 | Jung | H04B 7/063 |
| 2019/0110281 A1* | 4/2019 | Zhou | H04W 76/19 |
| 2019/0200248 A1* | 6/2019 | Basu Mallick | H04B 7/088 |
| 2019/0261244 A1* | 8/2019 | Jung | H04W 36/06 |
| 2019/0306765 A1* | 10/2019 | Cirik | H04W 36/0069 |
| 2019/0335511 A1* | 10/2019 | Liu | H04W 52/48 |
| 2020/0052775 A1 | 2/2020 | Nam et al. | |
| 2020/0154326 A1 | 5/2020 | Deenoo et al. | |
| 2020/0404559 A1* | 12/2020 | Koskela | H04W 72/23 |
| 2021/0167920 A1* | 6/2021 | Cha | H04L 5/0048 |
| 2021/0258059 A1* | 8/2021 | Onggosanusi | H04L 5/0073 |
| 2021/0320710 A1* | 10/2021 | Koskela | H04B 17/309 |
| 2021/0329515 A1* | 10/2021 | Sharma | H04W 36/08 |
| 2022/0311498 A1* | 9/2022 | Loehr | H04W 72/1263 |

\* cited by examiner

BEAM FAILURE HANDLING

CROSS-REFERENCE TO RELATED APPLICATIONS

The present application for patent claims priority to and the benefit of U.S. Provisional Application No. 63/044,986, titled "BEAM FAILURE REPORTING" filed Jun. 26, 2020, U.S. Provisional Application No. 63/044,992, titled "MODIFICATION OF FULL DUPLEX TRANSMISSION DURING BEAM FAILURE" filed Jun. 26, 2020, and U.S. Provisional Application No. 63/044,996, titled "BEAM FAILURE RECOVERY FOR FULL-DUPLEX WIRELESS TRANSMISSIONS" filed Jun. 26, 2020, each of which is assigned to the assignee hereof and hereby expressly incorporated by reference herein as if fully set forth below in its entirety and for all applicable purposes.

TECHNICAL FIELD

The technology discussed below relates generally to wireless communication networks and, more particularly, to beam failure detection and actions taken as a result of a detected beam failure in beam-based communication scenarios (e.g., millimeter wave communication scenarios).

INTRODUCTION

In wireless communication systems, such as those specified under standards for 5G New Radio (NR), a base station and user equipment (UE) may utilize beamforming to compensate for high path loss and short range. Beamforming is a signal processing technique used with an antenna array for directional signal transmission and/or reception. Each antenna in the antenna array transmits a signal that is combined with other signals of other antennas of the same array in such a way that signals at particular angles experience constructive interference while others experience destructive interference.

The base station and the UE can select at least one beam pair link (BPL) for communication between the base station and the UE on a downlink and/or an uplink. Each BPL includes corresponding transmit and receive beams on the base station and the UE. For example, on the downlink, a BPL includes a transmit beam on the base station and a receive beam on the UE. To increase the data rate, multiple BPLs can be used to facilitate spatial multiplexing of multiple data streams from the base station to the UE.

To reduce latency and enhance the spectrum efficiency in a cell, full-duplex (FD) communication may be used in 5G systems. In some examples, FD allows simultaneous two-way communication by using spatial multiplexing. In the case of FD using spatial multiplexing, different antenna arrays (e.g., different antenna panels) and beams are operable at the same time but still can achieve FD simultaneous communication through spatial separation (e.g., such as through beam direction). The downlink and uplink frequency bands in FD communication may be fully overlapped, partially overlapped or separated with a guard band in between.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method for full-duplex communication at a user equipment is disclosed. The method may include receiving an uplink transmission transmitted by the user equipment, and transmitting a beam failure indication to a base station via an uplink channel of an uplink beam when the user equipment is able to communicate with the base station via the uplink beam. In some aspects, the beam failure indication may identify a beam failure for the full-duplex communication. In some aspects, the beam failure may be due to interference from the uplink transmission.

In some examples, a user equipment for full-duplex communication may include a transceiver, a memory, and a processor coupled to the transceiver and the memory. The processor and the memory may be configured to receive via the transceiver an uplink transmission transmitted by the user equipment, and transmit via the transceiver a beam failure indication to a base station via an uplink channel of an uplink beam when the user equipment is able to communicate with the base station via the uplink beam. In some aspects, the beam failure indication may identify a beam failure for the full-duplex communication. In some aspects, the beam failure may be due to interference from the uplink transmission.

In some examples, a user equipment for full-duplex communication may include means for receiving an uplink transmission transmitted by the user equipment, and means for transmitting a beam failure indication to a base station via an uplink channel of an uplink beam when the user equipment is able to communicate with the base station via the uplink beam. In some aspects, the beam failure indication may identify a beam failure for the full-duplex communication. In some aspects, the beam failure may be due to interference from the uplink transmission.

In some examples, an article of manufacture for use by a user equipment for full-duplex communication includes a non-transitory computer-readable medium having stored therein instructions executable by one or more processors of the user equipment to receive an uplink transmission transmitted by the user equipment, and transmit a beam failure indication to a base station via an uplink channel of an uplink beam when the user equipment is able to communicate with the base station via the uplink beam. In some aspects, the beam failure indication may identify a beam failure for the full-duplex communication. In some aspects, the beam failure may be due to interference from the uplink transmission.

In some examples, a method for full-duplex communication at a user equipment is disclosed. The method may include receiving an uplink transmission transmitted by the user equipment, and transmitting a beam failure indication identifying a beam failure for the full-duplex communication to a base station via a random access channel (RACH) message when the user equipment is not able to communicate with the base station via an uplink beam or when the beam failure is due to downlink quality degradation. In some aspects, the beam failure may be due to interference from the uplink transmission.

In some examples, a user equipment for full-duplex communication may include a transceiver, a memory, and a processor coupled to the transceiver and the memory. The processor and the memory may be configured to receive via the transceiver an uplink transmission transmitted by the user equipment, and transmit via the transceiver a beam failure indication identifying a beam failure for the full-duplex communication to a base station via a random access channel (RACH) message when the user equipment is not able to communicate with the base station via an uplink beam or when the beam failure is due to downlink quality degradation. In some aspects, the beam failure may be due to interference from the uplink transmission.

In some examples, a user equipment for full-duplex communication may include means for receiving an uplink transmission transmitted by the user equipment, and means for transmitting a beam failure indication identifying a beam failure for the full-duplex communication to a base station via a random access channel (RACH) message when the user equipment is not able to communicate with the base station via an uplink beam or when the beam failure is due to downlink quality degradation. In some aspects, the beam failure may be due to interference from the uplink transmission.

In some examples, an article of manufacture for use by a user equipment for full-duplex communication includes a non-transitory computer-readable medium having stored therein instructions executable by one or more processors of the user equipment to receive an uplink transmission transmitted by the user equipment, and transmit a beam failure indication identifying a beam failure for the full-duplex communication to a base station via a random access channel (RACH) message when the user equipment is not able to communicate with the base station via an uplink beam or when the beam failure is due to downlink quality degradation. In some aspects, the beam failure may be due to interference from the uplink transmission.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
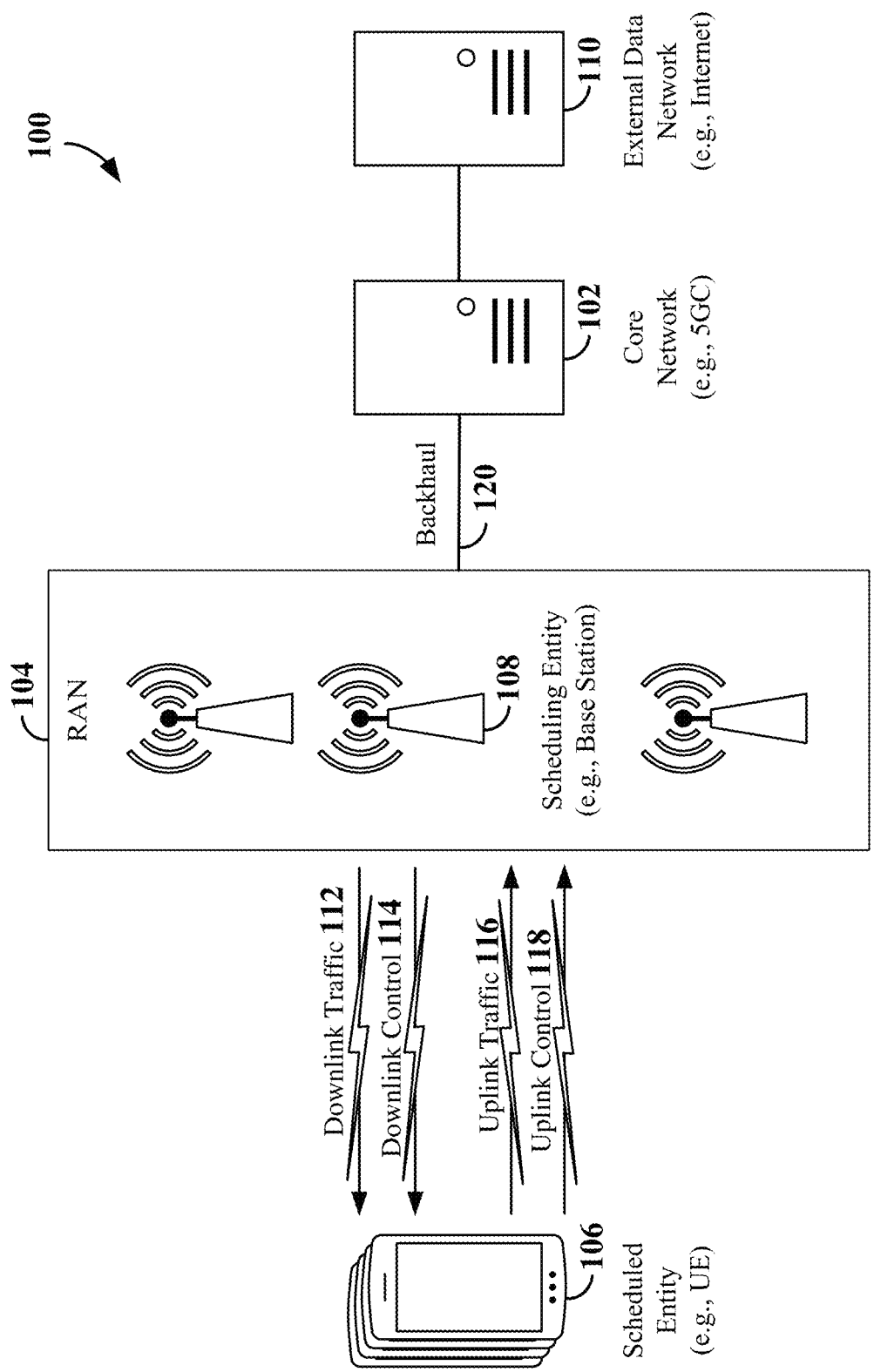
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes, and constitution.

The disclosure relates in some aspects to detecting a beam failure and actions taken as a result of a detected beam failure. Causes of beam failure may include, for example, a degradation in the quality of a downlink (DL), a degradation in the quality of an uplink (UL), an increase in self-interference on a downlink during full-duplex (FD) operation, or an increase in self-interference on an uplink during FD operation.

In some examples, a beam failure due to self-interference in a full-duplex communication scenario may be detected based on a signal-to-interference-plus-noise ratio (SINR). For example, a UE may measure, on a receive beam of the UE, downlink reference signals transmitted by a base station on a downlink beam in addition to uplink reference signals transmitted by the UE on an uplink beam. The UE may then combine these measurements (e.g., channel measurements based on the downlink reference signals and self-interference measurements based on the uplink reference signals) to determine whether the quality of the downlink indicates a beam failure (e.g., by comparing a measured SINR or a block error rate (BER) based on the SINR to a threshold).

Upon detection of a beam failure, the UE may transmit a beam failure recovery request to a base station. In some examples, the beam failure recovery request indicates that all of the active beams monitored by the UE have failed. An active beam may be defined as a beam that was selected by the base station for data and control channel transmissions (e.g., selected from among a set of candidate beams that were selected and reported by the UE). In some examples, the active beams may be selected control resource set (CORESET) beams (e.g., two CORESET beams or some other number of CORESET beams). In some examples, the beam failure recovery request indicates that one or more of the beams monitored by the UE have failed. In this latter case, the beam failure indication may include an identifier of each failed beam. Also, the beam failure recovery request may indicate whether the beam failure is due to downlink quality degradation or self-interference.

The manner in which the UE transmits the beam failure recovery request may depend on whether an uplink from the UE to the base station is currently working. If the uplink is working, the UE may transmit the beam failure recovery request via uplink signaling (e.g., via a physical uplink control channel or a physical uplink shared channel). If the uplink is not working or if the beam failure is due to downlink channel degradation, the UE may transmit the beam failure recovery request via a random access channel (RACH) message. The beam failure recovery request may indicate that all of the beams monitored by the UE have failed or that one or more of the beams monitored by the UE have failed. Also, the beam failure recovery request may indicate whether the beam failure is due to downlink quality degradation or self-interference.

In some examples, a UE may determine whether a beam failure is due to downlink degradation or due to self-interference by initially measuring only downlink reference signals to determine whether a deterioration in the downlink quality was sufficient on its own to cause the beam failure. If so, the UE and/or the base station may take steps to address the deterioration in the downlink quality (e.g., select a different downlink beam). On the other hand, if the beam failure was caused by self-interference, the UE and/or the base station may take steps to address the self-interference (e.g., switch to half-duplex operation or some other mode of operation).

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network—New Radio dual connectivity (EN-DC) UE that is capable of simultaneously connecting to an LTE base station and a NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
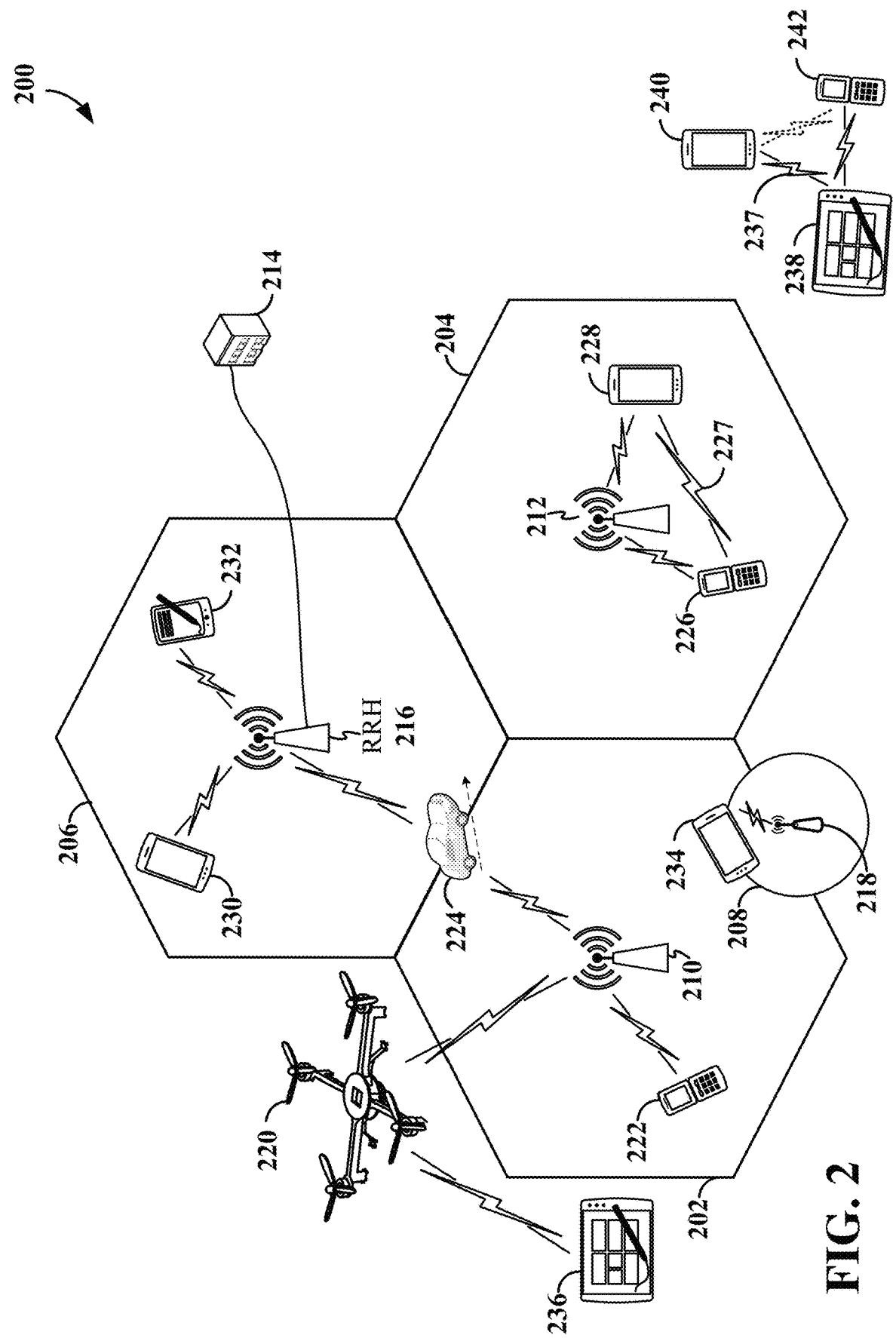
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of the serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms Duplex refers to a point-to-point communication link where both endpoints can communicate with one another in both directions. Full-duplex (FD) means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

Figure 3:
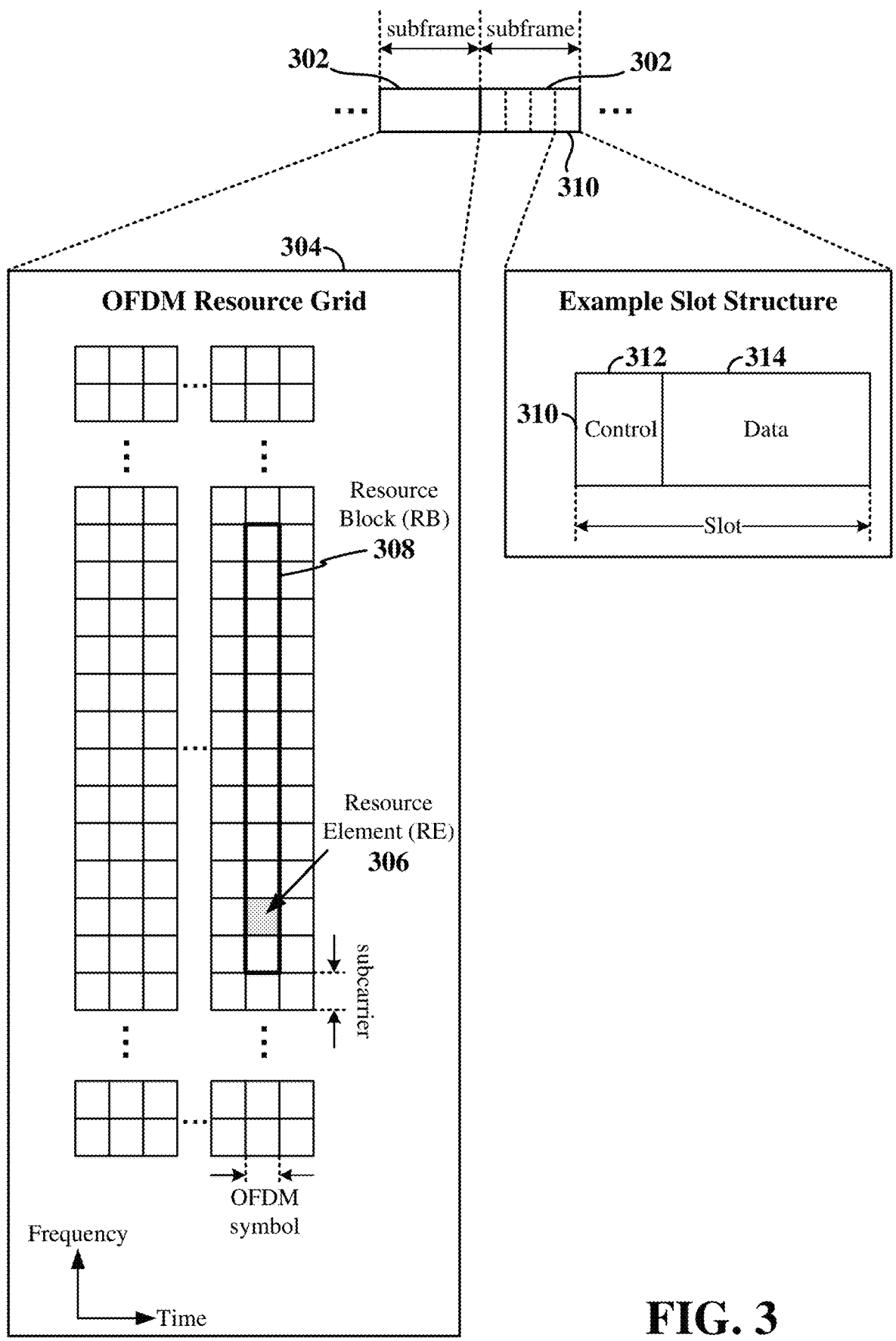
FIG. 3 is a schematic illustration of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., an Rx V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TB S), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
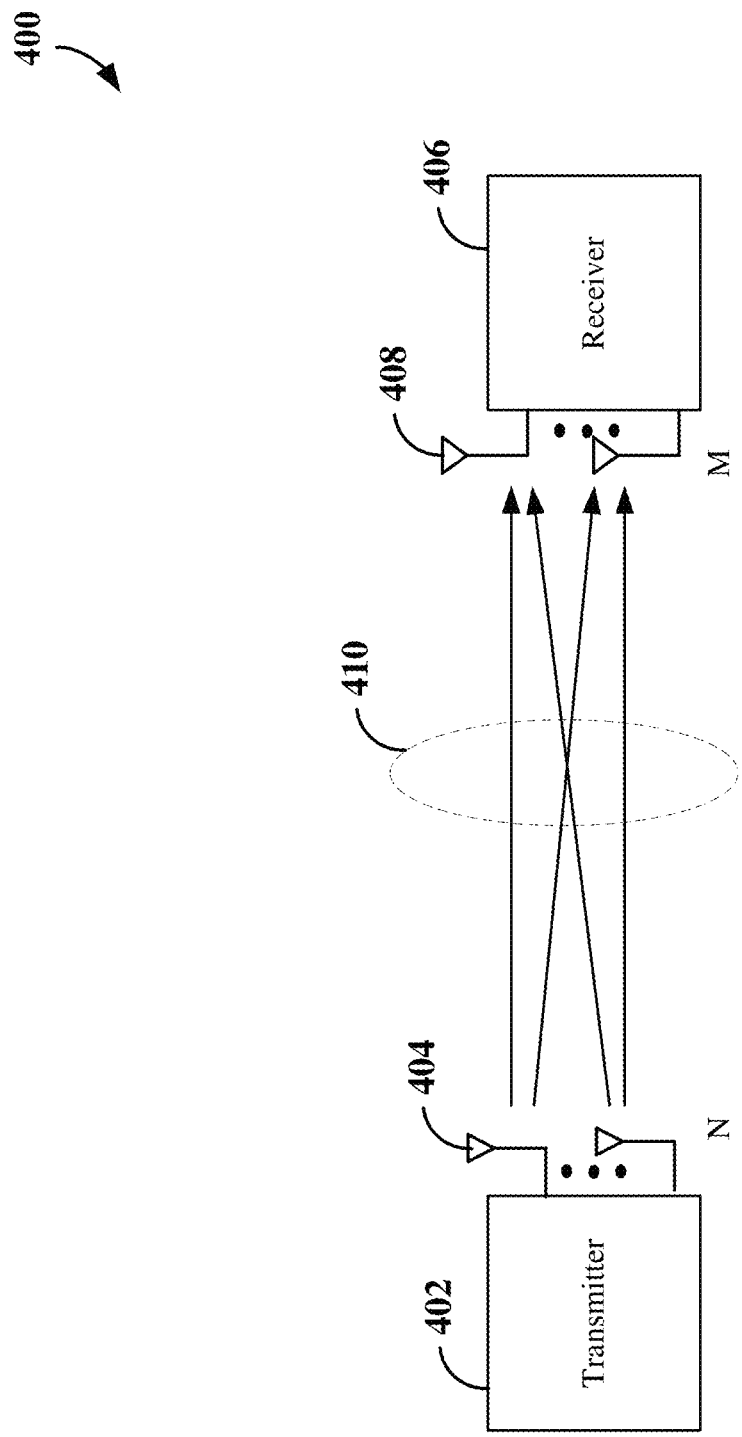
FIG. 4 is a block diagram illustrating an example of a wireless communication system supporting beamforming and/or multiple-input multiple-output (MIMO) communication according to some aspects.

FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity such as a UE, a scheduled entity such as a base station, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables a base station to identify the source of each spatially precoded data stream.

The number of data streams or layers corresponds to the rank of the transmission. In general, the rank of the wireless communication system 400 (MIMO system) is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-plus-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

The transmitter 402 and/or the receiver 406 may use beamforming to shape or steer an antenna beam (e.g., a transmit beam or a receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or the receiver 406 may apply amplitude and/or phase offsets to signals transmitted or received from each of the antennas 404 or 408 associated with the transmitter 402 or the receiver 406.

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, a slot format indicator (SFI), and paging information, may be transmitted in a beam-sweeping manner to enable all scheduled entities (e.g., UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH).

A base station (e.g., a gNB) may generally be capable of communicating with UEs using transmit beams (e.g., downlink transmit beams) of varying beam widths. For example, a base station may be configured to utilize a wider beam when communicating with a UE that is in motion and a narrower beam when communicating with a UE that is stationary. The UE may further be configured to utilize one or more downlink receive beams to receive signals from the base station. In some examples, to select one or more downlink transmit beams and one or more downlink receive beams for communication with a UE, the base station may transmit a reference signal, such as an SSB or a CSI-RS, on each of a plurality of downlink transmit beams in a beam-sweeping manner. The UE may measure the reference signal received power (RSRP) on each of the downlink transmit beams using one or more downlink receive beams on the UE and transmit a beam measurement report to the base station indicating the RSRP of each of the measured downlink transmit beams. The base station may then select one or more serving downlink beams (e.g., downlink transmit beams and downlink receive beams) for communication with the UE based on the beam measurement report. The resulting selected downlink transmit beam and downlink receive beam may form a downlink beam pair link. In other examples, when the channel is reciprocal, the base station may derive the particular downlink beam(s) to communicate with the UE based on uplink measurements of one or more uplink reference signals, such as sounding reference signals (SRSs).

Similarly, uplink beams (e.g., uplink transmit beam(s) at the UE and uplink receive beam(s) at the base station) may be selected by measuring the RSRP of received uplink reference signals (e.g., SRSs) or downlink reference signals (e.g., SSBs or CSI-RSs) during an uplink or downlink beam sweep. For example, the base station may determine the uplink beams either by uplink beam management via an SRS beam sweep with measurement at the base station or by downlink beam management via an SSB/CSI-RS beam sweep with measurement at the UE. The selected uplink beam may be indicated by a selected SRS resource (e.g., time-frequency resources utilized for the transmission of an SRS) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

Figure 5:
FIG. 5 is a diagram illustrating an example of communication between a radio access network (RAN) node and a wireless communication device using beamforming according to some aspects.

FIG. 5 is a diagram illustrating communication between a UE 502 and a base station 504 using beamformed signals according to some aspects. The UE 502 may be any of the UEs or scheduled entities illustrated in any of FIGS. 1, 2, 4, 5, 7A, 7B, 7C, 9, 13, 16, and 17. The base station 504 may be any of the base stations (e.g., gNBs) or scheduling entities illustrated in any of FIGS. 1, 2, 4, 5, 7A, 7B, 7C, 9, 13, 16, and 24.

In the example shown in FIG. 5, the base station 504 is configured to generate a plurality of beams 506a-506h, each associated with a different beam direction. In addition, the UE 502 is configured to generate a plurality of beams 508a-508e, each associated with a different beam direction. The base station 504 and UE 502 may select one or more beams 506a-506h on the base station 504 and one or more beams 508a-508e on the UE 502 for communication of uplink and downlink signals therebetween using a downlink beam management scheme and/or an uplink beam management scheme.

In an example of a downlink beam management scheme for selection of downlink beams, the base station 504 may be configured to sweep or transmit on each of a plurality of downlink transmit beams 506a-506h during one or more synchronization slots. For example, the base station 504 may transmit a reference signal, such as an SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). It should be noted that while some beams are illustrated as adjacent to one another, such an arrangement may be different in different aspects. For example, downlink transmit beams 506a-506h transmitted during a same symbol may not be adjacent to one another. In some examples, the base station 504 may transmit more or fewer beams distributed in all directions (e.g., 360 degrees).

The UE 502 is configured to receive the downlink beam reference signals on a plurality of downlink receive beams 508a-508e. In some examples, the UE 502 searches for and identifies each of the downlink transmit beams 506a-506h based on the beam reference signals. The UE 502 then performs beam measurements (e.g., RSRP, SINR, reference signal received quality (RSRQ), etc.) on the beam reference signals on each of the downlink receive beams 508a-508e to determine the respective beam quality of each of the downlink transmit beams 506a-506h as measured on each of the downlink receive beams 508a-508e.

The UE 502 can generate and transmit a beam measurement report, including the respective beam index and beam measurement of each downlink transmit beam 506a-506h on each downlink receive beam 508a-508e, to the base station 504. The base station 504 may then select one or more downlink transmit beams on which to transmit unicast downlink control information and/or user data traffic to the UE 502. In some examples, the selected downlink transmit beam(s) have the highest gain from the beam measurement report. In some examples, the UE 502 can further identify the downlink transmit beams selected by the base station from the beam measurements. Transmission of the beam measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The base station 504 or the UE 502 may further select a corresponding downlink receive beam on the UE 502 for each selected serving downlink transmit beam to form a respective downlink beam pair link (BPL) for each selected serving downlink transmit beam. For example, the UE 502 can utilize the beam measurements to select the corresponding downlink receive beam for each serving downlink transmit beam. In some examples, the selected downlink receive beam to pair with a particular downlink transmit beam may have the highest gain for that particular downlink transmit beam.

In one example, a single downlink transmit beam (e.g., beam 506d) on the base station 504 and a single downlink receive beam (e.g., beam 508c) on the UE may form a single downlink BPL used for communication between the base station 504 and the UE 502. In another example, multiple downlink transmit beams (e.g., beams 506c, 506d, and 506e) on the base station 504 and a single downlink receive beam (e.g., beam 508c) on the UE 502 may form respective downlink BPLs used for communication between the base station 504 and the UE 502. In another example, multiple downlink transmit beams (e.g., beams 506c, 506d, and 506e) on the base station 504 and multiple downlink receive beams (e.g., beams 508c and 508d) on the UE 502 may form multiple downlink BPLs used for communication between the base station 504 and the UE 502. In this example, a first downlink BPL may include downlink transmit beam 506c and downlink receive beam 508c, a second downlink BPL may include downlink transmit beam 508d and downlink receive beam 508c, and a third downlink BPL may include downlink transmit beam 508e and downlink receive beam 508d.

When the channel is reciprocal, the above-described downlink beam management scheme may also be used to select one or more uplink BPLs for uplink communication from the UE 502 to the base station 504. For example, the downlink BPL formed of beams 506d and 508e may also serve as an uplink BPL. Here, beam 508c is utilized as an uplink transmit beam, while beam 506d is utilized as an uplink receive beam.

In an example of an uplink beam management scheme, the UE 502 may be configured to sweep or transmit on each of a plurality of uplink transmit beams 508a-508e. For example, the UE 502 may transmit an SRS on each beam in the different beam directions. In addition, the base station 504 may be configured to receive the uplink beam reference signals on a plurality of uplink receive beams 506a-506h. In some examples, the base station 504 searches for and identifies each of the uplink transmit beams 508a-508e based on the beam reference signals. The base station 504 then performs beam measurements (e.g., RSRP, SINR, RSRQ, etc.) on the beam reference signals on each of the uplink receive beams 506a-506h to determine the respective beam quality of each of the uplink transmit beams 508a-508e as measured on each of the uplink receive beams 506a-506h.

The base station 504 may then select one or more uplink transmit beams on which the UE 502 will transmit unicast downlink control information and/or user data traffic to the base station 504. In some examples, the selected uplink transmit beam(s) have the highest gain. The base station 504 may further select a corresponding uplink receive beam on the base station 504 for each selected serving uplink transmit beam to form a respective uplink beam pair link (BPL) for each selected serving uplink transmit beam. For example, the base station 504 can utilize the beam measurements to select the corresponding uplink receive beam for each serving uplink transmit beam. In some examples, the selected uplink receive beam to pair with a particular uplink transmit beam may have the highest gain for that particular uplink transmit beam.

The base station 504 may then notify the UE 502 of the selected uplink transmit beams. For example, the base station 504 may provide the SRS resource identifiers (IDs) identifying the SRSs transmitted on the selected uplink transmit beams. In some examples, the base station 504 may apply each selected uplink transmit beam (and corresponding uplink receive beam) to an uplink signal (e.g., PUCCH, PUSCH, SRS, etc.) and transmit the respective SRS resource IDs associated with the selected uplink transmit beams applied to each uplink signal to the UE 502. When the channel is reciprocal, the above-described uplink beam management scheme may also be used to select one or more downlink BPLs for downlink communication from the base station 504 to the UE 502. For example, the uplink BPLs may also be utilized as downlink BPLs.

In some other examples, the UE 502 may identify a new UL beam that may be paired with a current DL beam. For example, if the DL beam has a strong beam RSRP, then the UE may decide to keep the current DL beam and replace the current UL beam with the new UL beam. The decision on how beams are selected may be indicated by the base station or gNB to the UE. Alternatively or in addition, the UE may recommend a beam or BPL to the base station or gNB. In some examples, the UE may be configured with a look-up candidate beam pair table based on previous measurements, where the UE may recommend a new DL and UL beam pair for full-duplex communication. The gNB or base station may decide which beam to keep and which beam to replace among the DL and UL beams (e.g., keep the stronger beam and replace the weaker beam).

Figure 6A:
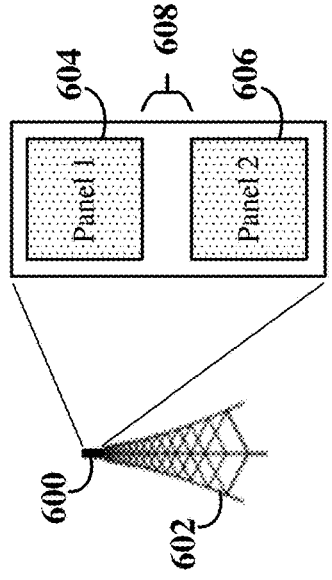
FIGS. 6A and 6B are diagrams depicting communication via two antenna panels according to some aspects.

As mentioned above, a UE and a base station (e.g., gNB) may use full-duplex communication. FIG. 6A is a schematic diagram depicting an antenna array 600 of a TRP atop a base station 602 according to some aspects of the disclosure. The antenna array 600 is divided into two panels (panel 1 604, panel 2 606) with a physical separation 608 therebetween. Each of the two panels may be a subarray of antennas. A given panel may transmit and/or receive a beam or a beam group. A different number of panels may be used in other examples.

Other types of devices may include multi-panel antenna arrays for full-duplex communication. For example, a UE may have a first panel on one side of the UE and a second panel on an opposite side of the UE. As another example, a UE may have four panels, with one panel on each corner of the UE.

Figure 6B:
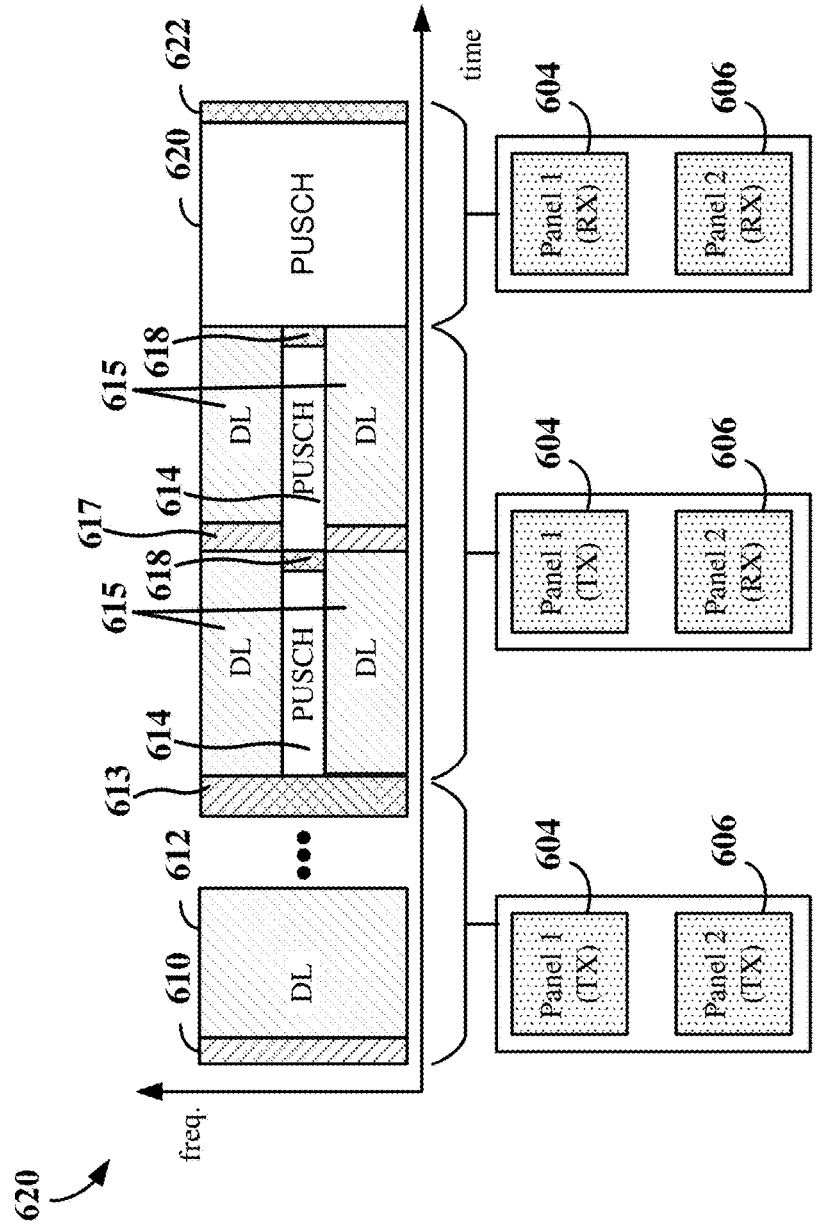

FIG. 6B is a diagram depicting the transmission or reception configuration of the two panels (panel 1 604 and panel 2 606 of FIG. 6A or two panels on a UE, etc.). The transmission (TX) and reception (RX) configurations of the two panels are depicted for various DL and UL channels as may be implemented in a device (e.g., a scheduling entity or a scheduled entity) implementing flexible TDD according to some aspects of the disclosure.

As mentioned above, flexible TDD may involve in some examples using two panels to operate in either a TDD mode (with both panels on the gNB and one or more panels on the UE configured for either DL or UL) or an SBFD mode (with one panel on each of the gNB and UE configured for UL and another panel on each of the gNB and UE configured for DL) as described below with reference to FIG. 6B.

At the left of FIG. 6B, when the antenna array 600 is communicating in only a single direction at a time, both panel 1 604 and panel 2 606 may be configured for the single-direction communication as an example of a TDD mode showing the DL transmission. For example, both panels 604 and 606 may be configured to transmit DL control 610, DL data 612, and DL data 613 as an example of DL transmissions during TDD mode. At the center of FIG. 6B, when the antenna array 600 is simultaneously transmitting a combination of DL data 615 and DL control 617 and receiving UL data (e.g., PUSCH 614) and UL control 618, panel 1 604 may be configured for DL transmission (i.e., TX) and panel 2 606 may be configured for UL reception (i.e., RX). At the right of FIG. 6B, when the antenna array 600 is only receiving UL data (e.g., PUSCH 620) and UL control 622, both panel 1 604 and panel 2 606 may be configured for UL reception. The antenna array 600 is thus configurable for both TDD and full-duplex operation (e.g., flexible TDD). The physical separation 608 between panel 1 604 and panel 2 606 may provide improved isolation between the panels (e.g., greater than about 50 dB of improved isolation) when compared to two panels without the physical separation 608. The above discussion also may be applicable to an antenna array in another type of device (e.g., a UE, with the references to DL and UL reversed).

Figure 7A:
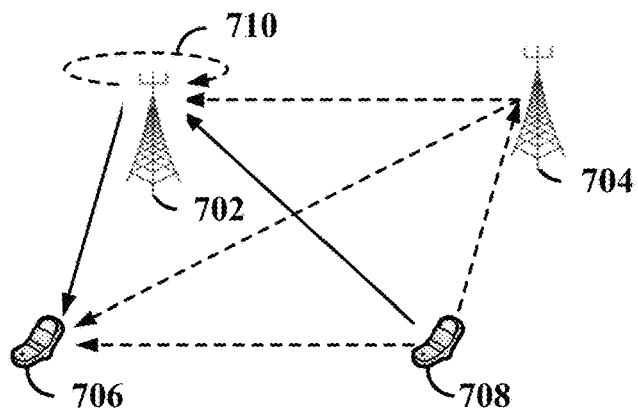
FIGS. 7A, 7B, and 7C are schematic illustrations of sources of interference for base stations and UEs according to some aspects.
Figure 7B:
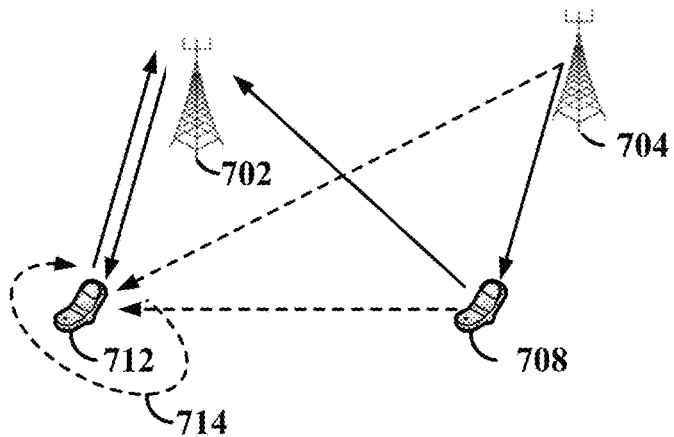
Figure 7C:
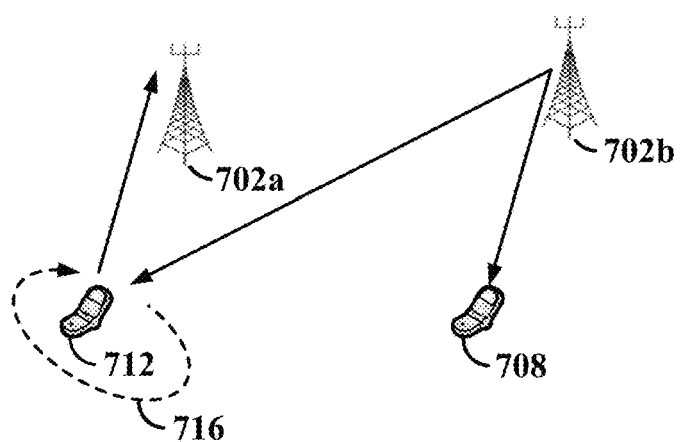

FIGS. 7A, 7B, and 7C illustrate wireless communication systems including a full-duplex gNB 702, a neighbor gNB 704, a half-duplex UE 706, a first full-duplex UE 712, a second full-duplex UE 708. These figures further illustrate different sources of interference (e.g., cross-beam interference) for the half-duplex UE 706, the first full-duplex UE 712, the second full-duplex UE 708, and different gNB configurations according to some aspects of the disclosure. The half-duplex UE 706, the first full-duplex UE 712, and the second full-duplex UE 708 may correspond to any of the UEs or scheduled entities shown in any of FIGS. 1, 2, 4, 5, 7A, 7B, 7C, 9, 13, 16, and 17.

In FIG. 7A, a full-duplex gNB 702 (e.g., a scheduling entity) is transmitting to the half-duplex UE 706. During the time of the transmission from the full-duplex gNB 702 to the half-duplex UE 706, the full-duplex gNB 702 is receiving, at its receiver (not shown), self-interference 710 from its own transmission to the half-duplex UE 706 as well as interference from the neighbor gNB 704 and an uplink transmission from a second full-duplex UE 708. The half-duplex UE 706 is also receiving interference from the second full-duplex UE 708 and the neighbor gNB 704. Because it is a half-duplex UE, the half-duplex UE 706 is not transmitting during the time of the transmission from the full-duplex gNB 702 to the half-duplex UE 706, and therefore, the half-duplex UE 706 receives no self-interference. The full-duplex gNB 702 and the neighbor gNB 704 may each correspond to any of the base stations or scheduling entities shown in any of FIGS. 1, 2, 4, 5, 7A, 7B, 7C, 9, 13, 16, and 24.

In FIG. 7B, the full-duplex gNB 702 is transmitting a downlink transmission to the first full-duplex UE 712. During the time of the transmission of the downlink transmission from the full-duplex gNB 702 to the first full-duplex UE 712, the full-duplex gNB 702 is receiving, at its receiver (not shown), a simultaneous uplink transmission from the first full-duplex UE 712. At the same time as the just mentioned simultaneous downlink and uplink transmissions, the first full-duplex UE 712 is receiving, at its receiver (not shown), self-interference 714 from its own transmission to the full-duplex gNB 702 as well as interference from the neighbor gNB 704 and interference from the second full-duplex UE 708.

FIG. 7C illustrates a full-duplex gNB configured as a multi-TRP base station including a first TRP 702a and a second TRP 702b. The first TRP 702a is receiving an uplink transmission from the first full-duplex UE 712. During the time of the transmission of the uplink transmission to the first TRP 702a, the first full-duplex UE 712 is also receiving a transmission from the second TRP 702b. In addition to the transmission received from the second TRP 718b, the first full-duplex UE 712 is also receiving, at its receiver (not shown), self-interference 716 from its own transmission to the first TRP 702a.

Conventionally, different frequency bands may be allocated for allocated for the transmissions of FIGS. 7A-7B to mitigate the above interference. For the half-duplex UE 706 of FIG. 7A, interference may be mitigated if the interference from the neighbor gNB 704 and second full-duplex UE 708 are at frequencies other than those occupied by the downlink transmission from the full-duplex gNB 702 to the half-duplex UE 706. Similarly, for the first full-duplex UE 712 of FIGS. 7B and 7C, interference may be mitigated if the self-interference 716 from the first full-duplex UE 712, interference from the neighbor gNB 704, and/or interference from the second full-duplex UE 708 are at frequencies other than those occupied by the downlink transmission from the full-duplex gNB 702 to the half-duplex UE 706.

The disclosure relates in some aspects to FD capabilities for wireless communication and interference mitigation for FD communication. Various aspects of the disclosure may be applicable to FD operation with simultaneous uplink transmissions and downlink transmissions in FR2 and/or other frequency bands, which may be referred to herein as "FD mode." FD mode may include SBFD in flexible TDD, but may also include FDD in paired spectrum, SBFD in unpaired spectrum, partially overlapped frequency spectrum FD, fully overlapped frequency spectrum FD, in-band FD, or other types of full-duplex operation.

This FD capability may be implemented at a base station (e.g., a gNB), a UE, or both. For example, a UE may transmit uplink signals from one panel and receive downlink signals at another panel.

In some aspects, full-duplex performance may depend on beam separation and/or other factors. For example, a first pair of beams that has more spatial separation than a second pair of beams may have less self-interference than the second pair of beams.

In some aspects, FD capability may improve (e.g., reduce) latency. For example, in contrast with half-duplex communication where only some of the slots are reserved for uplink transmission, in FD communication a UE might not need to wait for an available uplink slot to transmit uplink information, thereby reducing the latency for the uplink transmission. As another example, a UE may receive downlink signals in slots that are dedicated as uplink-only slots, thereby reducing the latency for the downlink transmission.

In some aspects, FD capability may improve spectrum efficiency (e.g., per cell, per UE, etc.). For example, in FD communication, the same time slots and/or frequency resources may be used concurrently for uplink and downlink transmissions. Here, the downlink frequency band(s) and the uplink frequency band(s) in FD communication may be fully overlapped, partially overlapped, or separated with a guard band in between.

In a full-duplex scenario in FR2 (or other beamforming scenarios), a beam may be subject to failure in some circumstances. For example, a UE may experience beam failure if the radio conditions suddenly change (e.g., when an end-user steps around a corner or a vehicle causes an obstruction), whereby one or more of the beams used by the UE may become unreliable before the UE is able to switch to a new beam.

In some examples, a beam failure may be detected by repeatedly performing beam measurements. For example, a physical (PHY) layer of a UE may conduct radio link monitoring (RLM) measurements (e.g., for the downlink) on RLM reference signals (RLM-RSs). In some examples, downlink RLM-RSs may include SSBs and CSI-RSs. In some examples, uplink RLM-RSs may include SRSs and DMRSs.

The PHY layer may pass the results of these measurements to a medium access control (MAC) layer and/or to a radio resource control (RRC) layer. In some examples, the RRC layer may be responsible for detecting a radio link failure (RLF) while the MAC layer may be responsible for detecting a beam failure.

The PHY layer may use a quality threshold to trigger failure indications to the MAC layer. As a specific example, the 3GPP Technical Specification (TS) 38.133 v15.8.0, section 8.5.1 (2019-12) specifies a Qout_LR parameter. This parameter specifies a quality whereby, for any monitored RLM-RSs that fall below this quality, the PHY layer is to generate a beamFailureInstance parameter. The MAC layer may then use this indication in combination with a beamFailureInstanceMaxCount parameter and a beamFailureDetectionTimer parameter for beam failure detection.

Once a UE detects a beam failure, the UE may attempt a recovery operation by initiating a RACH procedure. For example, the UE may initiate a contention-free random access (CFRA) procedure with a configured beam failure recovery-information element (BFR-IE).

Before transmitting a RACH preamble during the RACH procedure, a UE may identify a new target beam based on measurements of one or more candidate beams. Here, the UE may measure the reference signal received power (RSRP) or some other quality of the candidate beams and select the candidate beam with the best quality (e.g., highest RSRP). The UE may thus use the selected beam for the RACH procedure for beam failure recovery. In some examples, a base station may transmit an IE RadioLinkMonitoringConfig to a UE to configure the radio link monitoring for detection of beam failure and/or cell radio link failure. In some examples, the IE RadioLinkMonitoringConfig specifies the resources (e.g., SSB resources or CSI-RS resources) that the UE is to monitor for beam quality measurement operations. In addition, the IE RadioLinkMonitoringConfig specifies a beamFailureInstanceMaxCount parameter and a beamFailureDetectionTimer parameter that a UE uses to determine whether to initiate a beam failure recovery operation. For example, if a UE detects that a measured RSRP of a beam falls below a threshold a beamFailureInstanceMaxCount number of times within a period of time specified by the beamFailureDetectionTimer parameter, the UE may initiate a beam failure recovery operation.

Figure 8:
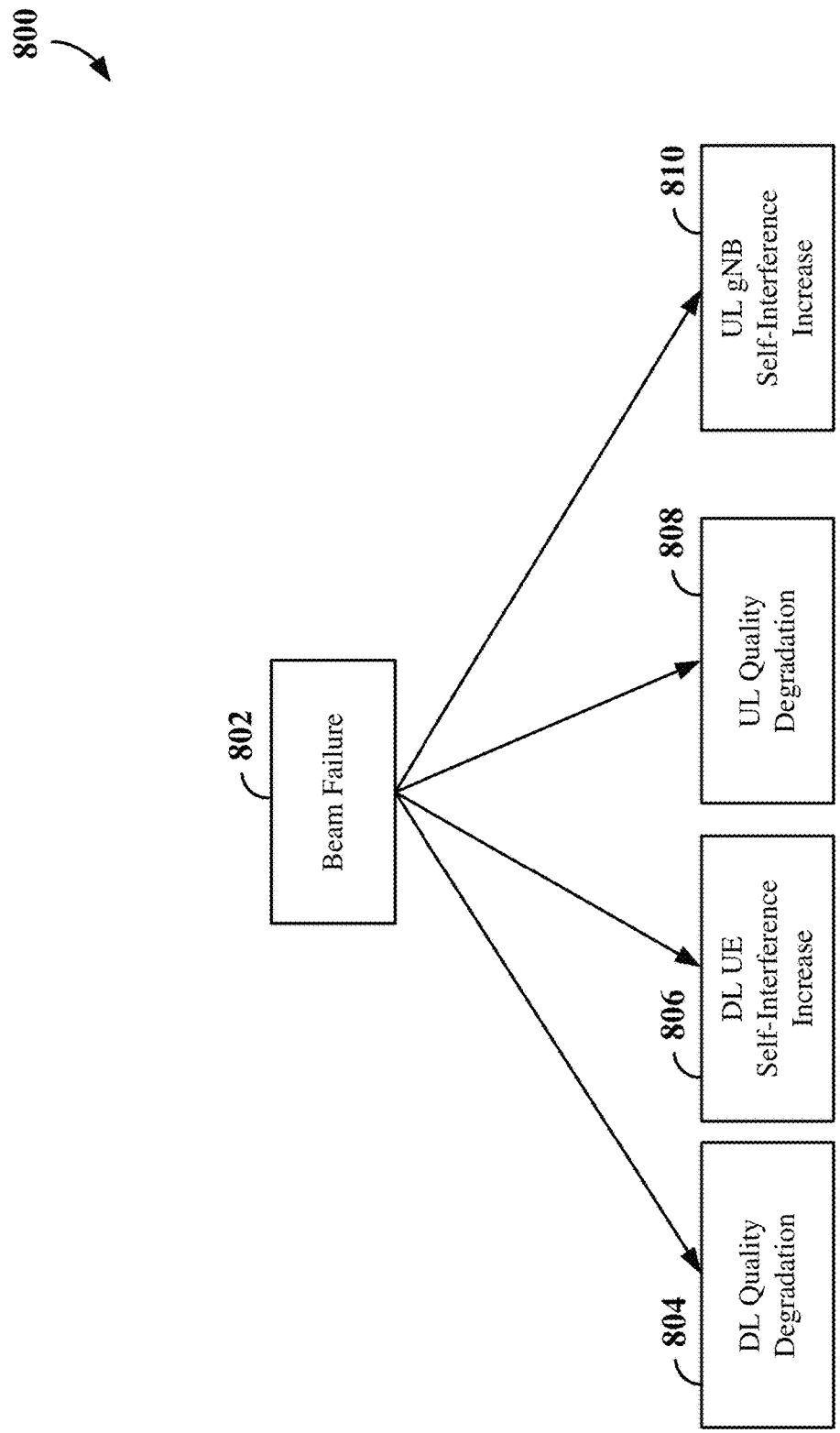
FIG. 8 is a conceptual illustration of beam failure examples according to some aspects.

As mentioned above, a beam failure may be caused by a degradation in downlink quality or a degradation in uplink quality. For full-duplex operation, however, causes of beam failure may also include a downlink beam failure due to an increase in UE self-interference (e.g., reflections and/or dynamic clutter due to environment changes) or an uplink beam failure due to an increase in base station (e.g., gNB) self-interference. Accordingly, as shown in the diagram 800 of FIG. 8, in some examples, a beam failure 802 may be due to one or more of a DL quality degradation 804, a DL UE self-interference increase 806, an UL quality degradation 808, or an UL gNB self-interference increase 810.

The disclosure relates in some aspects to beam failure detection that accounts for self-interference in a full-duplex scenario. The procedures and signaling discussed below may be applicable to detecting downlink beam failure and/or uplink beam failure.

Figure 9:
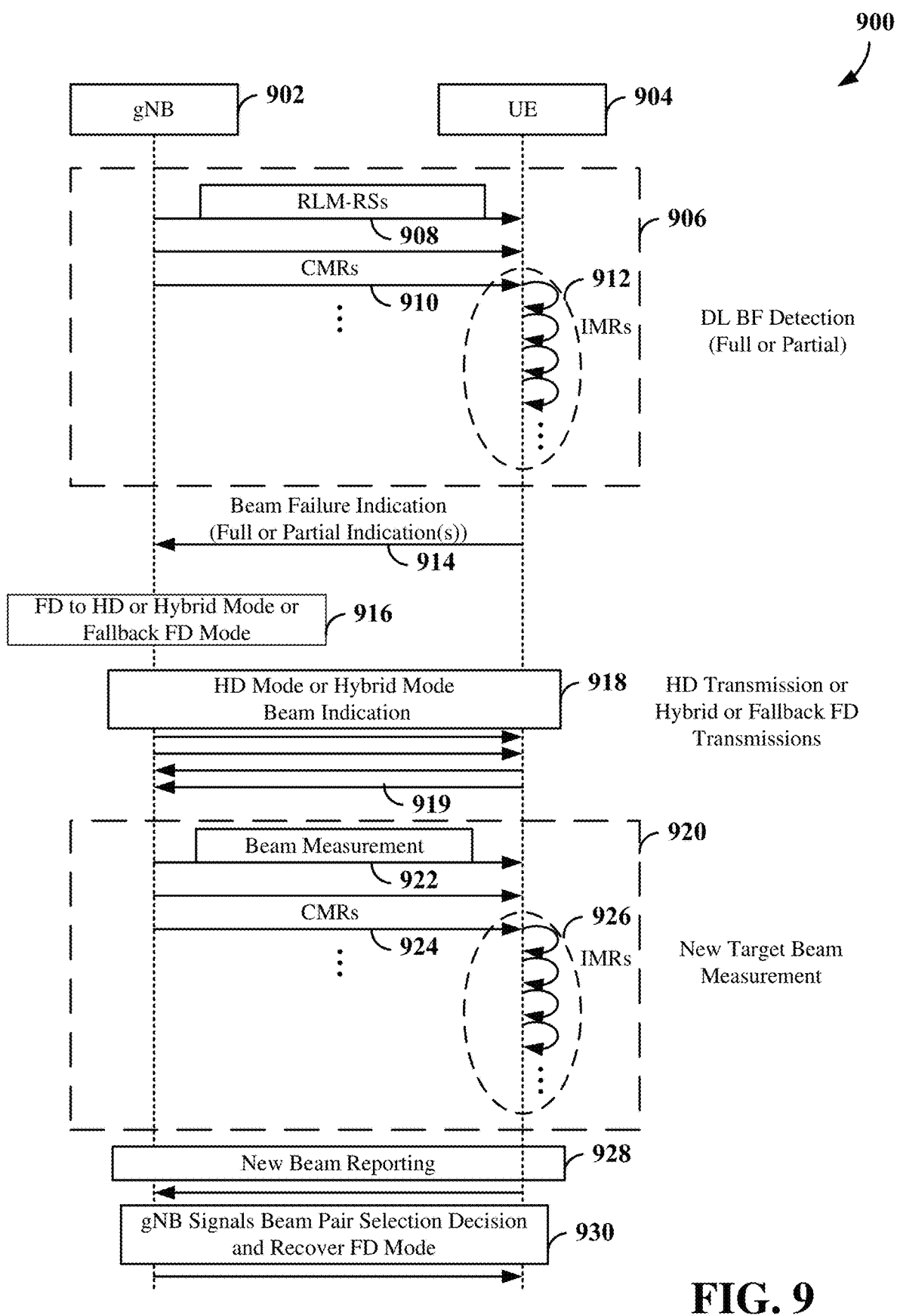
FIG. 9 is a signaling diagram illustrating example beam failure-related signaling between a UE and a gNB according to some aspects.

FIG. 9 illustrates an example of failure detection procedures, failure recovery, and signaling 900 in a wireless communication system that includes a gNB 902 and a UE 904. For purposes of explanation, FIG. 9 relates to detection of a downlink beam failure and failure recovery that includes new beam selection. It should be appreciated that the disclosed techniques may also be applicable to detection of an uplink beam failure. The UE 904 may correspond to any of the UEs or scheduled entities shown in FIGS. 1, 2, 4, 5, 7A, 7B, 7C, 9, 13, 16, and 17. The gNB 902 may correspond to any of the base stations or scheduling entities shown in FIGS. 1, 2, 4, 5, 7A, 7B, 7C, 9, 13, 16, and 24.

Block 906 of FIG. 9 describes several operations for detecting a downlink beam failure. This beam failure may be a full failure (e.g., all monitored beams failed) or a partial failure (e.g., not all of the monitored beams failed) discussed above in connection with FIG. 8.

During a measurement procedure, the gNB 902 transmits RLS-RSs on at least one channel measurement resource (CMR) as generally represented by lines 908-910. For example, the gNB may transmit SSB or CSI-RS on the CMRs designated by the gNB 902 for downlink beam measurements (e.g., in a RadioLinkMonitoringConfig IE).

In addition, the UE 904 transmits and monitors uplink reference signals (generally represented by the looped arrows in FIG. 9) on interference measurement resources (IMRs) generally represented by the dashed oval 912. For example, a first panel of the UE 904 may transmit sounding reference signals (SRSs) or demodulated reference signals (DMRSs) on the IMRs designated by the gNB 902 for self-interference measurements (e.g., in a RadioLinkMonitoringConfig IE) and a second panel of the UE 904 may measure and monitor for the SRSs or DMRSs on the IMRs. In FIG. 9, the monitoring of uplink reference signals by the UE 904 is represented by the arrows that loop back to the UE 904.

In some examples, a beam failure in a full-duplex communication scenario may be detected based on a signal-to-interference-plus-noise ratio (SINR). For example, the UE 904 may calculate an SINR parameter based on the measured downlink reference signals and the measured uplink reference signals. The UE may then determine whether the quality of the downlink indicates a beam failure (e.g., by comparing the SINR or a block error rate based on the SINR to a threshold).

Upon detection of a beam failure, the UE may generate an indication of the beam failure. In some examples, the beam failure indication indicates that all of the beams monitored by the UE have failed. In some examples, the beam failure indication indicates that one or more of the beams monitored by the UE have failed. In this latter case, the beam failure indication may include an identifier of each failed beam.

The UE 904 transmits the beam failure indication 914 (e.g., a beam failure recovery request) to the gNB 902. The manner in which the UE 904 transmits the beam failure indication 914 may depend on whether an uplink from the UE 904 to the gNB 902 is currently working. If the uplink is working, the UE 904 may transmit the beam failure indication 914 via uplink signaling (e.g., via a physical uplink control channel or a physical uplink shared channel). If the uplink is not working, the UE 904 may transmit the beam failure indication 914 via a random access channel (RACH) message. The beam failure indication 914 may indicate that all of the beams monitored by the UE 904 have failed or that one or more of the beams monitored by the UE 904 have failed. Also, the beam failure indication 914 may indicate whether the beam failure is due to, for example, downlink quality degradation and/or UE self-interference.

In some examples, the UE 904 may determine whether a beam failure is due to downlink degradation or UE self-interference by initially measuring only downlink reference signals to determine whether deterioration in the downlink quality was sufficient on its own to cause the beam failure. If the deterioration in the downlink quality was sufficient to cause the beam failure, the UE 904 and/or the gNB 902 may take temporary remedial measures to address the deterioration in the downlink quality (e.g., by selecting a different downlink beam). On the other hand, if the beam failure was caused by UE self-interference, the UE 904 and/or the gNB 902 may take steps to temporarily address the UE self-interference (e.g., by switching to half-duplex (HD) operation or some other mode of operation as will be discussed in more detail below and eventually returning the operation to a full-duplex communication mode).

After receiving the beam failure indication 914 (indicating a full or partial beam failure), the gNB 902 may initiate a process 916 to modify the FD communication mode according to various different modes and conditions. In an example, the gNB 902 may initiate a half-duplex (HD) communication mode for one or more active beams, particularly in the case of a full failure indication. It is noted here that an active beam is a beam that is selected by the gNB for data and control channel transmissions and may further be beams selected from among the UE selected and reported good candidate beams. In some examples, the active beams may be the selected CORESET beams (e.g., two CORESET beams or some other number of CORESET beams).

In another example, the gNB 902 may initiate a hybrid mode, particularly in the case of a partial failure indication. The hybrid mode may include operating one or more working beams according to FD communication, where the failed beams are switched to HD communication mode operation. In still a further aspect, the process 916 may include switching to a fallback or limited FD mode, where the process falls back to FD operation, but in a limited FD operation mode as will be discussed in more detail later. The limited or fallback FD mode may include implementation of a UL power backoff for particular traffic cases such as low priority of the UL traffic or lower modulation coding schemes (MCS). The power backoff may be accompanied by UL repetition (e.g., repeat transmissions of particular data/control channels). In other aspects, the limited FD mode may include replacing a failed FD beam pair with a backup FD pair regardless of the traffic priority.

After selection of one of the various temporary or modified communication modes in the process 916, the selected communication mode (HD, Hybrid, or Fallback/Limited FD modes) may be communicated or indicated to the UE 904 as shown by block 918. Based on the selected communication mode, either HD, limited FD, or hybrid communication takes place as indicated by arrows 919 (which may be HD or FD communication according to the particular characteristics of the selected mode).

After a predetermined period of operation of the temporary communication mode operation as indicated by the arrows 919, a new target beam measurement operation shown at block 920 is implemented.

Block 920 of FIG. 9 describes example operations for a new target beam measurement that involves the UE 904 determining new candidate beams and reporting the beams to the gNB 902. During a measurement procedure, the gNB 902 transmits beam measurements on channel measurement resources (CMRs) generally represented by lines 922-924. For example, the gNB may transmit SSB or CSI-RS on the CMRs designated by the gNB 902 for downlink candidate beam measurements. In addition, the UE 904 transmits and monitors uplink reference signals (as represented by the looped arrows in FIG. 9) on IMRs generally represented by the dashed oval 926. For example, a first panel of the UE 904 may transmit sounding reference signals (SRSs) on the IMRs designated by the gNB 902 for cross beam self-interference measurements, and a second panel of the UE 904 may measure and monitor for the SRSs on the IMRs.

Upon detection of a beam failure, the UE may generate an indication of the beam failure. In some examples, the beam failure indication indicates that all of the beams monitored by the UE have failed. In some examples, the beam failure indication indicates that one or more of the beams monitored by the UE have failed. In this latter case, the beam failure indication may include an identifier of each failed beam.

In some examples, a beam measurement to determine signal quality in a full-duplex communication scenario may involve measuring a signal-to-interference-plus-noise ratio (SINR). For example, the UE 904 may calculate an SINR parameter based on the measured downlink reference signals and the measured uplink reference signals. The UE may then determine the quality of the downlink (e.g., by comparing the SINR or a block error rate based on the SINR to a threshold). The UE may then identify candidate target beams or beam pairs for a new connection based on the measurements (e.g., by selecting a beam associated with the highest SINR). In some examples, the UE can identify DL beams paired with at least one current UL beam, and may measure candidate DL beams (e.g., up to 64 beams).

In some examples, instead of measuring signal quality in terms of RSRP and/or a signal-to-noise ratio (SNR) as may be done for conventional measurements, the UE may measure SINR, taking self-interference into consideration. For example, the UE may use the IMRs to measure self-interference from each of the one or more active UL beams to each candidate DL beam. Based on these measurements (e.g., upon identifying a beam associated with the highest SINR), the UE may identify a new target DL beam to be paired with a current UL beam in some examples.

In some examples, the UE may identify a new UL beam that may be paired with a current DL beam. For example, if the DL beam has a strong beam RSRP, then the UE may decide to keep the current DL beam and replace the current UL beam with the new UL beam. The decision on how beams are selected may be indicated by the gNB to the UE. Alternatively or in addition, the UE may recommend a beam or BPL to the gNB. In some examples, the UE may be configured with a look-up candidate beam pair table based on previous measurements, where the UE may recommend a new DL and UL beam pair for full-duplex communication. The gNB may decide which beam to keep for use and which beam to replace among the DL and UL beams (e.g., keep the stronger beam and replace the weaker beam). In cases where different UL beams are used for receiving DL transmissions and transmitting UL transmissions, the UE may switch one or both of these beams in some examples.

At block 928, the UE may generate and transmit new beam reporting information indicating the recommended new DL and/or UL beams to the gNB 902, based on the new target measurements determined at block 920. At block 930, the gNB 902 signals a new beam pair selection decision to the UE 904 and recovers the full-duplex mode.

Figure 10:
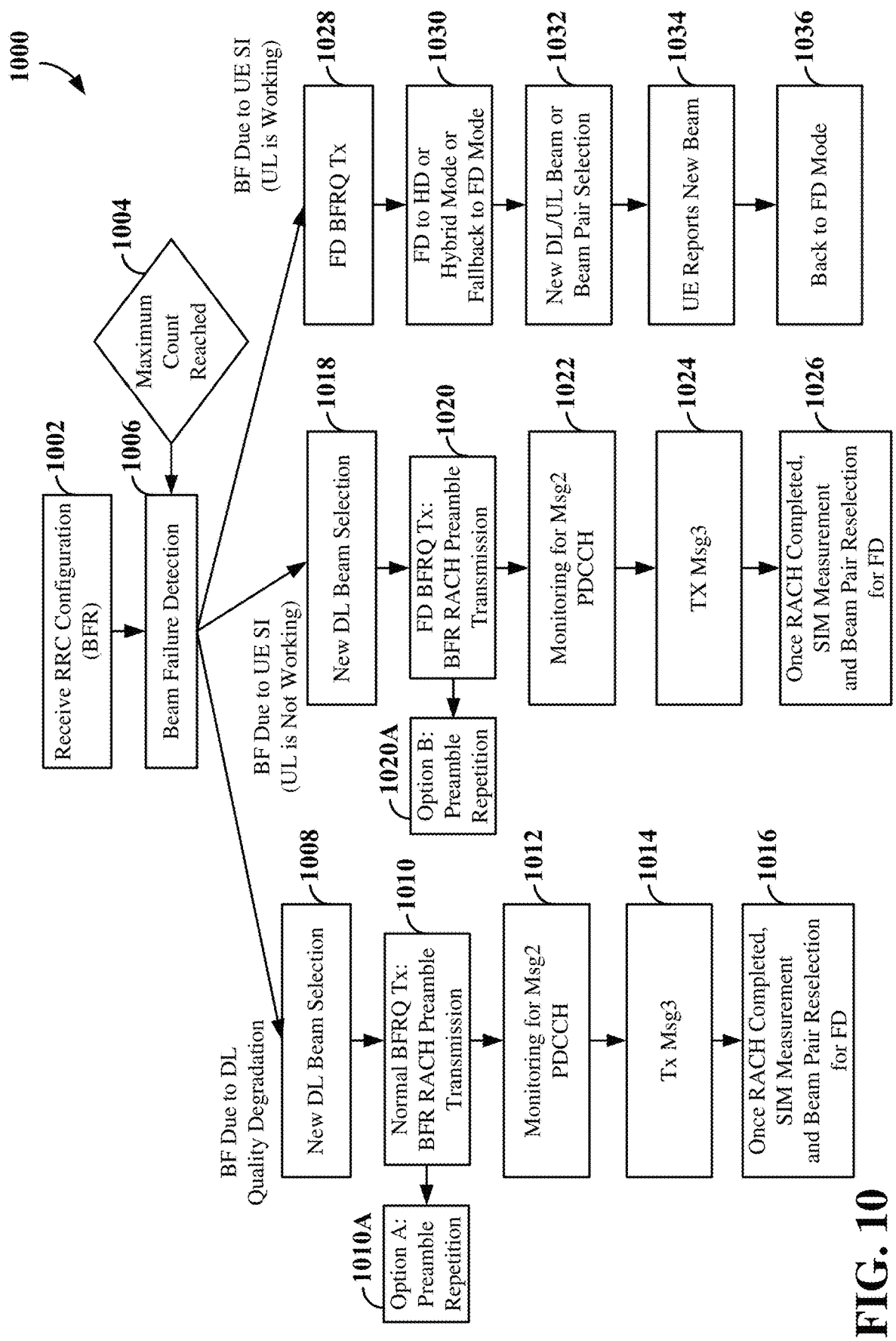
FIG. 10 is a flow chart of example beam failure-related operations according to some aspects.

As mentioned above, a beam failure may be based on downlink signal degradation and/or UE self-interference and a UE might or might not have a working uplink to its serving gNB. FIG. 10 illustrates different beam failure-related procedures that may be employed for these different scenarios, along with full-duplex mode recovery for the UE.

At block 1002, a UE receives an RRC configuration (e.g., a RadioLinkMonitoringConfig IE). For example, the UE may receive a configuration that specifies the parameters to be used for beam failure detection and beam failure recovery (e.g., a beamFailureInstanceMaxCount parameter, a beamFailureDetectionTimer parameter, an indication of CMRs, an indication of IMRs, etc.).

At block 1004, at some point in time, the UE determines whether the beam failure maximum count has been reached. As discussed herein, in some examples, the UE may determine whether an RSRP or an SINR measurement of a beam (or a set of beams) falls below a threshold a beamFailureInstanceMaxCount number of times within a period of time specified by the beamFailureDetectionTimer parameter.

If the maximum count is reached, the UE initiates a beam failure detection operation at block 1006. As discussed herein, the UE may indicate to a gNB whether the beam failure is due to downlink quality degradation or self-interference. In addition, if the uplink is working, the UE may send a beam failure recovery request to the gNB via uplink signaling. Conversely, if the uplink is not working, the UE may send a beam failure recovery request to the gNB via a RACH message.

The remaining blocks of FIG. 10 illustrate different beam failure recovery procedures for these different scenarios. Specifically, blocks 1008-1016 describe beam failure recovery procedures for a beam failure due to downlink quality degradation, blocks 1018-1026 describe beam failure recovery procedures for a beam failure due to UE self-interference when the uplink is not working, and blocks 1028-1036 describe beam failure recovery procedures for a beam failure due to UE self-interference when the uplink is working, as will be discussed in more detail below.

Blocks 1016 and 1026 of FIG. 10 may be utilized in cases where the beam failure is due to DL quality degradation or due to UE self-interference when the UL is not working. In each of these blocks, a new DL beam is selected (blocks 1008, 1018) and a RACH procedure is initiated (blocks 1010-1016, 1020-1024) in each instance. Once the RACH procedure is completed, the UE may engage in self-interference measurement and beam pair reselection for full-duplex communication recovery in blocks 1016 and 1026, respectively. Further details of these reselection and recovery procedures are discussed below in connection with FIGS. 14-15.

If the beam failure is due to UE self-interference and the UL is working, the UE may transmit a FD BFRQ at block 1028 and, at block 1030, engage in a temporary modification of the communication mode to remediate the effects of beam failure and eventually restore the operation to a FD communication mode as discussed above. At block 1032, the UE may perform self-interference measurements and determine new DL and/or UL beam or beam pair selection candidates, and then report the new beam candidates at block 1034. After receiving the new beam selection from the gNB, the UE may return back to full-duplex mode at block 1036.

Regarding blocks 1028 and 1030 of FIG. 10, after the determination and issuance of the beam failure indication 914 of FIG. 9, a temporary modification of the communication mode may be made to remediate the effects of beam failure and eventually restore the operation to an FD communication mode (e.g., at block 920 in FIG. 9 and blocks 1032, 1034, and 1036 in FIG. 10). In an aspect, the process 916 may include various different temporary modifications in response to the beam failure indication 914.

In one aspect, when the gNB 902 receives the beam failure indication or beam failure recovery request (BFRQ), the gNB 902 may cause switching from the FD mode to an HD mode, in part or in whole. In these cases, the time division multiplexed (TDM) transmissions inherent to HD operation are used to avoid the self-interference (SI) caused beam failure on the current or active DL and UL beam pair(s). In the case of a full failure where all active beams have failed, the switch may be made to a fully HD mode of communication. Alternately, if only a portion of the active beams fail, a selective or hybrid modification of the transmissions may be made where those active beams that failed are switched to HD mode, whereas the working beams in FD mode remain in FD mode.

In further aspects, it is noted that during the transition period of FD to HD mode, which may take some amount of time (e.g., a number of milliseconds in some cases), the gNB 902 may be configured to decide to further drop one of the DL or UL panels or, alternatively, to terminate both the DL and UL panels based on different criteria. Such criteria may include deciding to drop DL and/or UL transmissions based on a PHY layer priority field. For example, ultra-reliable low-latency communication (URLLC) traffic as prioritized in the PHY layer may be used to determine DL and/or UL dropping, such as dropping other traffic (and associated DL or UL transmissions thereof) in favor of URLLC traffic. In other examples, the criteria may include deciding to drop based on UE assistance information, such as maximum permitted exposure (MPE) levels, or thermal balancing and differences among Tx/UL and Rx/DL antenna arrays in a UE, such as dropping UL transmissions that would exceed an MPE limit or cause too much thermal imbalance where, for example, the UL transmissions are causing greater thermal generation than DL reception. In a further aspect, the gNB 902 may be configured to indicate the termination of FD UL traffic to the UE 904. In one example, periodic UL traffic may be configured. The indication by the gNB 902 may be effected through the reservation of some HD PDCCH slots that are used to convey the indication to the UE 904.

In still further aspects, after switching to HD mode (whether full or hybrid), the gNB 902 may be configured to further select which beams are to be used for the HD communication according to various criteria. In an aspect, the gNB may select the same beams as the FD beams or select beams that are different from the FD beams for DL and UL transmissions. In an example, the beam selection for the DL and the UL could be based on the strongest beam for each respective transmission (i.e., selection the UL and DL transmissions beams are independently based on the strongest beam for each direction). In an aspect, the determination of the strongest beam may be based on the DL or UL RSRP or SNR. In another example, the DL and UL may be configured to use the strongest beam among the available DL and UL beams and use that beam for both the UL and DL transmissions. In still other aspects, rather than necessarily utilizing the strongest beam, the gNB may be configured to directly select a beam for the HD configuration independent of the UE, or may be configured to receive a recommended HD beam from a UE.

In yet another aspect, the gNB 902 may be configured to switch to a limited or fallback FD mode after FD failure is detected, rather than switch to an HD mode. This limited FD mode may be particularly applicable in situations where the priority of the UL traffic is low, but is not necessarily limited to such as will be explained below. In a further aspect, the limited FD mode may include applying a UL power backoff in a UE to reduce the UL transmit (Tx) power if the UL traffic priority is low or has a lower modulation and coding scheme (MCS), where the power backoff serves to reduce the self-interference caused by the UL transmissions. Additionally, the UE may be further configured to utilize UL repetition (i.e., multiple repetitive transmissions of the same traffic or data) when the UL power backoff is applied to increase the likelihood of successful reception of the data or traffic when transmitted at lower power levels.

In another aspect, the failed FD beam pair may be replaced (either by the gNB or the UE) with a backup or substitute FD beam pair regardless of whether the UL traffic priority is low or high. Additionally for this case, the UE may be configured to not apply the UL power backoff for the cases where the UL priority is high. In still other aspects, the DL beam or the UL beam could be reselected whereas the UL beam remains the same in this limited FD scheme. Alternatively, if the UL priority is high, the gNB or UE may be configured to switch to the HD or hybrid HD mode discussed above rather than remaining in or attempting to use the limited FD mode.

It is noted that aspects of the processes for switching to HD, hybrid HD, and limited FD modes may be implemented in a base station or gNB, a UE, or with some combination thereof. Further details of these communication mode modification procedures are discussed below in connection with FIG. 16.

As mentioned above, the disclosure relates in some aspects to downlink beam failure detection for a scenario where the downlink beam failure is due to self-interference and/or due to downlink quality degradation. In contrast with conventional downlink beam failure detection that may be based on downlink signal-to-noise ratio (SNR) measurement or RSRP measurements, for full-duplex operation, downlink beam failure detection may be based on SINR measurements by a UE (e.g., using IMRs for self-interference measurements). As mentioned above, if an SINR measurement for a beam does not meet an SINR threshold, the PHY layer may generate a beamFailureInstance indication and send the indication to the MAC layer along with the beamFailureInstanceMaxCount and beamFailureDetectionTimer information.

In some examples (e.g., Option 1), the beamFailureInstance indication is a full failure indication. Here, the indication may indicate that all monitored RLM-RSs fall below a threshold. Thus, the UE may be triggered to generate a beamFailureInstance indication to the MAC layer in this case upon determining that every monitored beam has failed.

In some examples, (e.g., Option 2), the beamFailureInstance indication is a partial failure indication. Here, the indication may indicate that less than all of the monitored RLM-RSs fall below a threshold. For example, if there are two active CORESET beams for the UE and one of the CORESET beams fails, UE may be triggered to generate a beamFailureInstance indication to the MAC layer. For the latter example, the MAC layer may maintain different counters and detection timers for different active beams.

In some examples, a UE may determine whether a beam failure is caused by a downlink quality degradation or self-interference. For example, a UE may detect a beam failure caused by a downlink quality degradation based on CMR measurements only. Conversely, a UE may detect a beam failure caused by self-interference detected based on CMR measurements and interference measurement resource (IMR) measurements.

In view of the above, an RLM-RS configuration for full-duplex beam measurements may specify two categories of reference signals: one for CMRs (e.g., SSB or CSI-RS) and one for IMRs (e.g., SRS or DMRS). For example, an IE RadioLinkMonitoringConfig may specify CMR resources (e.g., SSB resources or CSI-RS resources) that the UE is to monitor for downlink beam quality measurement operations. In addition, the IE RadioLinkMonitoringConfig may specify IMR resources (e.g., SRS resources) that the UE is to use for self-interference measurement operations.

Figure 11:
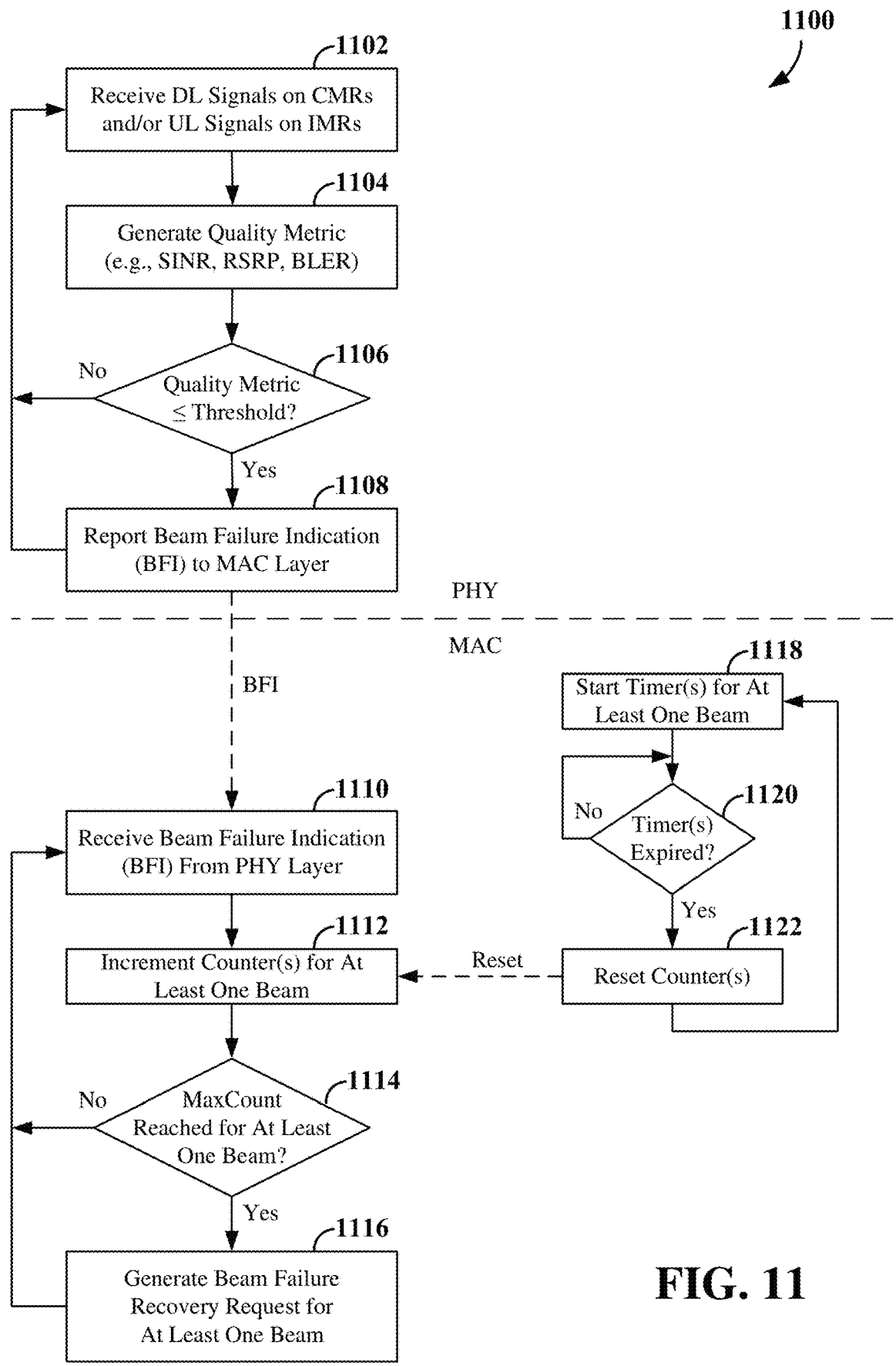
FIG. 11 is a flow chart of example beam failure detection operations according to some aspects.

FIG. 11 is a flow chart illustrating an example beam failure recovery method 1100 for a device in accordance with some aspects of the present disclosure. As described below, some or all illustrated features may be omitted in a particular implementation within the scope of the present disclosure, and some illustrated features may not be required for implementation of all examples. In some examples, one or more operations for the method 1100 may be carried out by a UE or a base station (e.g., a gNB). In some examples, the method 1100 may be carried out by any suitable apparatus or means for carrying out the functions or algorithm described below.

In the example of FIG. 11, blocks 1102 to 1108 describe measurement-related operations that may be performed at a PHY layer of the device, while blocks 1110 to 1122 describe beam failure-related operations that may be performed at a MAC layer of the device. One or more of these operations could be performed at a different protocol layer in other examples.

At block 1102, the device (e.g., a UE or gNB) may receive downlink signals on CMRs and/or receive uplink signals on IMRs according to a schedule specified by a gNB (e.g., the schedule may specify the time slots and frequency bands to use for beam measurements). For example, to determine whether there is a beam failure due to downlink quality degradation, a UE may measure SSBs or CSI-RSs from a gNB. In addition, to determine whether there is a beam failure due to self-interference by the UE, the UE may measure SSBs or CSI-RSs from a gNB and measure SRSs or DMRSs transmitted by the UE. As another example, to determine whether there is a beam failure due to uplink quality degradation, a gNB may measure SRSs or DMRSs transmitted by a UE. Also, to determine whether there is a beam failure due to self-interference by the gNB, the gNB may measure SRSs or DMRSs transmitted by a UE and measure SSBs or CSI-RSs transmitted by the gNB.

At block 1104, the device generates a quality metric for a given signal measurement. In some examples, a UE may measure the RSRP of a received downlink reference signal. In this case, the quality metric could simply be the measured RSRP.

In some examples, a UE may combine its measurements of a downlink reference signal and an uplink reference signal to measure an SINR quality metric for the downlink reference signal. Here, a first panel of the UE may transmit the uplink reference signal and a second panel of the UE may measure the downlink reference signal transmitted by the gNB and the uplink reference signal transmitted by the first panel.

In some examples, a UE may calculate a block error rate (BLER) quality metric based on a measured SINR or some other parameter. In some examples, the SINR may be defined as the signal strength measured on CMRs divided by the sum of the interference strength (e.g., self-interference measured on IMRs) and the strength of background noise. In some cases, the background noise may be assigned a fixed value.

In some examples, a gNB may measure the RSRP of a received uplink reference signal. In this case, the quality metric could simply be the measured RSRP.

In some examples, a gNB may combine its measurements of an uplink reference signal and a downlink reference signal to measure an SINR quality metric for the uplink signal. Here, a first panel of the gNB may transmit the downlink reference signal and a second panel of the gNB may measure the uplink reference signal transmitted by a UE and the downlink reference signal transmitted by the first panel.

In some examples, a gNB may calculate a block error rate (BLER) quality metric based on a measured SINR or some other parameter. In some examples, the SINR may be defined as the signal strength measured on IMRs divided by the sum of the interference strength (e.g., self-interference measured on CMRs) and the strength of background noise. In some cases, the background noise may be assigned a fixed value.

At block 1106, the device determines whether the quality metric (e.g., RSRP, SINR, or BLER) is less than or equal to a threshold. In some examples, the threshold may correspond to a BLER of 10%. Other thresholds may be used in other examples. If the quality metric is not less than or equal to a threshold, the operational flow proceeds back to block 1102 where the device continues monitoring for reference signals.

On the other hand, if the quality metric is less than or equal to a threshold at block 1106, the operational flow proceeds to block 1108. At block 1108, the device reports a beam failure indication to the MAC layer. The operational flow for the PHY layer then proceeds back to block 1102 and the operations are repeated for the next set of measurements. Thus, each time a beam failure is detected at the PHY layer, the PHY layer sends a beam failure indication to the MAC layer.

The beam failure indication may indicate beam failure of one beam or multiple beams. For the full failure indication discussed above, the operations of blocks 1102 to 1106 may be performed for each of the active beams of the device. In this case, the PHY layer may send the beam failure indication if all of the beams failed (e.g., the quality metric for each beam fell below the threshold). For the partial failure indication discussed above, the operations of blocks 1102-1108 may be performed independently for each of the active beams of the device. In this case, the PHY layer may send the beam failure indication if one of the beams failed (e.g., the quality metric for that beam fell below the threshold), including an identifier of the failed beam.

The operations of blocks 1110 to 1114 are performed at the MAC layer of the device every time the MAC layer receives a beam failure indication from the PHY layer.

At block 1110, the MAC layer receives a particular instance of a beam failure indication from the PHY layer.

At block 1112, the device increments a counter as a result of receiving the beam failure indication. For the full failure indication discussed above, the counter may keep track of the number of times all of the beams failed. For the partial failure indication discussed above, the counter may keep track of the number of times a particular beam failed. In this latter case, the MAC layer may maintain separate counters for different beams (e.g., counter 1 for beam 1, counter 2 for beam 2, etc.).

At block 1114, the device determines whether the counter incremented at block 1112 has reached a defined maximum count (e.g., beamFailureInstanceMaxCount). If not, the operational flow proceeds back to block 1110 where the MAC layer waits to receive the next instance of a beam failure indication from the PHY layer.

On the other hand, if the counter has reached the defined maximum count at block 1114, the operational flow proceeds to block 1116. At block 1116, the device generates a beam failure recovery request (BFRQ). For example, a UE may generate the BFRQ (e.g., indicating whether all active beams failed or a particular active beam failed) and transmit the BFRQ to the gNB that serves the UE. As another example, a gNB may generate the BFRQ (e.g., indicating whether all active beams for a UE failed or a particular active beam for the UE failed) and transmit the BFRQ to that UE. In some examples, the BFRQ may include an indication of whether the beam failure is due to downlink quality degradation and/or due to self-interference. The operational flow for the PHY layer then proceeds back to block 1110 where the MAC layer waits to receive the next instance of a beam failure indication from the PHY layer.

The MAC layer may also maintain one or more timers (or counters) that control the beam failure detection time. For the full failure indication discussed above, a single timer (or counter) may be used. For the partial failure indication discussed above, multiple timers (or counters) may be used where a given timer may be used for a particular beam. For example, the MAC layer may maintain timer 1 for beam 1, timer 2 for beam 2, and so on.

At block 1118, the device starts (e.g., resets) a given timer. At block 1120, the device may repeatedly (e.g., periodically) check whether the timer has expired. Once the timer expires (e.g., a period of time corresponding to beamFailureDetectionTimer has elapsed since the timer was started), the device resets a corresponding counter that is used at block 1112. For example, a timer for all beams may reset a counter for all beams, a timer for beam 1 may reset a counter for beam 1, a timer for beam 2 may reset a counter for beam 2, and so on. Once the corresponding counter is reset (or counters are reset), the operation flow proceeds back to block 1118. The device may thus generate a BFRQ if a beam or a set of beams fails a defined number of times (e.g., beamFailureInstanceMaxCount) within a defined period of time per each time or for all times (e.g., beamFailureDetectionTimer).

Figure 12:
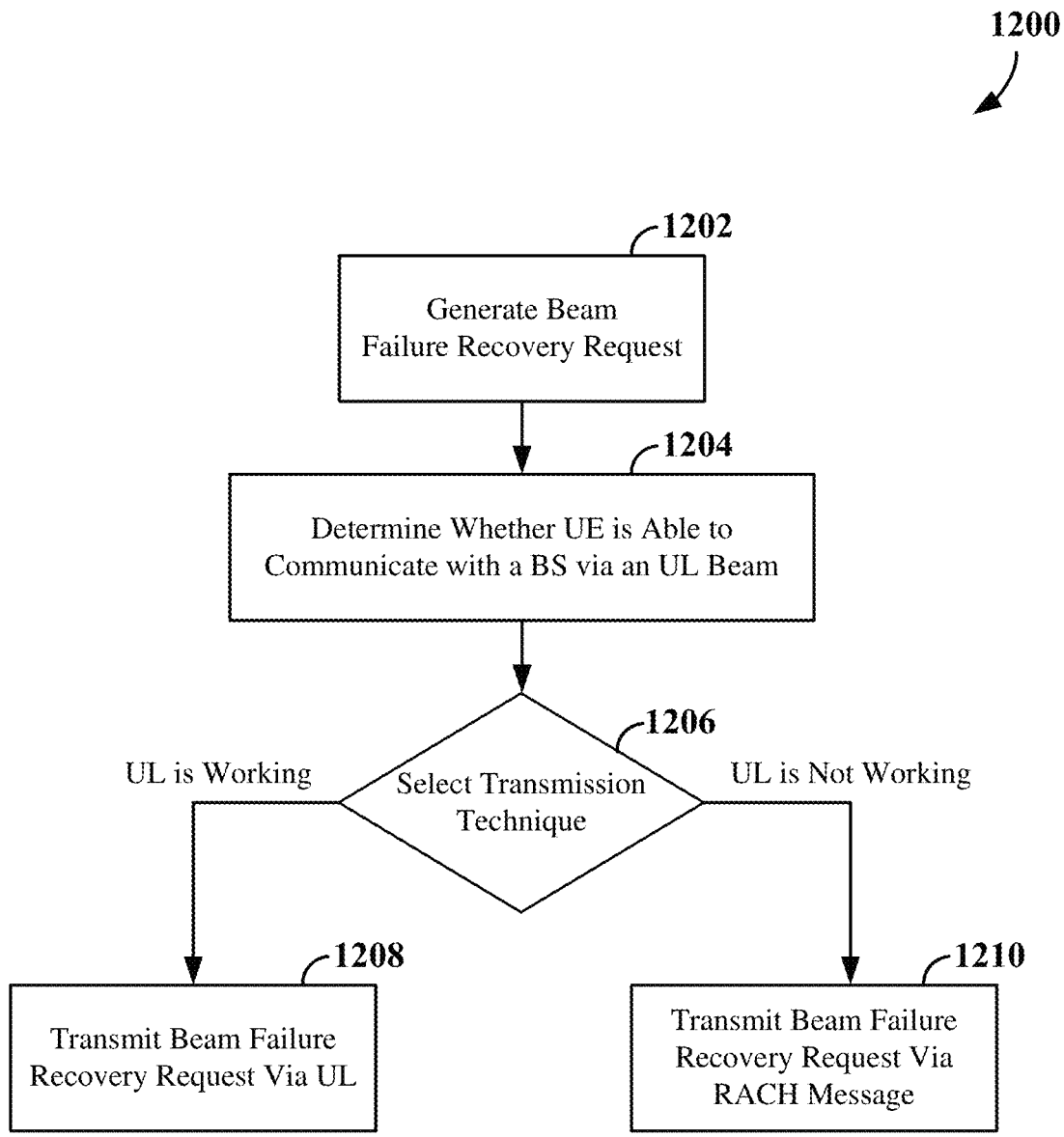
FIG. 12 is a flow chart of example beam failure reporting operations according to some aspects.

FIG. 12 is a flow chart illustrating an example beam failure reporting method 1200 for a UE in accordance with some aspects of the present disclosure. As described below, some or all illustrated features may be omitted in a particular implementation within the scope of the present disclosure, and some illustrated features may not be required for implementation of all examples. In some examples, the method 1200 may be carried out by the UE 1700 of FIG. 17, or by any suitable apparatus or means for carrying out the functions or algorithm described below.

At block 1202, the UE generates a beam failure recovery request (BFRQ). For example, a UE may generate a BFRQ as described above in conjunction with FIG. 11.

At block 1204, the UE determines whether it is able to communicate with a base station via an uplink beam (e.g., the UE determines whether the uplink is currently working). For example, the UE may determine whether information the UE sent to the base station is acknowledged by the base station. For a beam failure due to UE self-interference, the uplink and the downlink may each be fully functional independent of the other beam. That is, the beam failure might only occur when there are transmissions on both beams at the same time. In this case, the beams could still be fully functional otherwise (e.g., when a half-duplex communication mode is used).

At block 1206, the UE selects a transmission technique for transmitting the BFRQ to the base station based on whether the UE is able to communicate with a base station via the uplink beam. For example, if the uplink is working, the UE may transmit the BFRQ to the base station via uplink signaling (e.g., on PUCCH or PUSCH) at block 1208. Conversely, if the uplink is not working, the UE may transmit the BFRQ to the base station via a BFR RACH message at block 1210. As mentioned above, the BFRQ may indicate whether the beam failure at the UE is due to downlink quality degradation and/or UE self-interference.

For the scenario of block 1210 where the UE transmits the BFRQ via a BFR RACH message (e.g., a RACH preamble), the UE may select a new target beam for the BFR RACH. As mentioned above, a BFR RACH may be sent for a beam failure due to downlink quality degradation or a BFR RACH may be sent for a beam failure due to UE self-interference when the uplink is not working.

Referring again to blocks 1008-1014 of FIG. 10, a RACH procedure for a beam failure at the UE due to downlink quality degradation may involve the UE selecting a new downlink beam at block 1008 and UE transmitting the BFRQ via a BFR RACH preamble (e.g., without FD) at block 1010. As represented by block 1010A, in some examples, the preamble may be transmitted repeatedly (e.g., up to N−1 times). This preamble repetition may use receive (Rx) beam sweeping to find the best beam to pair with the transmit (Tx) beam as a new DL and UL beam pair to recover FD communication. The UE may then monitor for Msg2 on the PDCCH at block 1012, and transmit Msg3 to the gNB at block 1014. In some examples, Msg3 may include an indication of the best beam pair identified at block 1010A.

Referring again to blocks 1018-1024 of FIG. 10, a RACH procedure for a beam failure at the UE due to downlink quality degradation may involve the UE selecting a new downlink beam at block 1018 and UE transmitting the BFRQ via a BFR RACH preamble (e.g., using FD transmission) at block 1020. As represented by block 1020A, in some examples, the preamble may be transmitted repeatedly (e.g., up to N−1 times). This preamble repetition may use Rx beam sweeping to find the best beam to pair with the Tx beam as a new DL and UL beam pair to recover FD communication. The UE may then monitor for Msg2 on the PDCCH at block 1022, and transmit Msg3 to the gNB at block 1024. In some examples, Msg3 may include an indication of the best beam pair identified at block 1020A.

Figure 13:
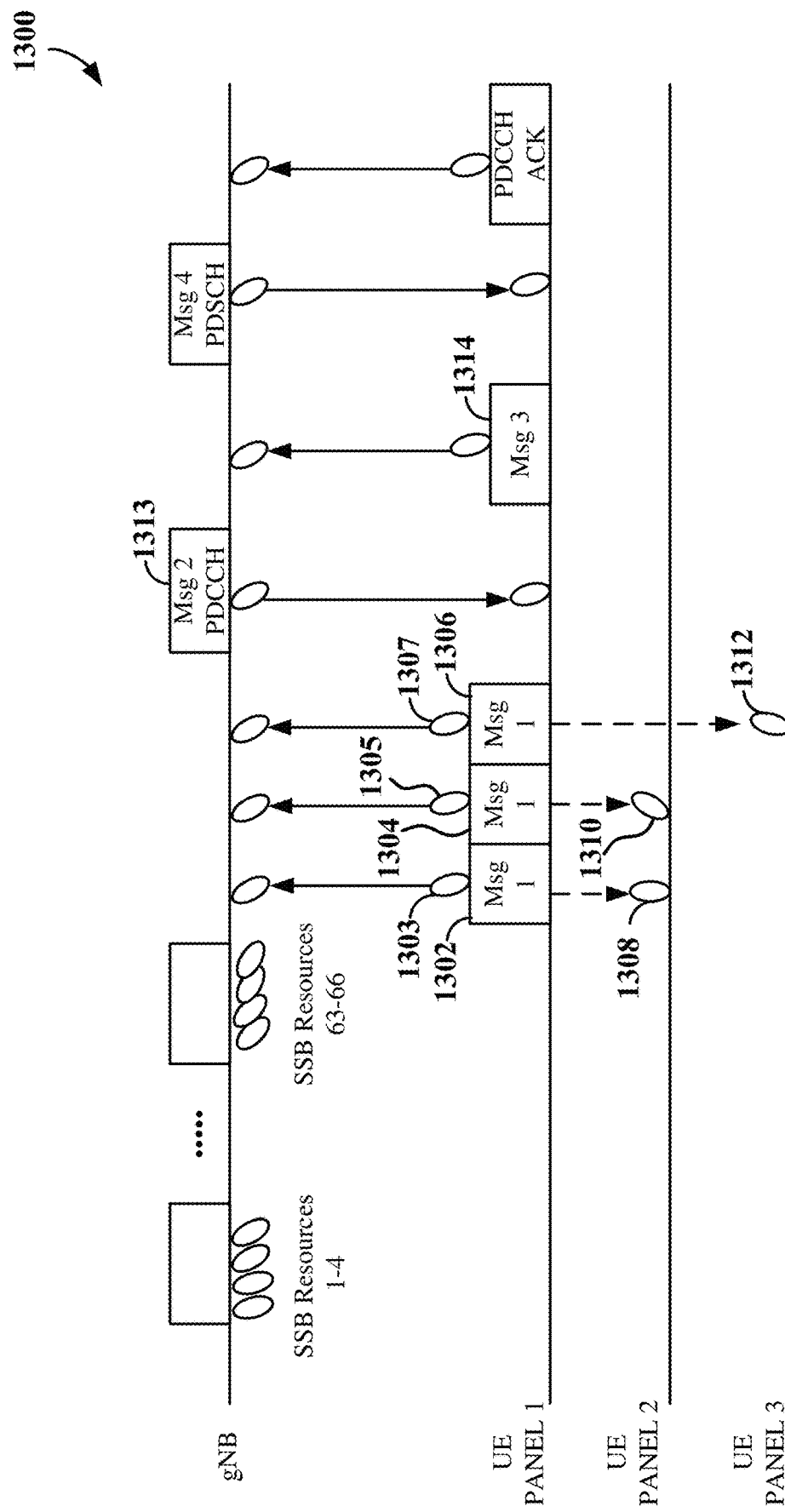
FIG. 13 is a signaling diagram illustrating an example random access channel (RACH) procedure according to some aspects.

FIG. 13 illustrates an example of signaling 1300 for a RACH procedure. A gNB may sweep SSBs on designated resources (e.g., resources 1-4 are used for a first SSB sweep, resources 5-8 are used for a second SSB sweep, and so on). Thus, the UE may identify a gNB to be accessed via a RACH procedure based on the SSBs. As mentioned above, for a scenario where the UE transmits the BFRQ via a RACH message (e.g., a RACH preamble), the RACH procedure may involve the UE selecting the target beam for the BFR RACH (e.g., selecting the best combination of an SSB Tx beam from the gNB and a Rx beam at the UE).

In some examples, for a CFRA procedure, two RACH preambles per UE may be reserved and configured by the gNB to differentiate a regular downlink quality degradation caused failure from an FD self-interference caused failure. That is, the gNB may configure a first RACH preamble for reporting a beam failure caused by downlink quality degradation. In addition, the gNB may configure a second RACH preamble for reporting a beam failure caused by FD self-interference. In this way, a gNB that receives a RACH preamble may determine the reason for the beam failure from the received RACH preamble (e.g., based on the type of received RACH preamble).

A similar approach may be used for a contention-based random access (CBRA) procedure. For example, two sets of RACH preamble pools may be reserved and configured by the gNB to differentiate a downlink quality degradation caused beam failure from an FD self-interference caused beam failure. That is, the gNB may configure a first RACH preamble pool for reporting a beam failure caused by downlink quality degradation. In addition, the gNB may configure a second RACH preamble pool for reporting a beam failure caused by FD self-interference. In this way, a gNB that receives a RACH preamble may determine the reason for the beam failure from the received RACH preamble (e.g., based on the physical RACH (PRACH) preamble pool associated with the received RACH preamble).

In the example of FIG. 13, to recover the FD mode with a new DL and UL beam pair, the RACH preamble Msg1 (or Msg3 or MsgA) is repeated N−1 times. For example, the UE may transmit Msg1 on RACH occasion 1 1302 (e.g., using a first Tx beam 1303), transmit Msg1 on RACH occasion 2 1304 (e.g., using a second Tx beam 1305), and transmit Msg1 on RACH occasion 3 1306 (e.g., using a third Tx beam 1307). In some examples, each of these RACH preambles may include the same information (e.g., the RACH preambles may be identical).

For each repetition, the UE may monitor the RACH transmissions using one or more panels. In some examples, the UE may simultaneously monitor the RACH preambles (e.g., sweeping with different beams) to identify the best beam. In the example of FIG. 13, panel 2 of the UE is shown monitoring RACH occasion 1 (e.g., using a first receive beam 1308). Panel 2 of the UE is also shown monitoring RACH occasion 2 (e.g., using a second receive beam 1310). In addition, panel 3 of the UE is shown monitoring RACH occasion 3 (e.g., using a third receive beam 1312). Here, for each repetition, the UE may select one applicable Rx beam within a set of candidate Rx beams with good (e.g., the best) SSB RSRP.

Upon receiving the Msg1 transmissions, the gNB transmits Msg2 1313 to the UE (e.g., on a Tx beam that corresponds to a Rx beam the gNB used to successfully receive Msg1). In some examples, Msg2 1313 may identify the RACH occasion that resulted in the strongest reception of Msg1 so that the UE may identify the best UE beam to use for communicating with the gNB.

In some examples, the UE may identify the best new UL+DL beam pair with the lowest cross-beam (xBeam) RSRP and send a report identifying this beam pair to the gNB. Such a report may be included in a Msg3 1314, in a MsgA payload, or in separate signaling along with corresponding SSB IDs.

As mentioned above, the disclosure relates in some aspects to identifying one or more new target beam pair candidates during a beam failure detection and recovery procedure. A UE may transmit a request for recovering a full-duplex transmission mode to a base station, where the request includes the identified one or more new target beam pair candidates. In response, the base station may transmit to the UE a new downlink and uplink beam pair to recover for the full-duplex transmission mode from the scheduling entity.

Figure 14:
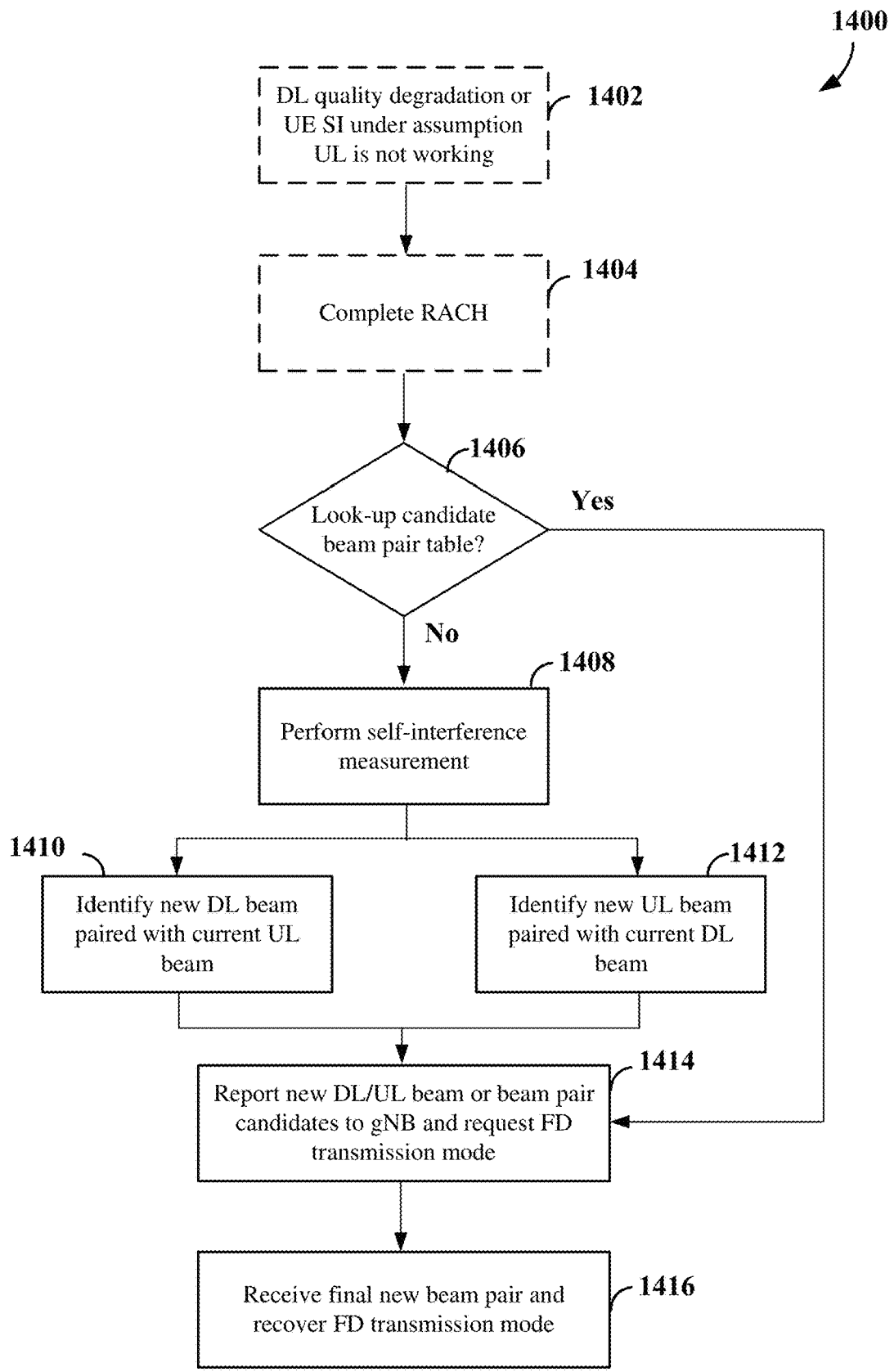
FIG. 14 is a flow chart of an example of beam and beam pair identification for full-duplex recovery according to some aspects.

FIG. 14 is a flow chart illustrating an example beam recovery method 1400 for a UE in accordance with some aspects of the present disclosure. As described below, some or all illustrated features may be omitted in a particular implementation within the scope of the present disclosure, and some illustrated features may not be required for implementation of all examples. In some examples, the method 1400 may be carried out by the UE 1700 of FIG. 17, or by any suitable apparatus or means for carrying out the functions or algorithm described below.

Block 1402 indicates a beam failure (e.g., as discussed above in connection with FIG. 10), where the beam failure is due either to DL quality degradation or UE self-interference, and where the UL is not working or operational. At block 1404, the UE completes a RACH procedure as described above at blocks 1008-1014 or 1018-1024 of FIG. 10. In some examples, blocks 1402 and 1404 are optional and may be used only when the UL is not working and an initial connection is required. Once an UL is operational, the UE may determine at decision block 1406 whether a look-up candidate beam pair table is stored in memory. The candidate beam pair table may include one or more UL and/or DL beam pairs from previous measurements that meet or exceed threshold parameters for a sufficiently strong signal quality. If look-up candidate beam pairs are determined from the table (YES at block 1406), the flow proceeds to block 1414, where the UE reports the new DL and/or UL beam or beam pair candidate IDs to the gNB and requests full-duplex transmission mode communication.

If the UE does not identify look-up candidate beam pairs from the table (NO at block 1406), the UE performs self-interference measurements at block 1408. Depending on the configuration, the UE may optionally identify either a new DL beam paired with a current UL beam at block 1410, or a new UL beam paired with a current DL beam at block 1412. At block 1410, the UE may measure candidate DL beams (e.g., up to 64 beams), using SINR to take self-interference into consideration and use IMRs to measure from each of the active UL beams to each candidate DL beam, in which the UE will identify one or more candidate DL beams, paired with each of the current UL beam, for replacement during recovery. Alternately, at block 1412, the UE may identify one or more UL beams paired with each of the current DL beam as candidate(s) for replacement during recovery. For example, if the DL has a stronger beam signal (e.g., RSRP), then the current (stronger) DL beam may be kept, and the current UL beam would be replaced with a new UL beam. The decision on whether to use block 1410 or 1412 may be indicated by the gNB to the UE. Alternatively or in addition, the UE may recommend which option to use (e.g., block 1410 or 1412) to the gNB. At block 1414, the UE reports the new DL and/or UL beam or beam pair candidate IDs to the gNB and requests full-duplex transmission mode communication. The gNB responds at block 1416 and the UE receives the final new beam pair that is used to recover the full-duplex transmission mode.

Figure 15:
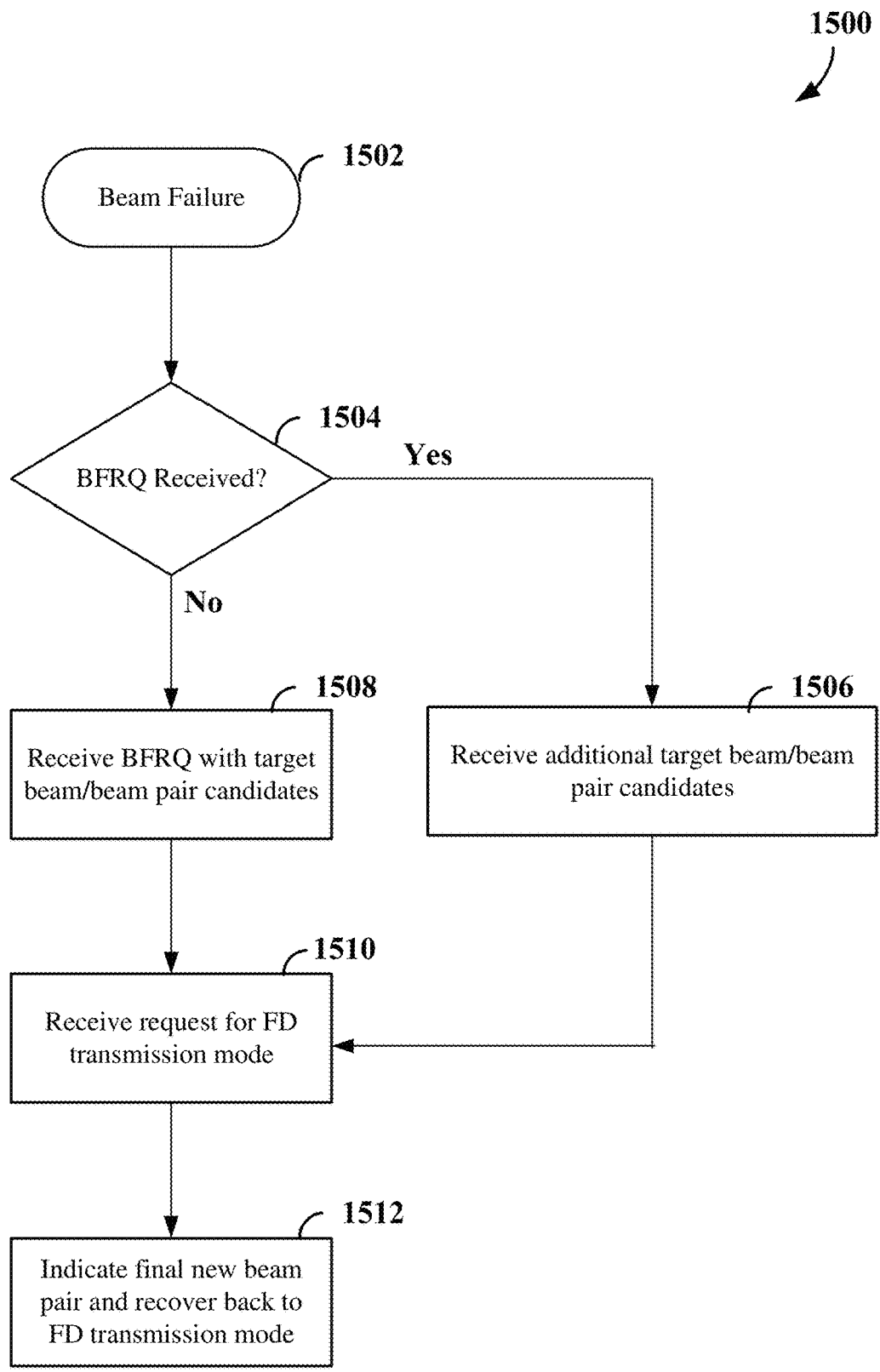
FIG. 15 is a flow chart of an example of processing a beam failure recovery request and indicating beam pair(s) according to some aspects.

FIG. 15 is a flow chart illustrating an example beam recovery method 1400 for a UE from the perspective of a gNB in accordance with some aspects of the disclosure. As described below, some or all illustrated features may be omitted in a particular implementation within the scope of the present disclosure, and some illustrated features may not be required for implementation of all examples. In some examples, the method 1500 may be carried out by the UE 1700 of FIG. 17, or by any suitable apparatus or means for carrying out the functions or algorithm described below.

The method 1500 begins at block 1502, where a beam failure has occurred. At decision block 1504, the gNB determines whether a beam failure recovery request (BFRQ) has been received from the UE. If the BFRQ has been received (YES at block 1504), the flow continues to block 1506 wherein the gNB receives additional data (e.g., via UCI, PUSCH, etc.) indicating the identification of target beam(s) and/or beam pair candidates. The flow then proceeds to block 1510, where the gNB receives the request for full-duplex transmission mode.

If the gNB has not received a BFRQ (NO at block 1504), the gNB may subsequently receive a BFRQ along with target beam(s) and or beam pair candidates at block 1508. At block 1510, the gNB may then receive the request from the UE for a full-duplex transmission mode connection. At block 1512, the gNB determines a final new beam pair for full-duplex recovery and transmits the information back to the UE to establish full-duplex mode communication.

As mentioned above, the disclosure relates in some aspects to recovering to normal FD operation after a beam failure. A base station and/or a user equipment (UE) may be configured to temporarily switch from FD communication to a half-duplex (HD) operation where either all active beams for the UE and/or the base station are switched to HD operation in the event of all beams failed, or a portion of the beams are switched to a hybrid mode of both HD and FD operation in the event only a portion of the beams failed. The base station or UE may alternatively be switched to a limited FD operation after a detected beam failure that implements power backoff or a substitute beam to handle the beam failure and recover to normal FD operation.

Figure 16:
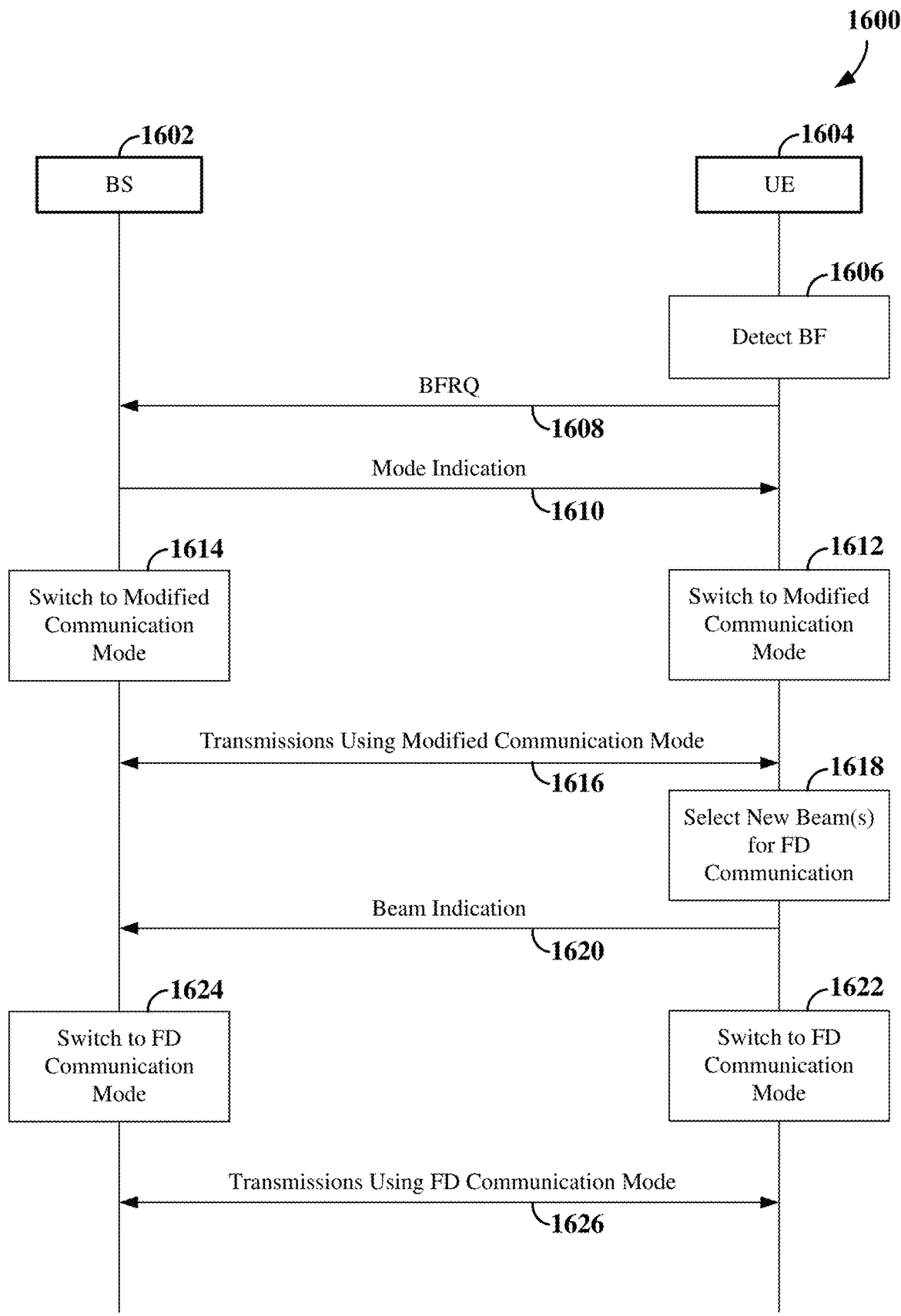
FIG. 16 is a signaling diagram illustrating an example signaling for a modified communication mode according to some aspects.

FIG. 16 is a signaling diagram 1600 illustrating an example of signaling in a wireless communication system including a base station (BS) 1602 and a user equipment (UE) 1604. In some examples, this signaling may be used for switching from FD communication to one of HD, hybrid HD, or limited FD modes of communication when a beam failure occurs. In some examples, the BS 1602 may correspond to any of the base stations or scheduling entities shown in any of FIGS. 1, 2, 4, 5, 7A, 7B, 7C, 9, 13, and 24. In some examples, the UE 1604 may correspond to any of the UEs or scheduled entities shown in any of FIGS. 1, 2, 4, 5, 7A, 7B, 7C, 9, 13, and 17.

At 1606 of FIG. 16, the UE 1604 may detect a beam failure on one or more beams that are being used for communication (e.g., FD communication) with the BS 1602. For example, the UE 1604 may detect a beam failure as discussed above in conjunction with FIG. 11.

At 1608, the UE 1604 may transmit a BFRQ to the BS 1602. For example, the UE 1604 may transmit a BFRQ via an uplink beam, if available, or via a RACH procedure as discussed above in conjunction with FIG. 12.

At 1610, the BS 1602 may transmit a mode indication to the UE 1604. In some examples, the mode indication may specify that an HD communication mode is to be used for each failed beam and that an FD communication mode is to be used for the remaining beams (e.g., the beams that are active). In some examples, the mode indication may specify that an HD communication mode is to be used for all beams (e.g., active beams and failed beams). Other communication modes may be specified in other examples.

As discussed above, in the case of a full failure where all active beams have failed, a switch may be made to a fully HD mode of communication. Alternately, if only a portion of the active beams fail, a selective or hybrid modification of the transmissions may be made where those active beams that failed are switched to HD mode, whereas the working beams in FD mode remain in FD mode. Also, after switching to HD mode (whether full or hybrid), the BS 1602 may select which beams are to be used for the HD communication according to various criteria. Also as discussed above, in some cases, the BS 1602 may elect to switch to a limited or fallback FD mode after FD failure is detected, rather than switch to an HD mode.

At 1612, the UE 1604 switches to the modified communication mode specified by the mode indication for a subsequent communication between the BS 1602 and the UE 1604. Similarly, at 1614, the BS 1602 switches to the modified communication mode specified by the mode indication for the subsequent communication between the BS 1602 and the UE 1604. Thus, at 1616, the BS 1602 may transmit to the UE 1604 using the modified communication mode and/or the UE 1604 may transmit to the BS 1602 using the modified communication mode.

At 1618, the UE 1604 may select one or more new beams to be used for FD communication with the BS 1602. For example, the UE 1604 may identify the best available UL/DL beam pair.

At 1620, the UE 1604 may transmit to the BS 1602 an indication of the beam(s) selected at 1618. For example, the UE 1604 may transmit the indication via a beam using the modified communication mode.

At 1622, the UE 1604 switches to the FD communication mode for a subsequent communication between the BS 1602 and the UE 1604. Similarly, at 1624, the BS 1602 switches to the FD communication mode for the subsequent communication between the BS 1602 and the UE 1604. Thus, at 1626, the BS 1602 may transmit to the UE 1604 using the FD communication mode and the UE 1604 may transmit to the BS 1602 using the FD communication mode.

Figure 17:
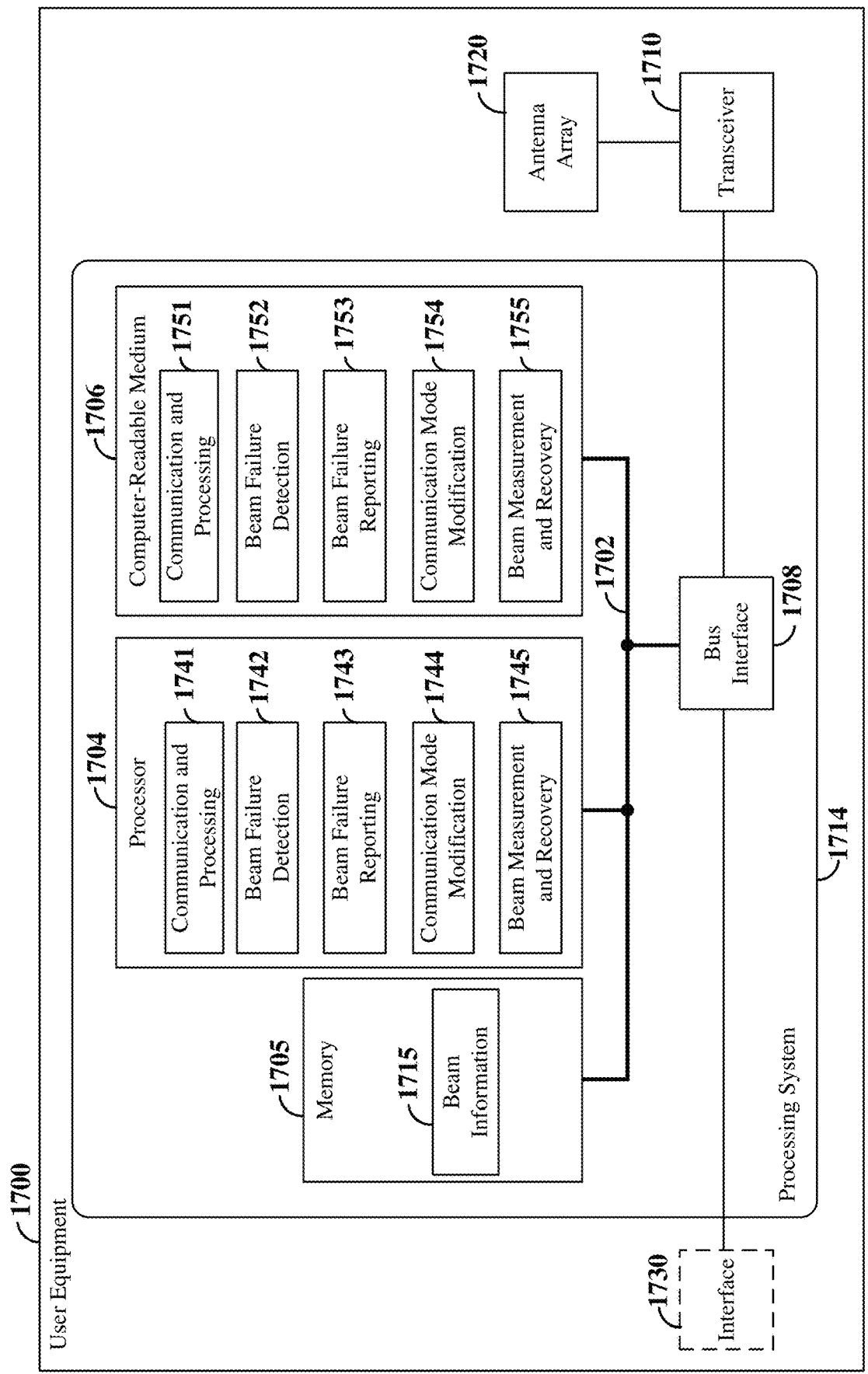
FIG. 17 is a block diagram conceptually illustrating an example of a hardware implementation for a user equipment employing a processing system according to some aspects.

FIG. 17 is a block diagram illustrating an example of a hardware implementation for a user equipment (UE) 1700 employing a processing system 1714. For example, the UE 1700 may be a device configured to wirelessly communicate with base station, as discussed in any one or more of FIGS. 1-16. In some implementations, the UE 1700 may correspond to any of the UEs or scheduled entities shown in any of FIGS. 1, 2, 4, 5, 7A, 7B, 7C, 9, 13, and 16.

In accordance with various aspects of the disclosure, an element, or any portion of an element, or any combination of elements may be implemented with the processing system 1714. The processing system 1714 may include one or more processors 1704. Examples of processors 1704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1700 may be configured to perform any one or more of the functions described herein. That is, the processor 1704, as utilized in a UE 1700, may be used to implement any one or more of the processes and procedures described herein.

The processor 1704 may in some instances be implemented via a baseband or modem chip and in other implementations, the processor 1704 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

The processing system 1714 may be implemented with a bus architecture, represented generally by the bus 1702. The bus 1702 may include any number of interconnecting buses and bridges depending on the specific application of the processing system 1714 and the overall design constraints. The bus 1702 communicatively couples together various circuits including one or more processors (represented generally by the processor 1704), a memory 1705, and computer-readable media (represented generally by the computer-readable medium 1706). The bus 1702 may also link various other circuits such as timing sources, peripherals, voltage regulators, and power management circuits, which are well known in the art, and therefore, will not be described any further. A bus interface 1708 provides an interface between the bus 1702 and a transceiver 1710 and an antenna array 1720, and an interface between the bus 1702 and an interface 1730. The transceiver 1710 provides a communication interface or means for communicating with various other apparatus over a wireless transmission medium. The interface 1730 provides a communication interface or means of communicating with various other apparatuses and devices (e.g., other devices housed within the same apparatus as the UE 1700 or other external apparatuses) over an internal bus or external transmission medium, such as an Ethernet cable. Depending upon the nature of the UE 1700, the interface 1730 may include a user interface (e.g., keypad, display, speaker, microphone, joystick). Of course, such a user interface is optional, and may be omitted in some examples, such as an IoT device.

The processor 1704 is responsible for managing the bus 1702 and general processing, including the execution of software stored on the computer-readable medium 1706. The software, when executed by the processor 1704, causes the processing system 1714 to perform the various functions described below for any particular apparatus. The computer-readable medium 1706 and the memory 1705 may also be used for storing data that is manipulated by the processor 1704 when executing software. For example, the memory 1705 may store beam information 1715 used by the processor 1704 for communication operations as described herein.

One or more processors 1704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1706.

The computer-readable medium 1706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1706 may reside in the processing system 1714, external to the processing system 1714, or distributed across multiple entities including the processing system 1714. The computer-readable medium 1706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1700 may be configured to perform any one or more of the operations described herein (e.g., as described above in conjunction with FIGS. 1-16 and as described below in conjunction with FIGS. 18-23). In some aspects of the disclosure, the processor 1704, as utilized in the UE 1700, may include circuitry configured for various functions.

The processor 1704 may include communication and processing circuitry 1741. The communication and processing circuitry 1741 may be configured to communicate with a scheduling entity, such as a gNB. The communication and processing circuitry 1741 may include one or more hardware components that provide the physical structure that performs various processes related to wireless communication (e.g., signal reception and/or signal transmission) as described herein. The communication and processing circuitry 1741 may further include one or more hardware components that provide the physical structure that performs various processes related to signal processing (e.g., processing a received signal and/or processing a signal for transmission) as described herein. In some examples, the communication and processing circuitry 1741 may include two or more transmit/receive chains. The communication and processing circuitry 1741 may further be configured to execute communication and processing software 1751 included on the computer-readable medium 1706 to implement one or more functions described herein.

In some examples, the communication and processing circuitry 1741 may be configured to receive and process downlink beamformed signals at a mmWave frequency or a sub-6 GHz frequency via the transceiver 1710 and an antenna array 1720. For example, the communication and processing circuitry 1741 may be configured to receive a respective reference signal (e.g., SSB or CSI-RS) on each of a plurality of downlink beams from the base station during a downlink beam sweep via at least one first antenna panel of the antenna array 1720. The communication and processing circuitry 1741 may further be configured to transmit a beam measurement report to the base station.

In some examples, the communication and processing circuitry 1741 may further be configured to generate and transmit uplink beamformed signals at a mmWave frequency or a sub-6 GHz frequency via the transceiver 1710 and the antenna array 1720. For example, the communication and processing circuitry 1741 may be configured to transmit a respective reference signal (e.g., SRS or DMRS) on each of a plurality of uplink beams to the base station during an uplink beam sweep via at least one second antenna panel of the antenna array 1720.

The communication and processing circuitry 1741 may further be configured to control the antenna array 1720 and the transceiver 1710 to search for and identify a plurality of downlink transmit beams during a downlink beam sweep. The communication and processing circuitry 1741 may further be configured to obtain a plurality of beam measurements on each of a plurality of downlink receive beams via the antenna array 1720 for each of the identified downlink transmit beams. The communication and processing circuitry 1741 may further be configured to generate a beam measurement report for transmission to the base station using the communication and processing circuitry 1741.

The communication and processing circuitry 1741 may further be configured to identify one or more selected uplink beam(s) based on the beam measurements obtained from the downlink beam reference signals. In some examples, the communication and processing circuitry 1741 may be configured to compare the respective RSRP (or other beam measurement) measured on each of the downlink receive beams for each of the serving downlink transmit beams to identify the serving downlink receive beams and to further utilize the serving downlink receive beams as the selected uplink transmit beams. Each serving downlink receive beam may have the highest measured RSRP (or other beam measurement) for one of the downlink transmit beams.

The communication and processing circuitry 1741 may be configured to generate one or more uplink transmit beams for transmission in an uplink beam sweep. Each uplink transmit beam may carry an uplink reference signal (e.g., an SRS) for measurement by the base station. The communication and processing circuitry 1741 may further be configured to identify the selected uplink transmit beam(s) selected by the base station based on the uplink beam measurements. For example, the communication and processing circuitry 1741 may be configured to receive an indication of the selected uplink transmit beam(s) from the base station.

In still further aspects, it is noted that the antenna array(s) 1730 may be configured by the processor 1704 (and memory 1705 or medium 1706) to implement a first antenna panel and a second antenna panel. Additionally, the processor 1704 (and memory 1705 or medium 1706) may be configured to use the first antenna panel to transmit a first beam (e.g., an UL transmitting beam for FD communication) and the second antenna panel to receive a second beam (e.g., a DL receiving beam for FD communication). The second antenna panel may be used by the processor 1704 to measure self-interference of the UE for FD communication.

In some implementations where the communication involves receiving information, the communication and processing circuitry 1741 may obtain information from a component of the UE 1700 (e.g., from the transceiver 1710 that receives the information via radio frequency signaling or some other type of signaling suitable for the applicable communication medium), process (e.g., decode) the information, and output the processed information. For example, the communication and processing circuitry 1741 may output the information to another component of the processor 1704, to the memory 1705, or to the bus interface 1708. In some examples, the communication and processing circuitry 1741 may receive one or more of signals, messages, other information, or any combination thereof. In some examples, the communication and processing circuitry 1741 may receive information via one or more channels. In some examples, the communication and processing circuitry 1741 may include functionality for a means for receiving. In some examples, the communication and processing circuitry 1741 may include functionality for a means for decoding.

In some implementations where the communication involves sending (e.g., transmitting) information, the communication and processing circuitry 1741 may obtain information (e.g., from another component of the processor 1704, the memory 1705, or the bus interface 1708), process (e.g., encode) the information, and output the processed information. For example, the communication and processing circuitry 1741 may output the information to the transceiver 1710 (e.g., that transmits the information via radio frequency signaling or some other type of signaling suitable for the applicable communication medium). In some examples, the communication and processing circuitry 1741 may send one or more of signals, messages, other information, or any combination thereof. In some examples, the communication and processing circuitry 1741 may send information via one or more channels. In some examples, the communication and processing circuitry 1741 may include functionality for a means for sending (e.g., a means for transmitting). In some examples, the communication and processing circuitry 1741 may include functionality for a means for encoding.

In some implementations, the communication and processing circuitry 1741 may include functionality for a means for transmitting at least one uplink reference signal to a base station. For example, the communication and processing circuitry 1741 may be configured to transmit an SRS and/or a DMRS on at least one resource allocated by the base station.

The processor 1704 may include beam failure detection circuitry 1742 configured to perform beam failure detection-related operations as discussed herein (e.g., the PHY layer and/or MAC layer beam failure detection operations of FIG. 11). The beam failure detection circuitry 1742 may be configured to execute beam failure detection software 1752 included on the computer-readable medium 1706 to implement one or more functions described herein.

The beam failure detection circuitry 1742 may include functionality for a means for receiving an uplink transmission. For example, the beam failure detection circuitry 1742 may be configured to use one antenna panel of the UE measure the RSRP of an uplink signal transmitted via another antenna panel of the UE.

The beam failure detection circuitry 1742 may include functionality for a means for identifying a beam failure. For example, the beam failure detection circuitry 1742 may include comparator functionality that compares an RSRP, an SINR, or a BLER parameter for at least one measured reference signal with a beam failure detection threshold.

The processor 1704 may include beam failure reporting circuitry 1743 configured to perform beam failure reporting-related operations as discussed herein (e.g., the PHY layer and/or MAC layer operations of FIG. 11). The beam failure reporting circuitry 1743 may be configured to execute beam failure reporting software 1753 included on the computer-readable medium 1706 to implement one or more functions described herein.

The beam failure reporting circuitry 1743 may include functionality for a means for generating a beam failure indication (e.g., a BFRQ). For example, the beam failure reporting circuitry 1743 may be configured to perform the MAC layer beam failure recovery request operations of FIG. 11. The BFRQ may indicate that all or some of the beams monitored by the UE have failed. The BFRQ may include an identifier of each failed beam. The BFRQ may indicate whether the beam failure is due to downlink quality degradation or self-interference.

The beam failure reporting circuitry 1743 may include functionality for a means for transmitting a beam failure indication (e.g., a BFRQ). For example, the beam failure reporting circuitry 1743 may be configured to transmit a beam failure recovery request (BFRQ) (or beam failure indication) to a base station during a full duplex (FD) communication mode with the base station. The BFRQ signal may be configured to indicate that at least one active beam has failed in the FD communication. In some examples, the beam failure reporting circuitry 1743 may be configured to transmit a BFRQ via a RACH message or via an uplink beam (e.g., via UCI or PUSCH).

The beam failure reporting circuitry 1743 may include functionality for a means for receiving a mode indication. For example, the beam failure reporting circuitry 1743 may be configured to receive from a base station (e.g., gNB) a mode indication of a modified communication mode. In aspects, the mode indication may be determined at the base station in response to a BFRQ request. In some examples, the beam failure reporting circuitry 1743 may be configured to receive a message from a gNB indicating a switch from an FD communication mode to an HD communication mode for at least one active beam or to a limited FD communication mode.

The beam failure reporting circuitry 1743 may include functionality for a means for transmitting a request for recovering an FD transmission. For example, the beam failure reporting circuitry 1743 may be configured to transmit a message to a gNB to reestablish an FD communication mode.

The processor 1704 may include communication mode modification circuitry 1744 (e.g., beam control circuitry) configured to perform communication mode modification-related operations as discussed herein (e.g., the communication mode modification operations of FIG. 16). The communication mode modification circuitry 1744 may be configured to execute communication mode modification software 1754 included on the computer-readable medium 1706 to implement one or more functions described herein.

The communication mode modification circuitry 1744 may include functionality for a means for switching a mode of operation (e.g., switching from one communication mode to another communication mode). For example, the communication mode modification circuitry 1744 may be configured to switch to a half-duplex mode or a different FD mode (e.g., by selecting different beams). As another example, the communication mode modification circuitry 1744 may be configured to switch from an FD communication mode to an HD communication mode for at least one active beam and/or to a limited FD communication mode. In some examples, the communication mode modification circuitry 1744 may be configured to, after receiving a mode indication, switching from the FD communication mode to the modified communication mode. The modified communication modes may include at least one of a half-duplex (HD) communication mode for at least one active beam or a limited FD communication mode.

The processor 1704 may include beam measurement and recovery circuitry 1745 configured to perform beam measurement and recovery-related operations as discussed herein (e.g., the beam measurement and recovery operations of FIGS. 14 and/or 15). The beam measurement and recovery circuitry 1745 may be configured to execute beam measurement and recovery software 1755 included on the computer-readable medium 1706 to implement one or more functions described herein.

The beam measurement and recovery circuitry 1745 may include functionality for a means for selecting at least one beam. For example, the beam measurement and recovery circuitry 1745 may be configured to select an UL/DL beam pair for FD communication.

The beam measurement and recovery circuitry 1745 may include functionality for a means for identifying a beam pair candidate. For example, the beam measurement and recovery circuitry 1745 may be configured to identify a new DL/DL beam pair to recover an FD transmission mode.

The beam measurement and recovery circuitry 1745 may include functionality for a means for transmitting a request to recover a FD transmission mode. For example, the beam measurement and recovery circuitry 1745 may be configured to transmit a message to a gNB to reestablish an FD communication mode. The message may include an indication of one or more new target beam pair candidates identified by the UE.

The beam measurement and recovery circuitry 1745 may include functionality for a means for receiving an indication of a beam pair to be used for an FD communication mode. For example, the beam measurement and recovery circuitry 1745 may be configured to receive from a gNB an indication of a DL/UL beam pair to be used for FD communication with the gNB.

Figure 18:
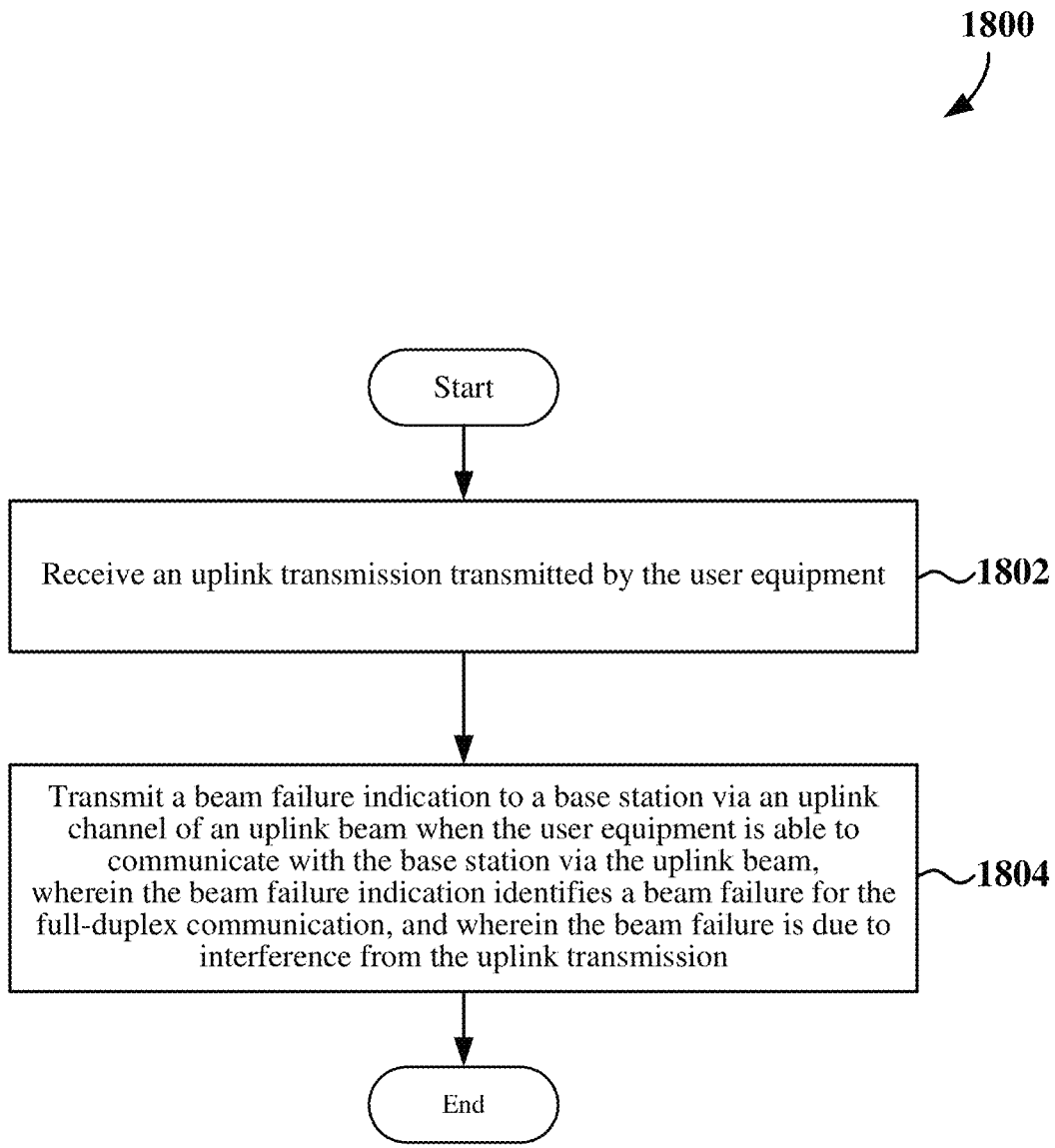
FIG. 18 is a flow chart of an example method for beam failure reporting according to some aspects.

FIG. 18 is a flow chart illustrating an example full-duplex communication method 1800 according to some aspects. As described below, some or all illustrated features may be omitted in a particular implementation within the scope of the present disclosure, and some illustrated features may not be required for implementation of all examples. In some examples, the method 1800 may be carried out by the UE 1700 illustrated in FIG. 17. In some examples, the method 1800 may be carried out by any suitable apparatus or means for carrying out the functions or algorithm described below.

At block 1802, a user equipment may receive an uplink transmission transmitted by the user equipment. In some examples, the beam failure detection circuitry 1742 in cooperation with the communication and processing circuitry 1741 and the transceiver 1710, shown and described in FIG. 17, may provide a means to receive an uplink transmission transmitted by the user equipment.

At block 1804, the user equipment may transmit a beam failure indication to a base station via an uplink channel of an uplink beam when the user equipment is able to communicate with the base station via the uplink beam, wherein the beam failure indication identifies a beam failure for the full-duplex communication, and wherein the beam failure is due to interference from the uplink transmission. In some examples, the beam failure reporting circuitry 1743 in cooperation with the communication and processing circuitry 1741 and the transceiver 1710, shown and described in FIG. 17, may provide a means to transmit a beam failure indication to a base station via an uplink channel of an uplink beam when the user equipment is able to communicate with the base station via the uplink beam.

In some examples, the interference from the uplink transmission may include self-interference by the user equipment measured from an interference measurement resource (IMR) configured in a radio resource control (RRC) radio link monitoring reference signal (RLM-RS) configuration for beam failure detection. In some examples, the IMR carries a sounding reference signal (SRS) or a demodulation reference signal (DMRS) transmitted from the uplink beam to a downlink beam.

In some examples, the beam failure indication indicates that the beam failure is for FD transmissions with the base station. In some examples, the beam failure indication indicates a beam failure recovery request (BFRQ) for the full-duplex communication.

In some examples, the beam failure indication indicates a failure for all active beams of the user equipment. In some examples, the beam failure indication indicates a failure for at least one active beam of the user equipment. In some examples, the beam failure indication may include an identifier of at least one failed beam.

In some examples, the user equipment may transmit the beam failure indication to the base station via an uplink control channel. In some examples, to transmit the beam failure indication to the base station via the uplink channel, the user equipment may transmit uplink control information (UCI) or transmit a media access control-control element (MAC-CE) via a physical uplink shared channel (PUSCH). In some examples, to transmit the beam failure indication to the base station via the uplink channel, the user equipment may determine whether the user equipment is able to communicate with the base station via the uplink beam.

In some examples, the user equipment may measure at least one downlink reference signal, measure at least one uplink reference signal, derive at least one quality parameter from the at least one downlink reference signal and the at least one uplink reference signal, and compare the at least one quality parameter to a threshold. In some examples, the user equipment may generate the beam failure indication based on the comparing (comparison) of the at least one quality parameter to the threshold.

Figure 19:
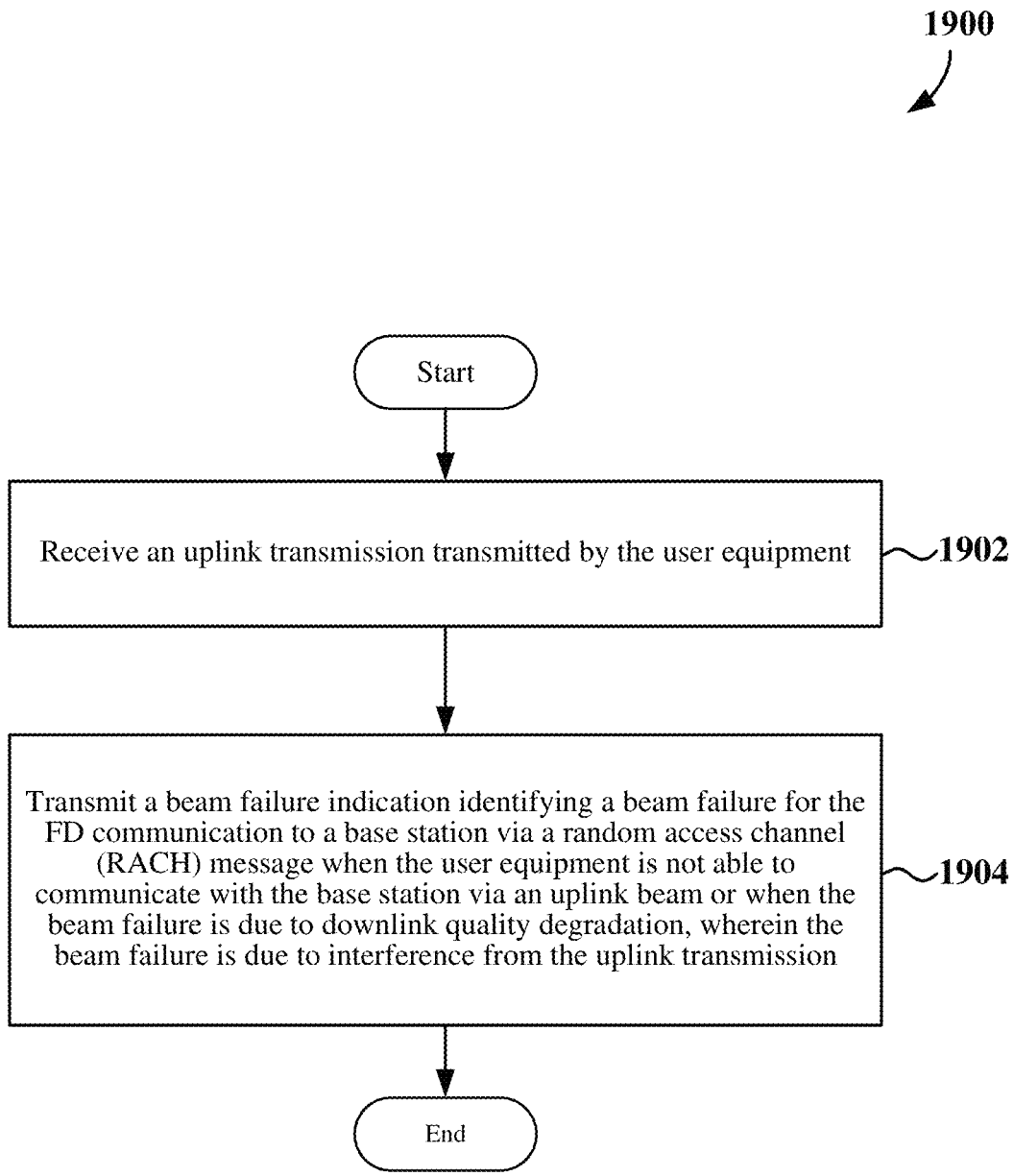
FIG. 19 is a flow chart of another example method for beam failure reporting according to some aspects.

FIG. 19 is a flow chart illustrating an example full-duplex communication method 1900 according to some aspects. As described below, some or all illustrated features may be omitted in a particular implementation within the scope of the present disclosure, and some illustrated features may not be required for implementation of all examples. In some examples, the method 1900 may be carried out by the UE 1700 illustrated in FIG. 17. In some examples, the method 1900 may be carried out by any suitable apparatus or means for carrying out the functions or algorithm described below.

At block 1902, a user equipment may receive an uplink transmission transmitted by the user equipment. In some examples, the beam failure detection circuitry 1742 in cooperation with the communication and processing circuitry 1741 and the transceiver 1710, shown and described in FIG. 17, may provide a means to receive an uplink transmission transmitted by the user equipment.

At block 1904, the user equipment may transmit a beam failure indication identifying a beam failure for the full-duplex communication to a base station via a random access channel (RACH) message when the user equipment is not able to communicate with the base station via an uplink beam or when the beam failure is due to downlink quality degradation, wherein the beam failure is due to interference from the uplink transmission. In some examples, the beam failure reporting circuitry 1743 in cooperation with the communication and processing circuitry 1741 and the transceiver 1710, shown and described in FIG. 17, may provide a means to transmit a beam failure indication identifying a beam failure for the FD communication to a base station via a random access channel (RACH) message when the user equipment is not able to communicate with the base station via an uplink beam or when the beam failure is due to downlink quality degradation.

In some examples, the interference from the uplink transmission may include self-interference by the user equipment measured from an interference measurement resource (IMR) configured in a radio resource control (RRC) radio link monitoring reference signal (RLM-RS) configuration for beam failure detection.

In some examples, the beam failure indication indicates that the beam failure is for full-duplex transmissions with the base station. In some examples, the beam failure indication indicates a beam failure recovery request (BFRQ) for the full-duplex communication.

In some examples, the beam failure indication indicates a failure for all active beams of the user equipment. In some examples, the beam failure indication indicates a failure for at least one active beam of the user equipment. In some examples, the beam failure indication may include an identifier of at least one failed beam.

In some examples, to transmit the beam failure indication to the base station via the RACH message, the user equipment may select a first preamble designated for full duplex self-interference caused beam failures from two preambles reserved for the user equipment and transmit the first preamble as a beam failure recovery request (BFRQ). In some examples, the two preambles reserved for the user equipment may include a second preamble designated for downlink quality degradation caused beam failures.

In some examples, to transmit the beam failure indication to the base station via the RACH message, the user equipment may select a first set of preambles designated for a full duplex self-interference caused beam failures from two sets of preambles, select a preamble out of the first set of preambles, and transmit the preamble as a beam failure recovery request (BFRQ). In some examples, the two sets of preambles may include a second set of preambles designated for downlink quality degradation caused beam failures.

In some examples, the user equipment may identify an uplink and downlink beam pair to recover the full duplex communication after a RACH procedure for beam failure recovery, wherein the RACH procedure is a four-step RACH or a two-step RACH. In some examples, to identify the uplink and downlink beam pair, the user equipment may transmit a first RACH preamble, transmit a second RACH preamble that is a repetition of the first RACH preamble, receive the first RACH preamble via a first receive beam of the user equipment, receive the second RACH preamble via a second receive beam of the user equipment, and select the first receive beam or the second receive beam to pair with an identified beam to form the uplink and downlink beam pair. In some examples, to select the first receive beam or the second receive beam to pair with the identified beam transmitting the first RACH preamble and the second RACH preamble, the user equipment may determine whether the first receive beam or the second receive beam is associated with a lower cross-beam self-interference by the user equipment.

In some examples, the user equipment may identify a first uplink and downlink beam pair that has a lowest cross-beam reference signal received power of a plurality of candidate uplink and downlink beam pairs and transmit an indication of the first uplink and downlink beam pair to the base station. In some examples, the user equipment may transmit the indication of the first uplink and downlink beam pair via a Msg3 in a four-step RACH procedure, a payload of a MsgA in a two-step RACH procedure, or uplink signaling. In some examples, the indication of the first uplink and downlink beam pair may include synchronization signaling block identifiers for the first uplink and downlink beam pair.

In some examples, the user equipment may measure at least one downlink reference signal, measure at least one uplink reference signal, derive at least one quality parameter from the at least one downlink reference signal and the at least one uplink reference signal, and compare the at least one quality parameter to a threshold. In some examples, the user equipment may generate a beam failure indication based on the comparing (comparison) of the at least one quality parameter to the threshold.

Figure 20:
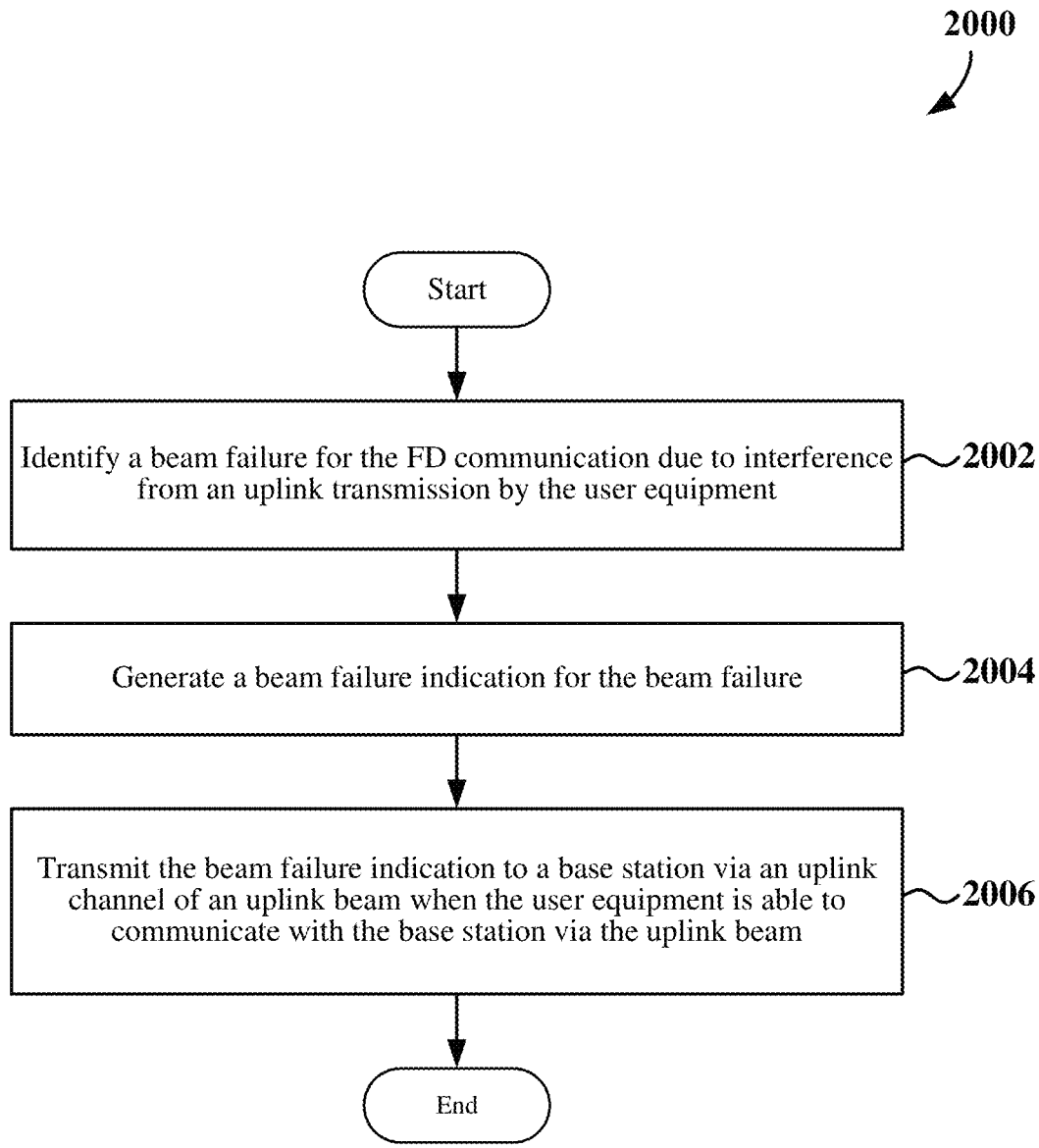
FIG. 20 is a flow chart of another example method for beam failure reporting according to some aspects.

FIG. 20 is a flow chart illustrating an example wireless communication method 2000 according to some aspects. As described below, some or all illustrated features may be omitted in a particular implementation within the scope of the present disclosure, and some illustrated features may not be required for implementation of all examples. In some examples, the method 2000 may be carried out by the UE 1700 illustrated in FIG. 17. In some examples, the method 2000 may be carried out by any suitable apparatus or means for carrying out the functions or algorithm described below.

At block 2002, the user equipment may identify a beam failure for the FD communication due to interference from an uplink transmission by the user equipment. In some examples, the beam failure detection circuitry 1742 in cooperation with the communication and processing circuitry 1741 and the transceiver 1710, shown and described in FIG. 17, may provide a means to identify a beam failure for the FD communication due to interference from an uplink transmission by the user equipment.

In some examples, the interference from the uplink transmission by the user equipment may include self-interference by the user equipment measured from an interference measurement resource (IMR) configured in a radio resource control (RRC) radio link monitoring reference signal (RLM-RS) configuration for beam failure detection. In some examples, the IMR carries a sounding reference signal (SRS) or a demodulation reference signal (DMRS) transmitted from the uplink beam to a downlink beam.

At block 2004, the user equipment may generate a beam failure indication for the beam failure. In some examples, the beam failure reporting circuitry 1743, shown and described above in connection with FIG. 17, may provide a means to generate a beam failure indication for the beam failure.

In some examples, the beam failure indication indicates that the beam failure is for FD transmissions with the base station. In some examples, the beam failure indication indicates a beam failure recovery request (BFRQ) for the FD communication.

In some examples, the beam failure indication indicates a beam failure for all active beams of the user equipment. In some examples, the beam failure indication indicates a beam failure for at least one active beam of the user equipment. In some examples, the beam failure indication may include an identifier of at least one failed beam.

At block 2006, the user equipment may transmit the beam failure indication to a base station via an uplink channel of an uplink beam when the user equipment is able to communicate with the base station via the uplink beam. In some examples, the beam failure reporting circuitry 1743 together with the communication and processing circuitry 1741 and the transceiver 1710, shown and described above in connection with FIG. 17, may provide a means to transmit the beam failure indication to a base station via an uplink channel of an uplink beam when the user equipment is able to communicate with the base station via the uplink beam.

In some examples, the user equipment may transmit the beam failure indication to the base station via an uplink control channel. In some examples, to transmit the beam failure indication to the base station via the uplink channel, the user equipment may transmit uplink control information (UCI) or transmit a media access control-control element (MAC-CE) via a physical uplink shared channel (PUSCH). In some examples, to transmit the beam failure indication to the base station via the uplink channel, the user equipment may determine whether the user equipment is able to communicate with the base station via the uplink beam.

In some examples, the user equipment may measure at least one downlink reference signal, measure at least one uplink reference signal, derive at least one quality parameter from the at least one downlink reference signal and the at least one uplink reference signal, and compare the at least one quality parameter to a threshold. In some examples, the user equipment may generate the beam failure indication based on the comparing (comparison) of the at least one quality parameter to the threshold.

Figure 21:
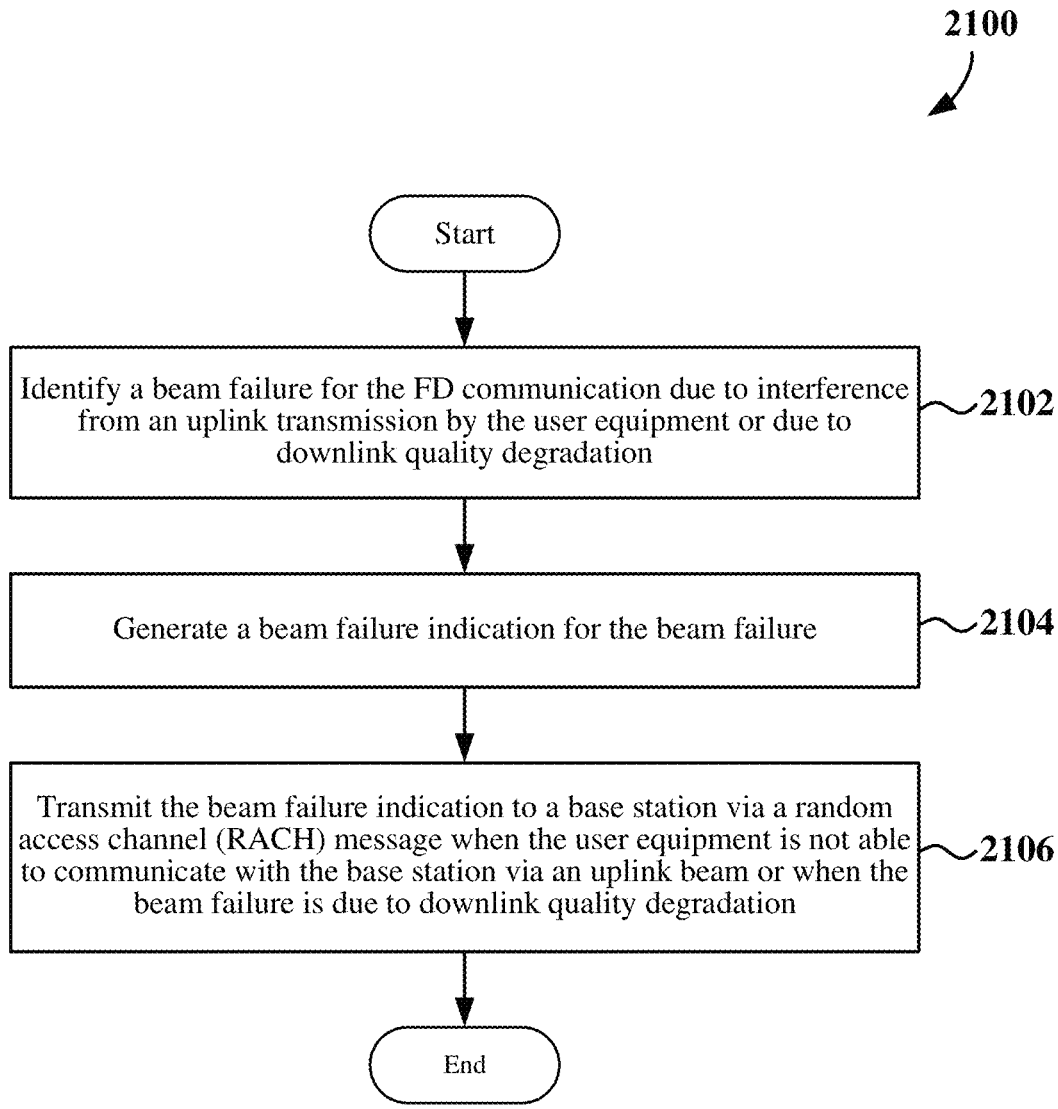
FIG. 21 is a flow chart of another example method for beam failure reporting according to some aspects.

FIG. 21 is a flow chart illustrating an example wireless communication method 2100 according to some aspects. As described below, some or all illustrated features may be omitted in a particular implementation within the scope of the present disclosure, and some illustrated features may not be required for implementation of all examples. In some examples, the method 2100 may be carried out by the UE 1700 illustrated in FIG. 17. In some examples, the method 2100 may be carried out by any suitable apparatus or means for carrying out the functions or algorithm described below.

At block 2102, the user equipment may identify a beam failure for the FD communication due to interference from an uplink transmission by the user equipment or due to downlink quality degradation. In some examples, the beam failure detection circuitry 1742 in cooperation with the communication and processing circuitry 1741 and the transceiver 1710, shown and described in FIG. 17, may provide a means to identify a beam failure for the FD communication due to interference from an uplink transmission by the user equipment or due to downlink quality degradation.

In some examples, the interference from the uplink transmission by the user equipment may include self-interference by the user equipment measured from an interference measurement resource (IMR) configured in a radio resource control (RRC) radio link monitoring reference signal (RLM-RS) configuration for beam failure detection.

At block 2104, the user equipment may generate a beam failure indication for the beam failure. In some examples, the beam failure detection circuitry 1742, shown and described in FIG. 17, may provide a means to generate a beam failure indication for the beam failure.

In some examples, the beam failure indication indicates that the beam failure is for FD transmissions with the base station. In some examples, the beam failure indication indicates a beam failure recovery request (BFRQ) for the FD communication.

In some examples, the beam failure indication indicates a beam failure for all active beams of the user equipment. In some examples, the beam failure indication indicates a beam failure for at least one active beam of the user equipment. In some examples, the beam failure indication may include an identifier of at least one failed beam.

At block 2106, the user equipment may transmit the beam failure indication to a base station via a random access channel (RACH) message when the user equipment is not able to communicate with the base station via an uplink beam or when the beam failure is due to downlink quality degradation. In some examples, the beam failure reporting circuitry 1743 in cooperation with the communication and processing circuitry 1741 and the transceiver 1710, shown and described in FIG. 17, may provide a means to transmit the beam failure indication to a base station via a random access channel (RACH) message when the user equipment is not able to communicate with the base station via an uplink beam or when the beam failure is due to downlink quality degradation. In some examples, the user equipment may determine whether the user equipment is able to communicate with the base station via the uplink beam.

In some examples, to transmit the beam failure indication to the base station via the RACH message, the user equipment may select a first preamble designated for FD self-interference caused beam failures from two preambles reserved for the user equipment and transmit the first preamble as a beam failure recovery request (BFRQ). In some examples, the two preambles reserved for the user equipment may include a second preamble designated for downlink quality degradation caused beam failures.

In some examples, to transmit the beam failure indication to the base station via the RACH message, the user equipment may select a first set of preambles designated for a full duplex (FD) self-interference caused beam failures from two sets of preambles, select a preamble out of the first set of preambles, and transmit the preamble as a beam failure recovery request (BFRQ). In some examples, the two sets of preambles may include a second set of preambles designated for downlink quality degradation caused beam failures.

In some examples, the user equipment may identify an uplink and downlink beam pair to recover the FD communication after a RACH procedure for beam failure recovery, wherein the RACH procedure is a four-step RACH or a two-step RACH. In some examples, to identify the uplink and downlink beam pair, the user equipment may transmit a first RACH preamble, transmit a second RACH preamble that is a repetition of the first RACH preamble, receive the first RACH preamble via a first receive beam of the user equipment, receive the second RACH preamble via a second receive beam of the user equipment, and select the first receive beam or the second receive beam to pair with an identified beam transmitting the first RACH preamble and the second RACH preamble as the identified uplink and downlink beam pair. In some examples, to select the first receive beam or the second receive beam to pair with the identified beam transmitting the first RACH preamble and the second RACH preamble, the user equipment may determine whether the first receive beam or the second receive beam is associated with a lower cross-beam self-interference by the user equipment.

In some examples, the user equipment may identify a first uplink and downlink beam pair that has a lowest cross-beam reference signal received power of a plurality of candidate uplink and downlink beam pairs and transmit an indication of the first uplink and downlink beam pair to the base station. In some examples, the user equipment may transmit the indication of the first uplink and downlink beam pair via a Msg3 in a four-step RACH procedure, a payload of a MsgA in a two-step RACH procedure, or uplink signaling. In some examples, the indication of the first uplink and downlink beam pair may include synchronization signaling block identifiers for the first uplink and downlink beam pair.

In some examples, the user equipment may measure at least one downlink reference signal, measure at least one uplink reference signal, derive at least one quality parameter from the at least one downlink reference signal and the at least one uplink reference signal, and compare the at least one quality parameter to a threshold. In some examples, the user equipment may generate a beam failure indication based on the comparing (comparison) of the at least one quality parameter to the threshold.

Figure 22:
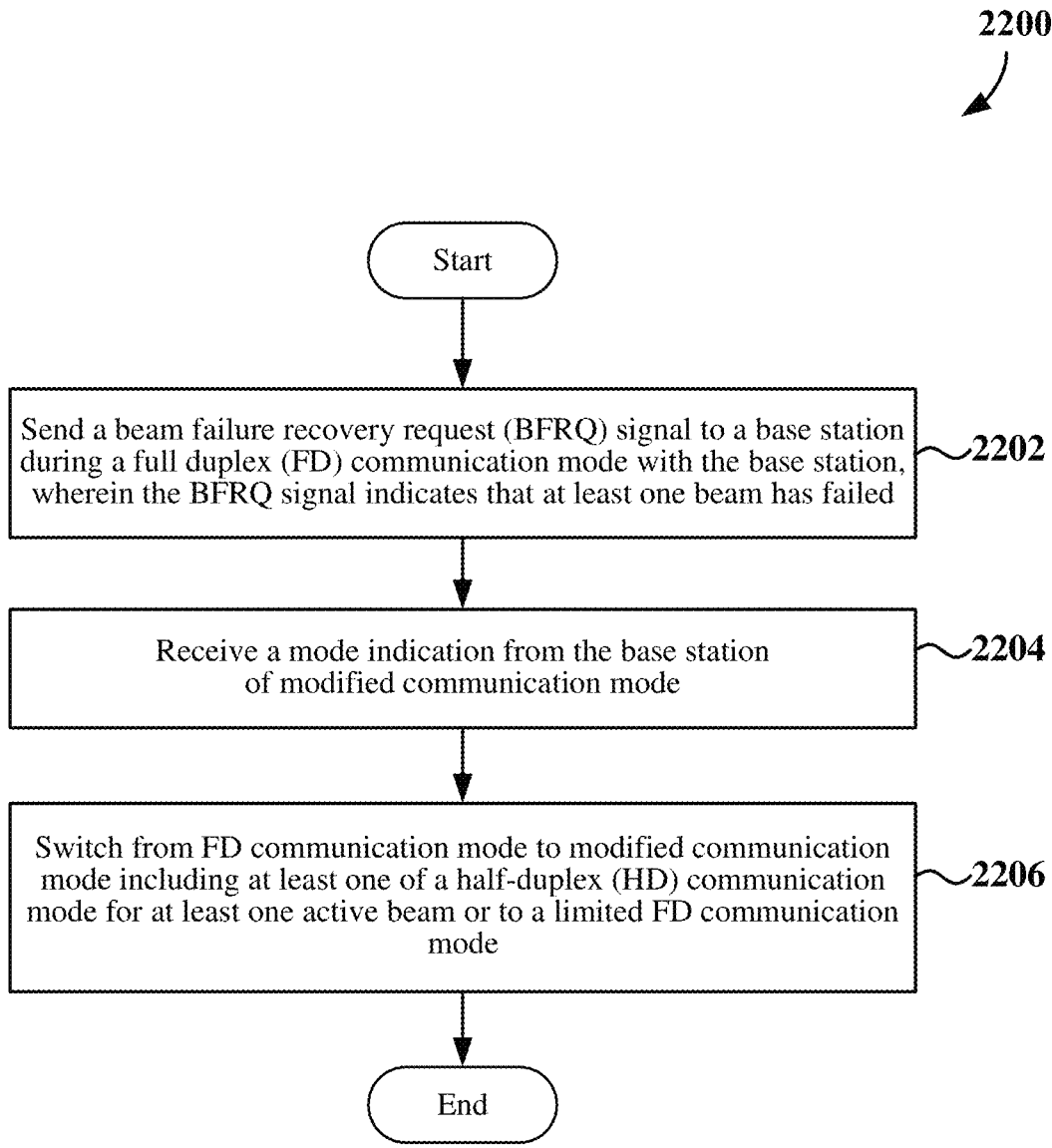
FIG. 22 is a flow chart of an example method for modifying a communication mode according to some aspects.

FIG. 22 is a flow chart illustrating an example wireless communication method 2200 according to some aspects. As described below, some or all illustrated features may be omitted in a particular implementation within the scope of the present disclosure, and some illustrated features may not be required for implementation of all examples. In some examples, the method 2200 may be carried out by the UE 1700 illustrated in FIG. 17. In some examples, the method 2200 may be carried out by any suitable apparatus or means for carrying out the functions or algorithm described below.

At block 2202, a user equipment may send a beam failure recovery request (BFRQ) signal to a base station during a full duplex (FD) communication mode with the base station, wherein the BFRQ signal indicates that at least one beam has failed. In some examples, the beam failure reporting circuitry 1743 in cooperation with the communication and processing circuitry 1741 and the transceiver 1710, shown and described in FIG. 17, may provide a means to send a beam failure recovery request (BFRQ) signal to a base station during a full duplex (FD) communication mode with the base station.

At block 2204, the user equipment may receive a mode indication from the base station of a modified communication mode. In some examples, the beam failure reporting circuitry 1743 in cooperation with the communication and processing circuitry 1741 and the transceiver 1710, shown and described in FIG. 17, may provide a means to receive a mode indication from the base station of a modified communication mode.

At block 2206, the user equipment may switch from the FD communication mode to the modified communication mode based on the mode indication, wherein the modified communication mode may include at least one of a half-duplex (HD) communication mode for at least one beam or a limited FD communication mode. In some examples, the communication mode modification circuitry 1744 in cooperation with the communication and processing circuitry 1741 and the transceiver 1710, shown and described in FIG. 17, may provide a means to switch from the FD communication mode to the modified communication mode based on the mode indication.

In some examples, the HD communication mode may include time division multiplexing (TDM) transmissions for at least one beam in at least one of uplink (UL) or downlink (DL) transmissions between the base station and the user equipment. The switch to the HD communication mode may be made for all active beams, or for at least one active beam that has failed. In the latter case, the user equipment may continue to utilize the FD communication mode for at least one active beam that is working. The at least one beam may be an active beam that is selected by the base station for at least one of data and control channel transmissions.

In some examples, during a transition period wherein the FD communication mode is switched to the HD communication mode, the user equipment may determine whether to terminate a DL beam or a UL beam based on predetermined criteria. The predetermined criteria may include one or more of a physical layer (PHY) priority field or UE assistance information. Additionally, the PHY priority field may include a prioritizing or priority indication of ultra-reliable low-latency communication (URLLC) traffic with a low latency requirement. Still further, the UE assistance information includes at least one of maximum permissible exposure (MPE) limits or thermal balancing differences between transmit/UL and receive/DL antenna arrays.

In some examples, the user equipment may receive an indication of the termination of either the DL or the UL transmission from the base station. The indication may be sent in one or more physical downlink control channel (PDCCH) fields or slots.

In some examples, the user equipment may select one or more beams for UL or DL transmissions for the HD communication mode based on one or more predetermined conditions. The selection of the one or more beams for UL or DL transmissions for the HD communication mode may be based on the one or more predetermined conditions including using the same DL and UL beams as the FD transmission mode for DL and UL transmissions, or by selecting a respective strongest beam having the highest RSRP or SNR for both UL and DL transmissions or a strongest beam from available DL and UL transmission beams as the beam used for both DL and UL transmissions. Moreover, the user equipment may receive a selection of the one or more beams for the HD communication mode from the base station. The user equipment may also send at least one beam recommendation to the base station, where the user equipment receives a selection of the one or more beams for the HD communication mode from the base station based, in part, on at least one beam recommendation sent from the user equipment.

In some examples, during the limited FD communication mode, the user equipment may receive signaling of the reduction of a UL modulation and coding scheme (MCS) from the base station when the UL traffic priority is below a predetermined threshold. In another aspect, the user equipment may receive, for the limited FD communication mode, signaling of the reduction of a UL modulation and coding scheme (MCS) from the base station when the UL traffic priority is below a predetermined threshold. In yet other aspects, the user equipment may receive, for the limited FD communication mode, signaling of the reduction of UL transmit power from the base station when the UL traffic priority is below a first predetermined threshold.

In some examples, the user equipment may receive signaling from the base station to use UL transmission repetition, and then repeat UL transmissions based on the received signaling. The limited FD communication may also include determining a failed FD communication mode beam pair, and then replacing the failed FD communication mode beam pair with a backup FD communication mode beam pair. Still further, the limited FD communication mode may include maintaining the UL power level if the UL priority level is greater than a second predetermined threshold. Also, the user equipment may select a substitute DL beam when the UL priority level is greater than the second predetermined threshold. In some examples, the user equipment may switch to the HD communication mode for at least one beam when the UL priority level is greater than the second predetermined threshold. Additionally, the limited FD communication mode may further include utilizing less frequency resource overlapping between DL and UL transmissions or increasing a guard band between DL and UL frequency bands for sub-band FD communication. In a further aspect, to switch to the limited FD communication mode, the user equipment may receive signaling from the base station via RRC/MAC-CE/DCI and/or send a recommendation to the base station.

Figure 23:
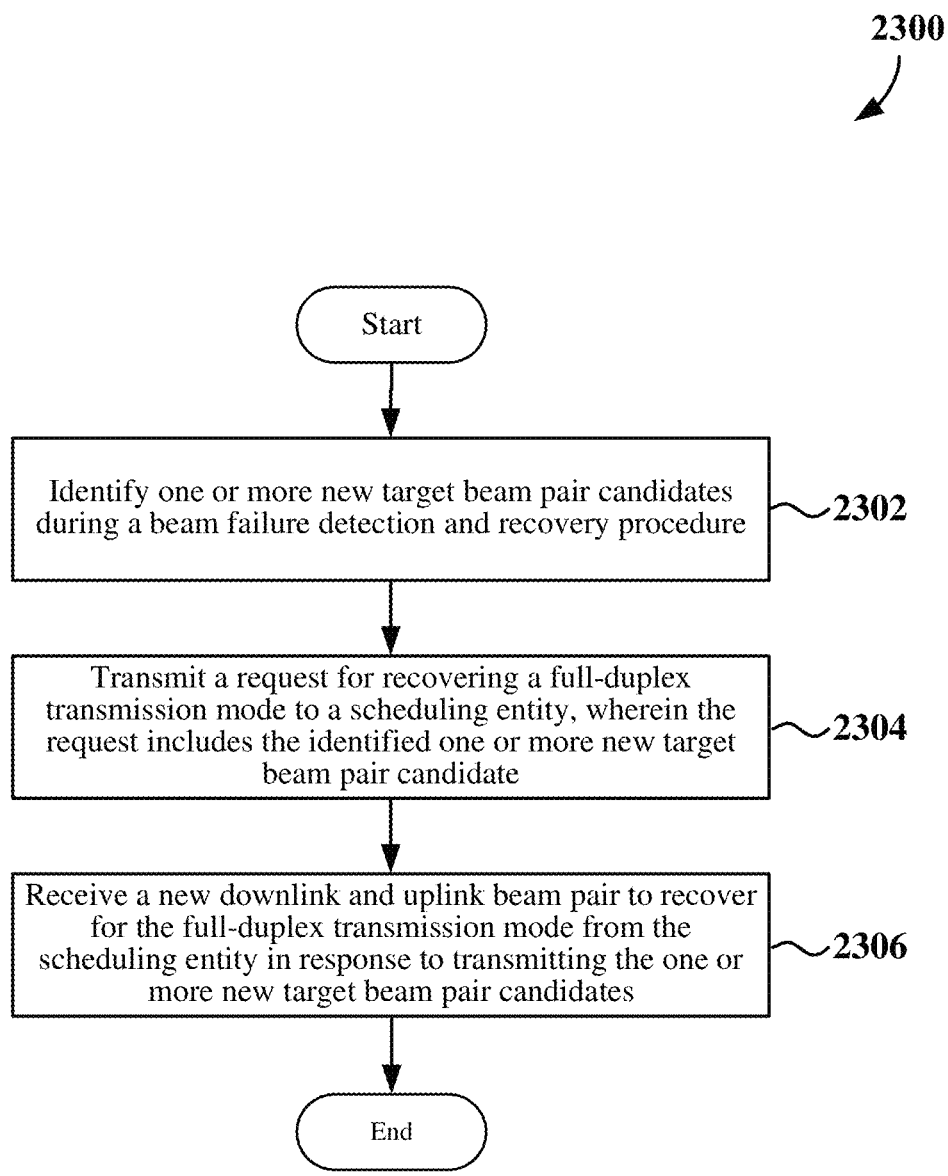
FIG. 23 is a flow chart of an example method for recovering a full-duplex transmission mode according to some aspects.

FIG. 23 is a flow chart illustrating an example wireless communication method 2300 according to some aspects. As described below, some or all illustrated features may be omitted in a particular implementation within the scope of the present disclosure, and some illustrated features may not be required for implementation of all examples. In some examples, the method 2300 may be carried out by the UE 1700 illustrated in FIG. 17. In some examples, the method 2300 may be carried out by any suitable apparatus or means for carrying out the functions or algorithm described below.

At block 2302, a user equipment may identify one or more new target beam pair candidates during a beam failure detection and recovery procedure. In some examples, the beam measurement and recovery circuitry 1745 in cooperation with the communication and processing circuitry 1741 and the transceiver 1710, shown and described in FIG. 17, may provide a means to identify one or more new target beam pair candidates during a beam failure detection and recovery procedure.

At block 2304, the user equipment may transmit a request for recovering a full-duplex transmission mode to a scheduling entity, wherein the request may include the identified one or more new target beam pair candidates. In some examples, the beam failure reporting circuitry 1743 in cooperation with the communication and processing circuitry 1741 and the transceiver 1710, shown and described in FIG. 17, may provide a means to transmit a request for recovering a full-duplex transmission mode to a scheduling entity.

At block 2306, the user equipment may receive a new downlink and uplink beam pair to recover for the full-duplex transmission mode from the scheduling entity in response to transmitting the one or more new target beam pair candidates. In some examples, the beam measurement and recovery circuitry 1745 in cooperation with the communication and processing circuitry 1741 and the transceiver 1710, shown and described in FIG. 17, may provide a means to receive a new downlink and uplink beam pair to recover for the full-duplex transmission mode from the scheduling entity in response to transmitting the one or more new target beam pair candidates.

In some examples, to identify one or more new target beam pair candidates, the user equipment may identify one or more new downlink beams paired with one or more current uplink beams. The following aspects may apply in this case. In some examples, to identify one or more new target beam pair candidates, the user equipment may measure downlink channel quality to determine self-interference from one of the one or more uplink beams to one of the one or more new downlink beams. In some examples, the downlink channel quality and self-interference measurement may include a Signal to Interference and Noise Ratio (SINR). In some examples, to identify one or more new target beam pair candidates, the user equipment may use at least one channel measurement resource (CMR) for measuring the channel quality of each of the identified one or more new downlink beams. In some examples, to identify one or more new target beam pair candidates, the user equipment may add at least one interference measurement resource (IMR) for measuring cross-beam interference from each of the one or more current uplink beams to each of the identified one or more new downlink beams. In some examples, to identify one or more new target beam pair candidates, the user equipment may calculate SINR, based on the CMRs and the IMRs.

In some examples, to identify one or more new target beam pair candidates, the user equipment may identify one or more new uplink beam candidates paired with one or more current downlink beams. The following aspects may apply in this case. In some examples, to identify one or more new target beam pair candidates, the user equipment may measure downlink channel quality and measuring self-interference from one of the one or more new uplink beams to one of the one or more current downlink beams. In some examples, the downlink channel quality and self-interference may include a Signal to Interference and Noise Ratio (SINR). In some examples, to identify one or more new target beam pair candidates, the user equipment may use at least one channel measurement resource (CMR) for measuring the channel quality of each of the one or more current downlink beams. In some examples, to identify one or more new target beam pair candidates, the user equipment may add at least one interference measurement resource (IMR) for measuring the cross-beam interference from each of the one or more new uplink beams to each of the one or more current downlink beams. In some examples, to identify one or more new target beam pair candidates, the user equipment may calculate SINR based on the CMRs and the IMRs.

In some examples, to identify one or more new target beam pair candidates, the user equipment may identify one or more new downlink beams paired with one or more current uplink beams if an uplink reference signal power is stronger than a downlink reference signal power, and identify one or more new uplink beam candidates paired with one or more current downlink beams if a downlink reference signal power is stronger than an uplink reference signal power. In some examples, to identify one or more new target beam pair candidates, the user equipment may access a look-up candidate beam pair table. In some examples, the user equipment may identify the one or more new target beam pair candidates during a beam failure detection and recovery procedure before a transmission of a beam failure recovery request (BFRQ), and transmit the BFRQ associated with the one or more new target beam pair candidates' identification. In some examples, the user equipment may complete a random access channel (RACH) procedure prior to recover the FD transmission mode if the beam failure is caused by DL quality degradation or by self-interference with UL not working. In some examples, the user equipment may transfer to a half-duplex mode or a fallback FD mode prior to the recovery procedure if the beam failure is caused by self-interference with the uplink working.

In one configuration, the UE 1700 includes means for receiving an uplink transmission transmitted by the user equipment, and means for transmitting a beam failure indication identifying a beam failure for the FD communication to a base station via an uplink channel of an uplink beam when the user equipment is able to communicate with the base station via the uplink beam, wherein beam failure is due to interference from the uplink transmission. In one configuration, the UE 1700 includes means for receiving an uplink transmission transmitted by the user equipment, and means for transmitting a beam failure indication identifying a beam failure for the FD communication to a base station via a random access channel (RACH) message when the user equipment is not able to communicate with the base station via an uplink beam or when the beam failure is due to downlink quality degradation, wherein beam failure is due to interference from the uplink transmission. In one aspect, the aforementioned means may be the processor 1704 shown in FIG. 17 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1704 is merely provided as an example, and other means for carrying out the described functions may be included within various aspects of the present disclosure, including but not limited to the instructions stored in the computer-readable medium 1706, or any other suitable apparatus or means described in any one or more of FIGS. 1, 2, 4, 5, 7A, 7B, 7C, 9, 13, 16, and 17, and utilizing, for example, the methods and/or algorithms described herein in relation to FIGS. 18-23.

Figure 24:
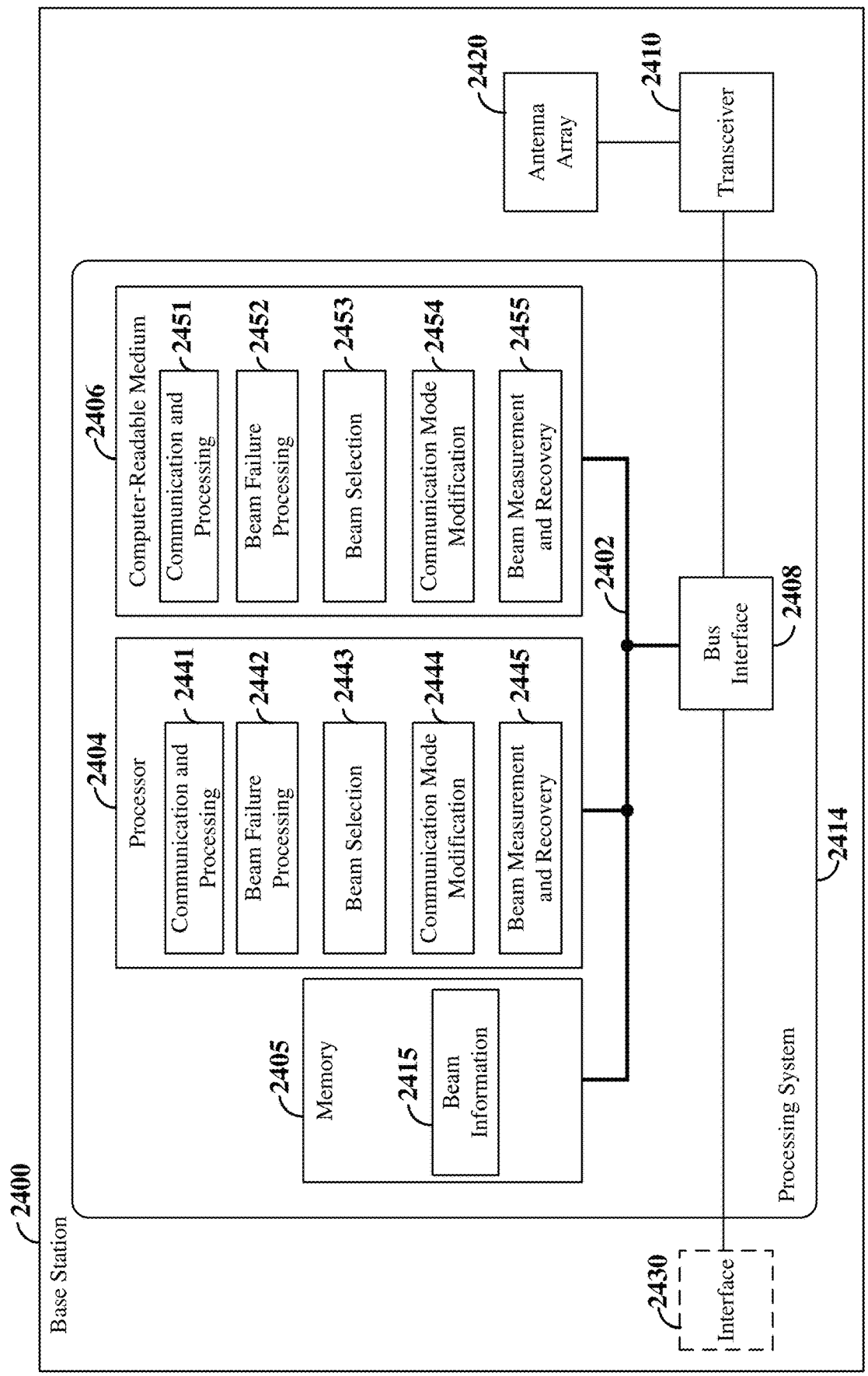
FIG. 24 is a block diagram conceptually illustrating an example of a hardware implementation for a base station employing a processing system according to some aspects.

FIG. 24 is a conceptual diagram illustrating an example of a hardware implementation for base station (BS) 2400 employing a processing system 2414. In some implementations, the BS 2400 may correspond to any of the BSs (e.g., gNBs) or scheduling entities shown in any of FIGS. 1, 2, 4, 5, 7A, 7B, 7C, 9, 13, and 16.

In accordance with various aspects of the disclosure, an element, or any portion of an element, or any combination of elements may be implemented with the processing system 2414. The processing system may include one or more processors 2404. The processing system 2414 may be substantially the same as the processing system 1714 illustrated in FIG. 17, including a bus interface 2408, a bus 2402, memory 2405, a processor 2404, a computer-readable medium 2406, a transceiver 2410, and an antenna array 2420. The memory 2405 may store beam information 2415 used by the processor 2404 for communication operations as discussed herein. Furthermore, the BS 2400 may include an interface 2430 (e.g., a network interface) that provides a means for communicating with at least one other apparatus within a core network and with at least one radio access network.

The BS 2400 may be configured to perform any one or more of the operations described herein (e.g., as described above in conjunction with FIGS. 1-16 and as described below in conjunction with FIGS. 25-28). In some aspects of the disclosure, the processor 2404, as utilized in the BS 2400, may include circuitry configured for various functions.

The processor 2404 may be configured to generate, schedule, and modify a resource assignment or grant of time-frequency resources (e.g., a set of one or more resource elements). For example, the processor 2404 may schedule time-frequency resources within a plurality of time division duplex (TDD) and/or frequency division duplex (FDD) subframes, slots, and/or mini-slots to carry user data traffic and/or control information to and/or from multiple UEs. The processor 2404 may be configured to schedule resources for the transmission of downlink signals and/or resources for the transmission of uplink signals.

The processor 2404 may be configured to schedule resources for the transmission of downlink reference signals (e.g., SSBs or CSI-RSs) on a plurality of downlink beams for a downlink beam sweep in accordance with a selected number of downlink reference signal resources. In some examples, the scheduled resources may be CMRs.

The processor 2404 may be configured to schedule resources for the transmission of an uplink signal. In some examples, the resources may be associated with one or more uplink transmit beams and one or more corresponding receive beams applied to the uplink signal (e.g., based on the uplink BPLs). The processor 2404 may be configured to schedule resources for the uplink transmission of uplink reference signals (e.g., SRSs) on a plurality of uplink beams for an uplink beam sweep. In some examples, the scheduled resources may be IMRs.

In some aspects of the disclosure, the processor 2404 may include communication and processing circuitry 2441. The communication and processing circuitry 2441 may be configured to communicate with a UE. The communication and processing circuitry 2441 may include one or more hardware components that provide the physical structure that performs various processes related to communication (e.g., signal reception and/or signal transmission) as described herein. The communication and processing circuitry 2441 may further include one or more hardware components that provide the physical structure that performs various processes related to signal processing (e.g., processing a received signal and/or processing a signal for transmission) as described herein. The communication and processing circuitry 2441 may further be configured to execute communication and processing software 2451 included on the computer-readable medium 2406 to implement one or more functions described herein.

In some examples, the communication and processing circuitry 2441 may be configured to receive and process uplink beamformed signals at a mmWave frequency or a sub-6 GHz frequency via the transceiver 2410 and an antenna array 2420. For example, the communication and processing circuitry 2441 may be configured to receive a respective reference signal (e.g., SRS or DMRS) on each of a plurality of uplink beams from the UE during an uplink beam sweep.

In some examples, the communication and processing circuitry 2441 may further be configured to generate and transmit downlink beamformed signals at a mmWave frequency or a sub-6 GHz frequency via the transceiver 2410 and the antenna array 2420. For example, the communication and processing circuitry 2441 may be configured to transmit a respective downlink reference signal (e.g., SSB or CSI-RS) on each of a plurality of downlink beams to the UE during a downlink beam sweep via at least one first antenna panel of the antenna array 2420. The communication and processing circuitry 2441 may further be configured to receive a beam measurement report from the UE.

The communication and processing circuitry 2441 may further be configured to control the antenna array 2420 and transceiver 2410 to generate a plurality of downlink transmit beams during a downlink beam sweep. The communication and processing circuitry 2441 may further be configured to receive a beam measurement report from the UE. The communication and processing circuitry 2441 may further be configured to identify one or more selected uplink beam(s) based on the beam measurements. In some examples, the communication and processing circuitry 2441 may be configured to compare the respective RSRP (or other beam measurement) measured on each of the downlink receive beams for each of the serving downlink transmit beams to identify the serving downlink receive beams and to further identify the serving downlink receive beams as the selected uplink transmit beams. Each serving downlink receive beam may have the highest measured RSRP (or other beam measurement) for one of the downlink transmit beams.

The communication and processing circuitry 2441 may be configured to receive one or more uplink transmit beams in an uplink beam sweep. Each uplink transmit beam may carry an uplink reference signal (e.g., an SRS) for measurement by the communication and processing circuitry 2441. The communication and processing circuitry 2441 may further be configured to obtain a plurality of beam measurements on each of a plurality of uplink receive beams of the antenna array 2420 for each of the uplink transmit beams. The communication and processing circuitry 2441 may further be configured to select the selected uplink transmit beam(s) and corresponding uplink receive beams forming respective uplink BPLs based on the uplink beam measurements.

In still further aspects, it is noted that the antenna array(s) 2430 may be configured by the processor 2404 (and memory 2405 or medium 2406) to implement a first antenna panel and a second antenna panel. Additionally, the processor 2404 (and memory 2405 or medium 2406) may be configured to use the first antenna panel to transmit a first beam (e.g., a DL transmitting beam for FD communication) and the second antenna panel to receive a second beam (e.g., an UL receiving beam for FD communication). The second antenna panel may be used by the processor 2404 to measure self-interference of the BS 2400 for FD communication.

In some implementations wherein the communication involves receiving information, the communication and processing circuitry 2441 may obtain information from a component of the BS 2400 (e.g., from the transceiver 2410 that receives the information via radio frequency signaling or some other type of signaling suitable for the applicable communication medium), process (e.g., decode) the information, and output the processed information. For example, the communication and processing circuitry 2441 may output the information to another component of the processor 2404, to the memory 2405, or to the bus interface 2408. In some examples, the communication and processing circuitry 2441 may receive one or more of signals, messages, other information, or any combination thereof. In some examples, the communication and processing circuitry 2441 may receive information via one or more channels. In some examples, the communication and processing circuitry 2441 may include functionality for a means for receiving. In some examples, the communication and processing circuitry 2441 may include functionality for a means for decoding.

In some implementations wherein the communication involves sending (e.g., transmitting) information, the communication and processing circuitry 2441 may obtain information (e.g., from another component of the processor 2404, the memory 2405, or the bus interface 2408), process (e.g., encode) the information, and output the processed information. For example, the communication and processing circuitry 2441 may output the information to the transceiver 2410 (e.g., that transmits the information via radio frequency signaling or some other type of signaling suitable for the applicable communication medium). In some examples, the communication and processing circuitry 2441 may send one or more of signals, messages, other information, or any combination thereof. In some examples, the communication and processing circuitry 2441 may send information via one or more channels. In some examples, the communication and processing circuitry 2441 may include functionality for a means for sending (e.g., a means for transmitting). In some examples, the communication and processing circuitry 2441 may include functionality for a means for encoding.

In some implementations, the communication and processing circuitry 2441 may include functionality for a means for transmitting at least one downlink reference signal. For example, the communication and processing circuitry 2441 may be configured to broadcast an SSB and/or a CSI-RS on at least one designated resource.

The processor 2404 may include beam failure processing circuitry 2442 (e.g., beam failure reporting circuitry) configured to perform beam failure processing-related operations as discussed herein (e.g., the beam failure indication operations of FIG. 9). The beam failure processing circuitry 2442 may be configured to execute beam failure processing software 2452 included on the computer-readable medium 2406 to implement one or more functions described herein.

The beam failure processing circuitry 2442 may include functionality for a means for receiving a beam failure indication. For example, the beam failure processing circuitry 2442 may be configured to receive a BFRQ transmitted by a UE via an uplink beam (e.g., via UCI or PUSCH) or via a RACH message. The BFRQ may indicate that at least one active beam has failed. The BFRQ may include an identifier of each failed beam. The BFRQ may indicate whether the beam failure is due to downlink quality degradation or self-interference.

The beam failure processing circuitry 2442 may include functionality for a means for transmitting a mode indication. For example, the beam failure processing circuitry 2442 may be configured to transmit a message to a UE indicating a switch from an FD communication mode to an HD communication mode for at least one active beam or to a limited FD communication mode.

The beam failure processing circuitry 2442 may include functionality for a means for receiving a request for recovering an FD transmission. For example, the beam failure processing circuitry 2442 may be configured to receive a message from a UE to reestablish an FD communication mode.

The processor 2404 may include beam selection circuitry 2443 configured to perform beam selection-related operations as discussed herein (e.g., the beam selection operations of FIG. 14 and/or FIG. 15). The beam selection circuitry 2443 may be configured to execute beam selection software 2453 included on the computer-readable medium 2406 to implement one or more functions described herein.

The beam selection circuitry 2443 may include functionality for a means for selecting at least one beam. For example, the beam selection circuitry 2443 may be configured to select an UL/DL beam pair for FD communication.

The beam selection circuitry 2443 may include functionality for a means for receiving a beam pair candidate. For example, the beam selection circuitry 2443 may be configured to receive one or more new target beam pair candidates identified by a UE.

The processor 2404 may include communication mode modification circuitry 2444 configured to perform communication mode modification-related operations as discussed herein (e.g., the communication mode modification operations of FIG. 16). The communication mode modification circuitry 2444 may be configured to execute communication mode modification software 2454 included on the computer-readable medium 2406 to implement one or more functions described herein.

The communication mode modification circuitry 2444 (e.g., beam control circuitry) may include functionality for a means for switching a mode of operation (e.g., switching from one communication mode to another communication mode). For example, the communication mode modification circuitry 2444 may be configured to switch to a half-duplex mode or a different FD mode (e.g., by selecting different beams). As another example, the communication mode modification circuitry 2444 may be configured to switch from an FD communication mode to an HD communication mode for at least one active beam and/or to a limited FD communication mode. The communication mode modification circuitry 2444 may be configured to perform operations for switching to temporary HD, hybrid HD, or limited FD communication modes as discussed herein. The communication mode modification circuitry 2444 may be configured to determine when to choose among the variously disclosed communication modes, as well as initiating and/or controlling the communication and processing circuitry 2441 for power backoff and beam or beam pair reselection as described herein.

The processor 2404 may include beam measurement and recovery circuitry 2445 configured to perform beam measurement and recovery-related operations as discussed herein (e.g., the beam measurement and recovery operations of FIGS. 14 and/or 15). The beam measurement and recovery circuitry 2445 may be configured to execute beam measurement and recovery software 2455 included on the computer-readable medium 2406 to implement one or more functions described herein.

The beam measurement and recovery circuitry 2445 may include functionality for a means for transmitting an indication of a beam pair to be used for an FD communication mode. For example, the beam measurement and recovery circuitry 2445 may be configured to process and transmit a new DL/DL beam pair to recover an FD transmission mode.

Figure 25:
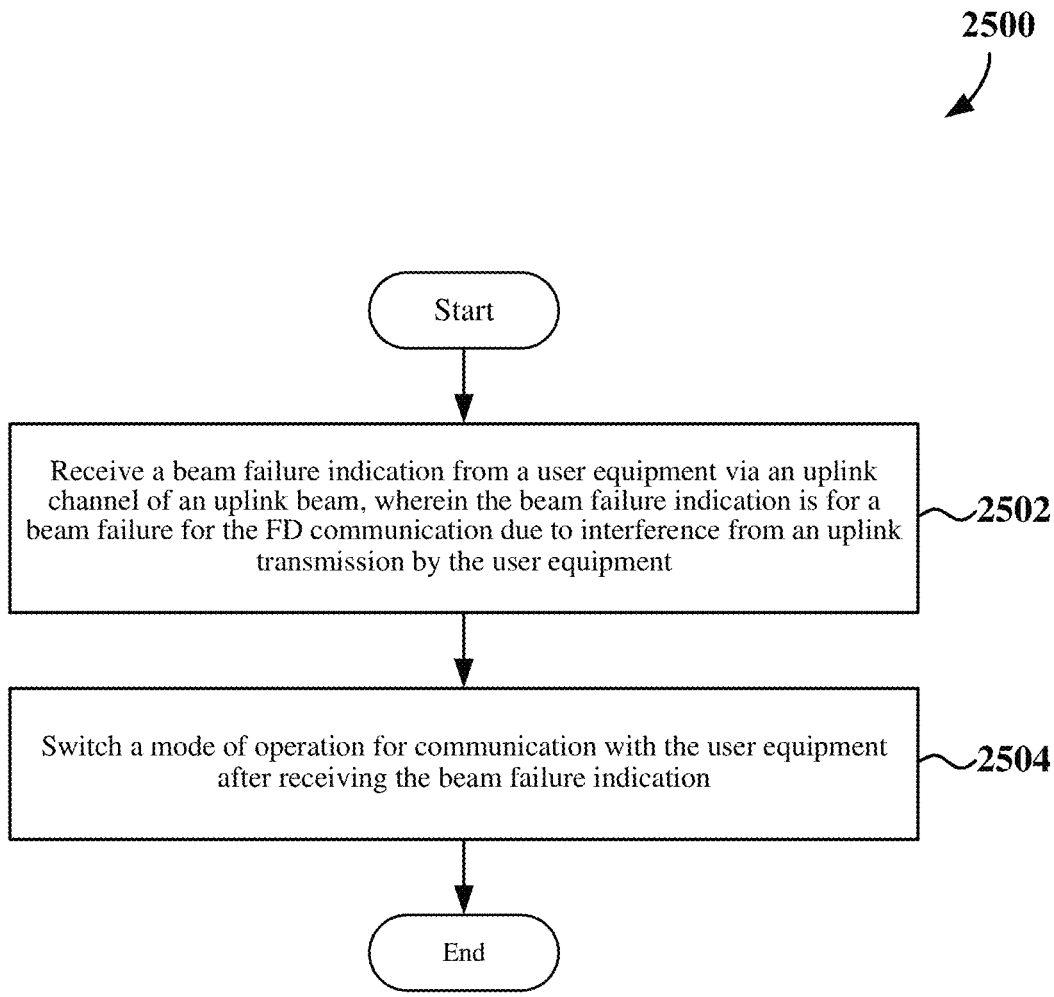
FIG. 25 is a flow chart of an example method for switching a mode of operation in response to a beam failure according to some aspects.

FIG. 25 is a flow chart illustrating an example wireless communication method 2500 according to some aspects. As described below, some or all illustrated features may be omitted in a particular implementation within the scope of the present disclosure, and some illustrated features may not be required for implementation of all examples. In some examples, the method 2500 may be carried out by the BS 2400 illustrated in FIG. 24. In some examples, the method 2500 may be carried out by any suitable apparatus or means for carrying out the functions or algorithm described below.

At block 2502, a base station may receive a beam failure indication from a user equipment via an uplink channel of an uplink beam, wherein the beam failure indication is for a beam failure for the FD communication due to interference from an uplink transmission by the user equipment. In some examples, the beam failure processing circuitry 2442 in cooperation with the communication and processing circuitry 2441 and the transceiver 2410, shown and described in FIG. 24, may provide a means to receive a beam failure indication from a user equipment via an uplink channel of an uplink beam.

In some examples, the beam failure indication indicates that the beam failure is for FD transmissions with the base station. In some examples, the beam failure indication indicates a beam failure recovery request (BFRQ) for the FD communication.

In some examples, the interference from the uplink transmission by the user equipment may include self-interference by the user equipment measured from an interference measurement resource (IMR) configured in a radio resource control (RRC) radio link monitoring reference signal (RLM-RS) configuration for beam failure detection. In some examples, the IMR carries a sounding reference signal (SRS) or a demodulation reference signal (DMRS) transmitted from the uplink beam to a downlink beam.

In some examples, the beam failure indication indicates a beam failure for all active beams of the user equipment. In some examples, the beam failure indication indicates a beam failure for at least one active beam of the user equipment. In some examples, the beam failure indication may include an identifier of at least one failed beam.

In some examples, to receive the beam failure indication, the base station may receive uplink control information (UCI) or receive a media access control-control element (MAC-CE) via a physical uplink shared channel (PUSCH).

At block 2504, the base station may switch a mode of operation for communication with the user equipment after receiving the beam failure indication. In some examples, the communication mode modification circuitry 2444 in cooperation with the communication and processing circuitry 2441 and the transceiver 2410, shown and described in FIG. 24, may provide a means to switch a mode of operation for communication with the user equipment after receiving the beam failure indication. In some examples, the base station may switch to a half-duplex mode of operation or switching to a different full duplex configuration.

Figure 26:
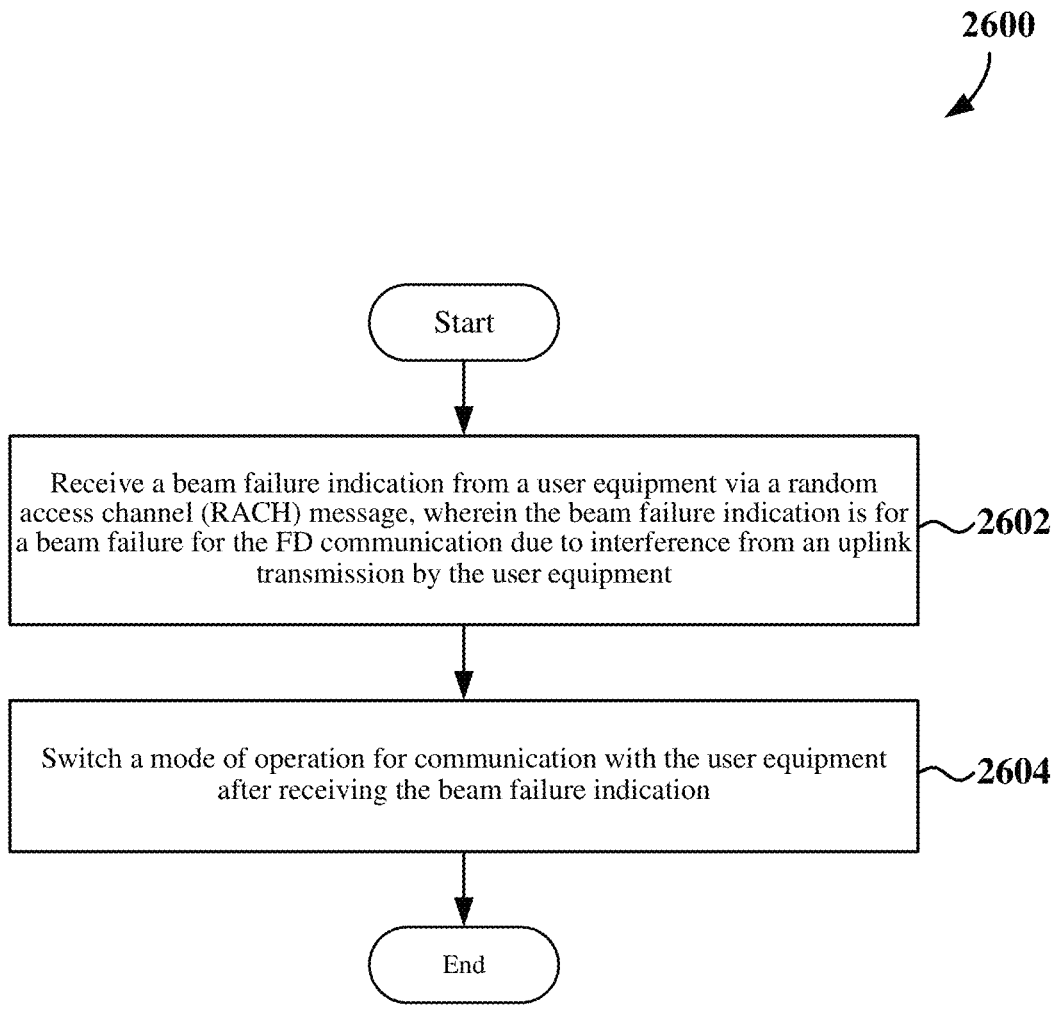
FIG. 26 is a flow chart of another example method for switching a mode of operation in response to a beam failure according to some aspects.

FIG. 26 is a flow chart illustrating an example wireless communication method 2600 according to some aspects. As described below, some or all illustrated features may be omitted in a particular implementation within the scope of the present disclosure, and some illustrated features may not be required for implementation of all examples. In some examples, the method 2600 may be carried out by the BS

2400 illustrated in FIG. 24. In some examples, the method 2600 may be carried out by any suitable apparatus or means for carrying out the functions or algorithm described below.

At block 2602, a base station may receive a beam failure indication from a user equipment via a random access channel (RACH) message, wherein the beam failure indication is for a beam failure for the FD communication due to interference from an uplink transmission by the user equipment. In some examples, the beam failure processing circuitry 2442 in cooperation with the communication and processing circuitry 2441 and the transceiver 2410, shown and described in FIG. 24, may provide a means to receive a beam failure indication from a user equipment via a random access channel (RACH) message.

In some examples, the beam failure indication indicates that the beam failure is for FD transmissions with the base station. In some examples, the beam failure indication indicates a beam failure recovery request (BFRQ) for the FD communication.

In some examples, the interference from the uplink transmission by the user equipment may include self-interference by the user equipment measured from an interference measurement resource (IMR) configured in a radio resource control (RRC) radio link monitoring reference signal (RLM-RS) configuration for beam failure detection.

In some examples, to receive the beam failure indication, the base station may receive a first preamble and identify the first preamble as being designated for FD self-interference caused beam failures from two preambles reserved for the user equipment. In some examples, the two preambles reserved for the user equipment may include a second preamble designated for downlink quality degradation caused beam failures.

In some examples, to receive the beam failure indication, the base station may receive a first preamble and determine that the first preamble is from a first set of preambles designated for a full duplex (FD) self-interference caused beam failures from two sets of preambles. In some examples, the two sets of preambles may include a second set of preambles designated for downlink quality degradation caused beam failures.

In some examples, the beam failure indication indicates a beam failure for all active beams of the user equipment. In some examples, the beam failure indication indicates a beam failure for at least one active beam of the user equipment. In some examples, the beam failure indication may include an identifier of at least one failed beam.

At block 2604, the base station may switch a mode of operation for communication with the user equipment after receiving the beam failure indication. In some examples, the communication mode modification circuitry 2444 in cooperation with the communication and processing circuitry 2441 and the transceiver 2410, shown and described in FIG. 24, may provide a means to switch a mode of operation for communication with the user equipment after receiving the beam failure indication. In some examples, the base station may switch to a half-duplex mode of operation or switching to a different full duplex configuration.

In some examples, the base station may receive an indication of an uplink and downlink beam pair to recover the FD communication after a RACH procedure for beam failure recovery. In some examples, the RACH procedure is a four-step RACH or a two-step RACH.

In some examples, the base station may receive an indication of a first uplink and downlink beam pair that has a lowest cross-beam reference signal received power of a plurality of candidate uplink and downlink beam pairs. In some examples, to receive the indication of the first uplink and downlink beam pair. The base station may transmit the indication of the first uplink and downlink beam pair via a Msg3 in a four-step RACH procedure, a payload of a MsgA in a two-step RACH procedure, or uplink signaling. In some examples, the indication of the first uplink and downlink beam pair may include synchronization signaling block identifiers for the first uplink and downlink beam pair.

Figure 27:
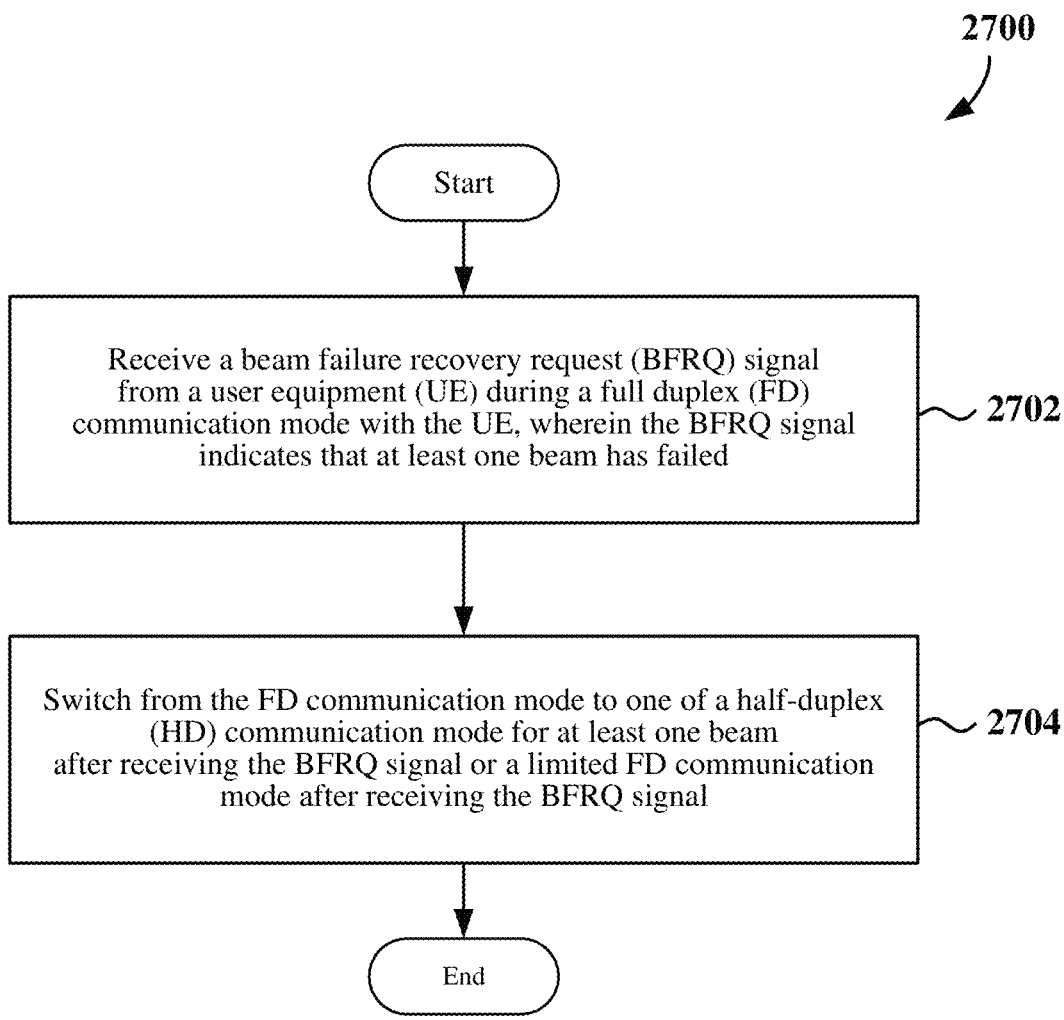
FIG. 27 is a flow chart of another example method for modifying a communication mode according to some aspects.

FIG. 27 is a flow chart illustrating an example wireless communication method 2700 according to some aspects. As described below, some or all illustrated features may be omitted in a particular implementation within the scope of the present disclosure, and some illustrated features may not be required for implementation of all examples. In some examples, the method 2700 may be carried out by the BS 2400 illustrated in FIG. 24. In some examples, the method 2700 may be carried out by any suitable apparatus or means for carrying out the functions or algorithm described below.

At block 2702, a base station may receive a beam failure recovery request (BFRQ) signal from a user equipment (UE) during a full duplex (FD) communication mode with the UE, wherein the BFRQ signal indicates that at least one beam has failed. In some examples, the beam failure processing circuitry 2442 in cooperation with the communication and processing circuitry 2441 and the transceiver 2410, shown and described in FIG. 24, may provide a means to receive a beam failure recovery request (BFRQ) signal from a user equipment (UE) during a full duplex (FD) communication mode with the UE.

At block 2704, the base station may switch from the FD communication mode to one of a half-duplex (HD) communication mode for at least one beam after receiving the BFRQ signal or a limited FD communication mode after receiving the BFRQ signal. In some examples, the communication mode modification circuitry 2444 in cooperation with the communication and processing circuitry 2441 and the transceiver 2410, shown and described in FIG. 24, may provide a means to switch from the FD communication mode to one of a half-duplex (HD) communication mode for at least one beam after receiving the BFRQ signal or a limited FD communication mode after receiving the BFRQ signal.

In some examples, the HD communication mode may include time division multiplexing (TDM) transmissions for at least one beam in at least one of uplink (UL) or downlink (DL) transmissions between the base station and the user equipment. In some examples, the base station may switch to the HD communication mode for all active beams. In some examples, the base station may switch to the HD communication mode for at least one active beam that has failed, and also continuing to utilize the FD communication mode for at least one active beam that is working.

In some examples, during a transition period wherein the FD communication mode is switched to the HD communication mode, the base station may determine whether to terminate a DL beam or a UL beam based on predetermined criteria. The predetermined criteria include one or more of a physical layer (PHY) priority field or UE assistance information. The PHY priority field may include prioritizing or an indication of priority for ultra-reliable low-latency communication (URLLC) traffic with a low latency requirement. In other aspects, the UE assistance information includes at least one of maximum permissible exposure (MPE) limits or thermal balancing differences between transmit/UL and receive/DL antenna arrays.

In some examples, the base station may send an indication of the termination of either the DL or the UL transmission to the user equipment. The base station may send this indication in one or more physical downlink control channel (PDCCH) fields or slots. Additionally, the base station may select one or more beams for UL or DL transmissions for the HD communication mode based on one or more predetermined conditions. Also, the base station may select the one or more beams for UL or DL transmissions for the HD communication mode based on the one or more predetermined conditions including using the same DL and UL beams as the FD transmission mode for DL and UL transmissions, or select a respective strongest beam for both UL and DL transmissions or a strongest beam from available DL and UL transmission beams as the beam used for both DL and UL transmissions.

In some examples, the base station may select the one or more beams for the HD communication mode. As a further example, the base station may select the one or more beams for the HD communication mode based, in part, on at least one beam recommendation received from the user equipment.

Concerning the selection of the limited FD communication mode after receiving the BFRQ signal, the base station may signal the reduction of a UL modulation and coding scheme (MCS) to the user equipment when the UL traffic priority is below a predetermined threshold. The limited FD communication mode also may include signaling the reduction of UL transmit power to the user equipment when the UL traffic priority is below a first predetermined threshold. Yet further, the base station may signal the use of UL transmission repetition to the user equipment. In still other aspects, the limited FD communication mode may include determining a failed FD communication mode beam pair, and replacing the failed FD communication mode beam pair with a backup FD beam pair. Moreover, in other aspects, the limited FD mode may include maintaining the UL power level if the UL priority level is greater than a second predetermined threshold and/or selecting a substitute DL beam when the UL priority level is greater than the second predetermined threshold. In some examples, the base station may switch to the HD communication mode for at least one beam when the UL priority level is greater than the second predetermined threshold.

In other aspects, the limited FD communication mode may include utilizing less frequency resource overlapping between DL and UL transmissions or increasing a guard band between DL and UL frequency bands for sub-band FD communication. Also, to switch to the limited FD communication mode after receiving the BFRQ signal, the base station may send signaling via RRC/MAC-CE/DCI to the user equipment and/or receive a beam recommendation from the user equipment.

Figure 28:
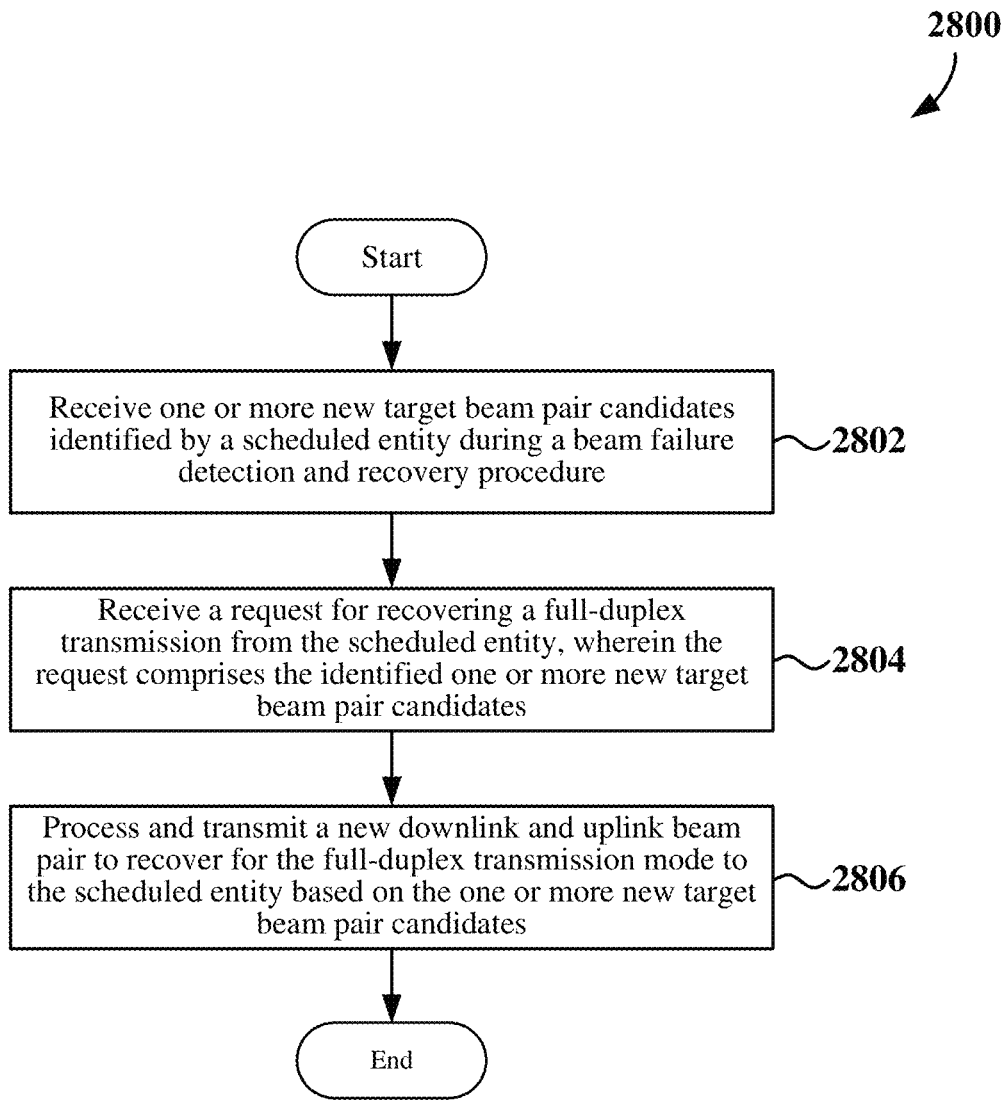
FIG. 28 is a flow chart of another example method for recovering a full-duplex transmission mode according to some aspects.

FIG. 28 is a flow chart illustrating an example wireless communication method 2800 according to some aspects. As described below, some or all illustrated features may be omitted in a particular implementation within the scope of the present disclosure, and some illustrated features may not be required for implementation of all examples. In some examples, the method 2800 may be carried out by the BS 2400 illustrated in FIG. 24. In some examples, the method 2800 may be carried out by any suitable apparatus or means for carrying out the functions or algorithm described below.

At block 2802, a base station may receive one or more new target beam pair candidates identified by a scheduled entity during a beam failure detection and recovery procedure. In some examples, the beam selection circuitry 2443 in cooperation with the communication and processing circuitry 2441 and the transceiver 2410, shown and described in FIG. 24, may provide a means to receive one or more new target beam pair candidates identified by a scheduled entity during a beam failure detection and recovery procedure.

At block 2804, the base station may receive a request for recovering a full-duplex transmission from the scheduled entity, wherein the request may include the identified one or more new target beam pair candidates. In some examples, the beam failure processing circuitry 2442 in cooperation with the communication and processing circuitry 2441 and the transceiver 2410, shown and described in FIG. 24, may provide a means to receive a request for recovering a full-duplex transmission from the scheduled entity.

At block 2806, the base station may process and transmit a new downlink and uplink beam pair to recover for the full-duplex transmission mode for the scheduled entity based on the one or more new target beam pair candidates. In some examples, the beam measurement and recovery circuitry 2445 in cooperation with the communication and processing circuitry 2441 and the transceiver 2410, shown and described in FIG. 24, may provide a means to process and transmit a new downlink and uplink beam pair to recover for the full-duplex transmission mode for the scheduled entity based on the one or more new target beam pair candidates.

In some examples, the identified one or more new target beam pair candidates may include one or more new downlink beams paired with one or more current uplink beams. The following aspects may apply in this case. In some examples, the identified one or more new target beam pair candidates may include measured downlink channel quality to determine self-interference from one of the one or more uplink beams to one of the one or more new downlink beams. In some examples, the downlink channel quality and self-interference measurement may include a Signal to Interference and Noise Ratio (SINR). In some examples, the identified one or more new target beam pair candidates may include at least one channel measurement resource (CMR) for measuring the channel quality of each of the identified one or more new downlink beams. In some examples, the identified one or more new target beam pair candidates may include an added at least one interference measurement resource (IMR) for measuring cross-beam interference from each of the one or more current uplink beams to each of the identified one or more new downlink beams. In some examples, the identified one or more new target beam pair candidates may include a calculated SINR, based on the CMRs and the IMRs.

In some examples, the identified one or more new target beam pair candidates may include one or more new uplink beam candidates paired with one or more current downlink beams. The following aspects may apply in this case. In some examples, the identified one or more new target beam pair candidates may include measured downlink channel quality and measured self-interference from one of the one or more new uplink beams to one of the one or more current downlink beams. In some examples, the downlink channel quality and self-interference may include a Signal to Interference and Noise Ratio (SINR). In some examples, the identified one or more new target beam pair candidates may include at least one channel measurement resource (CMR) used for measuring the downlink channel quality of each of the one or more current downlink beams. In some examples, the identified one or more new target beam pair candidates may include adding at least one interference measurement resource (IMR) for measuring the cross-beam interference from each of the one or more new uplink beams to each of the one or more current downlink beams. In some examples, the identified one or more new target beam pair candidates may include calculating SINR based on the CMRs and the IMRs.

In some examples, the identified one or more new target beam pair candidates may include an identified one or more new downlink beams paired with one or more current uplink beams if an uplink reference signal power is stronger than a downlink reference signal power, and an identified one or more new uplink beam candidates paired with one or more current downlink beams if a downlink reference signal power is stronger than an uplink reference signal power. In some examples, the identified one or more new target beam pair candidates may include accessing a look-up candidate beam pair table. In some examples, the one or more new target beam pair candidates are identified during a beam failure detection and recovery procedure before a transmission of a beam failure recovery request (BFRQ), and wherein transmitting the BFRQ associated with the one or more new target beam pair candidates' identification.

In some examples, the base station may complete a random access channel (RACH) procedure prior to recover the FD transmission mode if the beam failure is caused by DL quality degradation or by self-interference with UL not working. In some examples, the base station may transfer to a half-duplex mode or a fallback FD mode prior to the recovery procedure if the beam failure is caused by self-interference with the uplink working.

In one configuration, the BS 2400 includes means for receiving a beam failure indication from a user equipment via an uplink channel of an uplink beam, wherein the beam failure indication is for a beam failure for the FD communication due to interference from an uplink transmission by the user equipment, and means for switching a mode of operation for communication with the user equipment after receiving the beam failure indication. In one configuration, the BS 2400 includes means for receiving a beam failure indication from a user equipment via a random access channel (RACH) message, wherein the beam failure indication is for a beam failure for the FD communication due to interference from an uplink transmission by the user equipment, and means for switching a mode of operation for communication with the user equipment after receiving the beam failure indication. In one aspect, the aforementioned means may be the processor 2404 shown in FIG. 24 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 2404 is merely provided as an example, and other means for carrying out the described functions may be included within various aspects of the present disclosure, including but not limited to the instructions stored in the computer-readable medium 2406, or any other suitable apparatus or means described in any one or more of FIGS. 1, 2, 4, 5, 7A, 7B, 7C, 9, 13, 16, 17, and 24, and utilizing, for example, the methods and/or algorithms described herein in relation to FIGS. 25-28.

In one example, a method for wireless communication at user equipment (UE) in a wireless communication network is disclosed. The method includes sending a beam failure recovery request (BFRQ) signal to a base station during a full duplex (FD) communication mode with the base station, wherein the BFRQ signal indicates that at least one beam has failed. Further, the method includes receiving a mode indication from the base station of a modified communication mode, and switching from the FD communication mode to the modified communication mode based on the mode indication, wherein the modified communication mode comprises at least one of a half-duplex (HD) communication mode for at least one beam or a limited FD communication mode.

In another example, a user equipment (UE) in a wireless communication network is disclosed, wherein the UE includes a wireless transceiver, a memory, and a processor communicatively coupled to the wireless transceiver and the memory. The processor and the memory are configured to send a beam failure recovery request (BFRQ) signal to a base station during a full duplex (FD) communication mode with the base station, wherein the BFRQ signal indicates that at least one beam has failed. Additionally, the processor and memory are configured to receive a mode indication from the base station of a modified communication mode, and switch from the FD communication mode to the modified communication mode based on the mode indication, wherein the modified communication modes comprises at least one of a half-duplex (HD) communication mode for at least one beam after receiving the BFRQ signal or a limited FD communication mode.

According to another example, a user equipment (UE) in a wireless communication network is disclosed having means for sending a beam failure recovery request (BFRQ) signal to a base station during a full duplex (FD) communication mode with the base station, wherein the BFRQ signal indicates that at least one beam has failed. Additionally, the UE includes means for receiving a mode indication from the base station of a modified communication mode. Further, the UE has means for switching from the FD communication mode to the modified communication mode based on the mode indication, wherein the modified communication modes comprises at least one of a half-duplex (HD) communication mode for at least one beam after receiving the BFRQ signal or a limited FD communication mode.

In yet another example, a non-transitory computer-readable medium comprises code for causing a user equipment (UE) in a wireless communication network to implement a number of processes. The processes include sending a beam failure recovery request (BFRQ) signal to a base station during a full duplex (FD) communication mode with the base station, wherein the BFRQ signal indicates that at least one beam has failed. Additionally, the processes include receiving a mode indication from the base station of a modified communication mode, and switching from the FD communication mode to the modified communication mode based on the mode indication, wherein the modified communication modes comprises at least one of a half-duplex (HD) communication mode for at least one beam after receiving the BFRQ signal or a limited FD communication mode.

In still another example, a method for wireless communication at base station in a wireless communication network is disclosed. The method includes receiving a beam failure recovery request (BFRQ) signal from a user equipment (UE) during a full duplex (FD) communication mode with the UE, wherein the BFRQ signal indicates that at least one beam has failed. Additionally, the method includes switching from the FD communication mode to one of a half-duplex (HD) communication mode for at least one beam after receiving the BFRQ signal or a limited FD communication mode after receiving the BFRQ signal.

According to a further example, a base station in a wireless communication network is disclosed having a wireless transceiver, a memory, and a processor communicatively coupled to the wireless transceiver and the memory. The processor and the memory are configured to receive a beam failure recovery request (BFRQ) signal from a user equipment (UE) during a full duplex (FD) communication mode with the UE, wherein the BFRQ signal indicates that at least one beam has failed. Additionally, the processor and memory are configured to switch from the FD communication mode to one of a half-duplex (HD) communication mode for at least one beam after receiving the BFRQ signal or a limited FD communication mode after receiving the BFRQ signal.

According to another aspect, a base station in a wireless communication network is disclosed. The base station includes means for receiving a beam failure recovery request (BFRQ) signal from a user equipment (UE) during a full duplex (FD) communication mode with the UE, wherein the BFRQ signal indicates that at least one beam has failed. Additionally, the base station includes means for switching from the FD communication mode to one of a half-duplex (HD) communication mode for at least one beam after receiving the BFRQ signal or a limited FD communication mode after receiving the BFRQ signal.

In one more example, a non-transitory computer-readable medium comprises code for causing a user equipment (UE) in a wireless communication network to implement a number of processes. The processes include receiving a beam failure recovery request (BFRQ) signal from a user equipment (UE) during a full duplex (FD) communication mode with the UE, wherein the BFRQ signal indicates that at least one beam has failed. The processes also include switching from the FD communication mode to one of a half-duplex (HD) communication mode for at least one beam after receiving the BFRQ signal or a limited FD communication mode after receiving the BFRQ signal.

In some examples, a method of full duplex (FD) communication at a user equipment may include identifying a beam failure for the FD communication due to interference from an uplink transmission by the user equipment, generating a beam failure indication for the beam failure, and transmitting the beam failure indication to a base station via an uplink channel of an uplink beam when the user equipment is able to communicate with the base station via the uplink beam. As used herein, the term "when" does not designate a precise time.

In some examples, a user equipment for full duplex (FD) communication may include a transceiver, a memory, and a processor communicatively coupled to the transceiver and the memory. The processor and the memory may be configured to identify a beam failure for the FD communication due to interference from an uplink transmission by the user equipment, generate a beam failure indication for the beam failure, and transmit the beam failure indication to a base station via an uplink channel of an uplink beam when the user equipment is able to communicate with the base station via the uplink beam.

In some examples, a user equipment for full duplex (FD) communication may include means for identifying a beam failure for the FD communication due to interference from an uplink transmission by the user equipment, means for generating a beam failure indication for the beam failure, and means for transmitting the beam failure indication to a base station via an uplink channel of an uplink beam when the user equipment is able to communicate with the base station via the uplink beam.

In some examples, an article of manufacture for use by a user equipment for full duplex (FD) communication includes a computer-readable medium having stored therein instructions executable by one or more processors of the user equipment to identify a beam failure for the FD communication due to interference from an uplink transmission by the user equipment, generate a beam failure indication for the beam failure, and transmit the beam failure indication to a base station via an uplink channel of an uplink beam when the user equipment is able to communicate with the base station via the uplink beam.

In some examples, a method of full duplex (FD) communication at a user equipment may include identifying a beam failure for the FD communication due to interference from an uplink transmission by the user equipment or due to downlink quality degradation, generating a beam failure indication for the beam failure, and transmitting the beam failure indication to a base station via a random access channel (RACH) message when the user equipment is not able to communicate with the base station via an uplink beam or when the beam failure is due to downlink quality degradation.

In some examples, a user equipment for full duplex (FD) communication may include a transceiver, a memory, and a processor communicatively coupled to the transceiver and the memory. The processor and the memory may be configured to identify a beam failure for the FD communication due to interference from an uplink transmission by the user equipment or due to downlink quality degradation, generate a beam failure indication for the beam failure, and transmit the beam failure indication to a base station via a random access channel (RACH) message when the user equipment is not able to communicate with the base station via an uplink beam or when the beam failure is due to downlink quality degradation.

In some examples, a user equipment for full duplex (FD) communication may include means for identifying a beam failure for the FD communication due to interference from an uplink transmission by the user equipment or due to downlink quality degradation, means for generating a beam failure indication for the beam failure, and means for transmitting the beam failure indication to a base station via a random access channel (RACH) message when the user equipment is not able to communicate with the base station via an uplink beam or when the beam failure is due to downlink quality degradation.

In some examples, an article of manufacture for use by a user equipment for full duplex (FD) communication includes a computer-readable medium having stored therein instructions executable by one or more processors of the user equipment to identify a beam failure for the FD communication due to interference from an uplink transmission by the user equipment or due to downlink quality degradation, generate a beam failure indication for the beam failure, and transmit the beam failure indication to a base station via a random access channel (RACH) message when the user equipment is not able to communicate with the base station via an uplink beam or when the beam failure is due to downlink quality degradation.

In some examples, a method of full duplex (FD) communication at a base station may include receiving a beam failure indication from a user equipment via an uplink channel of an uplink beam and switching a mode of operation for communication with the user equipment after receiving the beam failure indication. The beam failure indication may be for a beam failure for the FD communication due to interference from an uplink transmission by the user equipment.

In some examples, a base station for full duplex (FD) communication may include a transceiver, a memory, and a processor communicatively coupled to the transceiver and the memory. The processor and the memory may be configured to receive a beam failure indication from a user equipment via an uplink channel of an uplink beam and switch a mode of operation for communication with the user equipment after receiving the beam failure indication. The beam failure indication may be for a beam failure for the FD communication due to interference from an uplink transmission by the user equipment.

In some examples, a base station for full duplex (FD) communication may include means for receiving a beam failure indication from a user equipment via an uplink channel of an uplink beam and means for switching a mode of operation for communication with the user equipment after receiving the beam failure indication. The beam failure indication may be for a beam failure for the FD communication due to interference from an uplink transmission by the user equipment.

In some examples, an article of manufacture for use by a base station for full duplex (FD) communication includes a computer-readable medium having stored therein instructions executable by one or more processors of the base station to receive a beam failure indication from a user equipment via an uplink channel of an uplink beam and switch a mode of operation for communication with the user equipment after receiving the beam failure indication. The beam failure indication may be for a beam failure for the FD communication due to interference from an uplink transmission by the user equipment.

In some examples, a method of full duplex (FD) communication at a base station may include receiving a beam failure indication from a user equipment via a random access channel (RACH) message and switching a mode of operation for communication with the user equipment after receiving the beam failure indication. The beam failure indication may be for a beam failure for the FD communication due to interference from an uplink transmission by the user equipment.

In some examples, a base station for full duplex (FD) communication may include a transceiver, a memory, and a processor communicatively coupled to the transceiver and the memory. The processor and the memory may be configured to receive a beam failure indication from a user equipment via a random access channel (RACH) message and switch a mode of operation for communication with the user equipment after receiving the beam failure indication. The beam failure indication may be for a beam failure for the FD communication due to interference from an uplink transmission by the user equipment.

In some examples, a base station for full duplex (FD) communication may include means for receiving a beam failure indication from a user equipment via a random access channel (RACH) message and means for switching a mode of operation for communication with the user equipment after receiving the beam failure indication. The beam failure indication may be for a beam failure for the FD communication due to interference from an uplink transmission by the user equipment.

In some examples, an article of manufacture for use by a base station for full duplex (FD) communication includes a computer-readable medium having stored therein instructions executable by one or more processors of the base station to receive a beam failure indication from a user equipment via a random access channel (RACH) message and switch a mode of operation for communication with the user equipment after receiving the beam failure indication. The beam failure indication may be for a beam failure for the FD communication due to interference from an uplink transmission by the user equipment.

In one example, a method of beam failure recovery in a scheduled entity is disclosed, comprising: identifying, via the scheduled entity, one or more new target beam pair candidates during a beam failure detection and recovery procedure; transmitting a request for recovering a full-duplex transmission mode to a scheduling entity, wherein the request comprises the identified one or more new target beam pair candidates; and receiving a new downlink and uplink beam pair to recover for the full-duplex transmission mode from the scheduling entity in response to transmitting the one or more new target beam pair candidates.

In another example, a method of beam failure recovery in a scheduling entity is disclosed, comprising: receiving one or more new target beam pair candidates identified by a scheduled entity during a beam failure detection and recovery procedure; receiving a request for recovering a full-duplex transmission mode from the scheduled entity, wherein the request comprises the identified one or more new target beam pair candidates; and processing and transmitting a new downlink and uplink beam pair to recover for the full-duplex transmission mode for the scheduled entity based on the one or more new target beam pair candidates.

In another example, a scheduled entity is disclosed in a wireless communication network, comprising: a wireless transceiver; a memory; and a processor communicatively coupled to the wireless transceiver and the memory, wherein the processor and the memory are configured to: identify, via the scheduled entity, one or more new target beam pair candidates during a beam failure detection and recovery procedure; transmit a request for recovering a full-duplex transmission mode to a scheduling entity, wherein the request comprises the identified one or more new target beam pair candidates; and receive a new downlink and uplink beam pair to recover for the full-duplex transmission mode from the scheduling entity in response to transmitting the one or more new target beam pair candidates.

In another example, a scheduling entity is disclosed in a wireless communication network, comprising: a wireless transceiver; a memory; and a processor communicatively coupled to the wireless transceiver and the memory, wherein the processor and the memory are configured to: receive one or more new target beam pair candidates identified by a scheduled entity during a beam failure detection and recovery procedure; receive a request for recovering a full-duplex transmission mode from the scheduled entity, wherein the request comprises the identified one or more new target beam pair candidates; and process and transmitting a new downlink and uplink beam pair to recover for the full-duplex transmission mode for the scheduled entity based on the one or more new target beam pair candidates.

The methods shown in FIGS. 18-23 and 25-28 may include additional aspects, such as any single aspect or any combination of aspects described below and/or in connection with one or more other processes described elsewhere herein. The following provides an overview of several aspects of the present disclosure.

Aspect 1: A method for full-duplex communication at a user equipment, the method comprising: receiving an uplink transmission transmitted by the user equipment; and transmitting a beam failure indication to a base station via an uplink channel of an uplink beam when the user equipment is able to communicate with the base station via the uplink beam, wherein the beam failure indication identifies a beam failure for the full-duplex communication, and wherein the beam failure is due to interference from the uplink transmission.

Aspect 2: The method of aspect 1, wherein the beam failure indication indicates that the beam failure is for full-duplex transmissions with the base station.

Aspect 3: The method of aspect 1 or 2, wherein the beam failure indication indicates a beam failure recovery request (BFRQ) for the full-duplex communication.

Aspect 4: The method of any of aspects 1 through 3, further comprising: using a first antenna panel to transmit the uplink beam; and using a second antenna panel to receive a downlink beam, wherein the interference from the uplink transmission comprises self-interference by the user equipment measured via the second antenna panel from an interference measurement resource (IMR) configured in a radio resource control (RRC) radio link monitoring reference signal (RLM-RS) configuration for beam failure detection.

Aspect 5: The method of aspect 4, wherein the IMR carries a sounding reference signal (SRS) or a demodulation reference signal (DMRS) transmitted from the uplink beam to the downlink beam.

Aspect 6: The method of any of aspects 4 through 5, wherein the beam failure indication indicates a failure for all active beams of the user equipment.

Aspect 7: The method of any of aspects 4 through 5, wherein the beam failure indication indicates a failure for at least one active beam of the user equipment.

Aspect 8: The method of any of aspects 4 through 5, wherein the beam failure indication comprises an identifier of at least one failed beam.

Aspect 9: The method of any of aspects 1 through 8, further comprising: transmitting the beam failure indication to the base station via an uplink control channel.

Aspect 10: The method of any of aspects 1 through 9, further comprising:
transmitting uplink control information (UCI) including the beam failure indication or transmit a media access control-control element (MAC-CE) including the beam failure indication via a physical uplink shared channel (PUSCH).

Aspect 11: The method of any of aspects 1 through 10, further comprising: determining whether the user equipment is able to communicate with the base station via the uplink beam.

Aspect 12: The method of any of aspects 1 through 11, further comprising: measuring at least one downlink reference signal; measuring at least one uplink reference signal; deriving at least one quality parameter from the at least one downlink reference signal and the at least one uplink reference signal; comparing the at least one quality parameter to a threshold; and generating the beam failure indication based on the comparison of the at least one quality parameter to the threshold.

Aspect 14: A method for full-duplex communication at a user equipment, the method comprising: receiving an uplink transmission transmitted by the user equipment; and transmitting a beam failure indication identifying a beam failure for the full-duplex communication to a base station via a random access channel (RACH) message when the user equipment is not able to communicate with the base station via an uplink beam or when the beam failure is due to downlink quality degradation, wherein the beam failure is due to interference from the uplink transmission.

Aspect 15: The method of aspect 14, wherein the beam failure indication comprises a beam failure recovery request (BFRQ) and indicates that the beam failure is for full-duplex transmissions with the base station.

Aspect 16: The method of any of aspects 14 through 15, further comprising: using the first antenna panel to transmit the uplink beam; and using the second antenna panel to receive a downlink beam, wherein the interference from the uplink transmission comprises self-interference by the user equipment measured via the second antenna panel from an interference measurement resource (IMR) configured in a radio resource control (RRC) radio link monitoring reference signal (RLM-RS) configuration for beam failure detection.

Aspect 17: The method of any of aspects 14 through 16, further comprising: selecting a first preamble designated for full-duplex self-interference caused beam failures from two preambles reserved for the user equipment; and transmitting the first preamble as a beam failure recovery request (BFRQ).

Aspect 18: The method of aspect 17, wherein the two preambles reserved for the user equipment comprise a second preamble designated for downlink quality degradation caused beam failures.

Aspect 19: The method of any of aspects 14 through 18, further comprising: selecting a first set of preambles designated for a full duplex self-interference caused beam failures from two sets of preambles; selecting a first preamble from the first set of preambles; and transmitting the first preamble as a beam failure recovery request (BFRQ).

Aspect 20: The method of aspect 19, wherein the two sets of preambles comprise a second set of preambles designated for downlink quality degradation caused beam failures.

Aspect 21: The method of any of aspects 14 through 20, wherein the beam failure indication indicates a failure for all active beams of the user equipment.

Aspect 22: The method of any of aspects 14 through 21, wherein the beam failure indication indicates a failure for at least one active beam of the user equipment.

Aspect 23: The method of any of aspects 14 through 22, wherein the beam failure indication comprises an identifier of at least one failed beam.

Aspect 24: The method of any of aspects 14 through 23, further comprising: identifying an uplink and downlink beam pair to recover the full-duplex communication after a random access channel (RACH) procedure for beam failure recovery, wherein the RACH procedure is a four-step RACH or a two-step RACH.

Aspect 25: The method of aspect 24, further comprising: transmitting a first RACH preamble; transmitting a second RACH preamble that is a repetition of the first RACH preamble; receiving the first RACH preamble via a first receive beam of the user equipment; receiving the second RACH preamble via a second receive beam of the user equipment; and selecting the first receive beam or the second receive beam to pair with an identified beam to form the uplink and downlink beam pair.

Aspect 26: The method of aspect 25, further comprising: determining whether the first receive beam or the second receive beam is associated with a lower cross-beam self-interference by the user equipment.

Aspect 27: The method of any of aspects 14 through 26, further comprising: identifying a first uplink and downlink beam pair that has a lowest cross-beam reference signal received power of a plurality of candidate uplink and downlink beam pairs; and transmitting an indication of the first uplink and downlink beam pair to the base station.

Aspect 28: The method of aspect 27, further comprising: transmitting the indication of the first uplink and downlink beam pair via a Msg3 in a four-step RACH procedure, a payload of a MsgA in a two-step RACH procedure, or uplink signaling.

Aspect 29: The method of aspect 28, wherein the indication of the first uplink and downlink beam pair comprises synchronization signaling block identifiers for the first uplink and downlink beam pair.

Aspect 30: A user equipment comprising: a transceiver configured to communicate with a radio access network, a memory, and a processor communicatively coupled to the transceiver and the memory, wherein the processor and the memory are configured to perform any one of aspects 1 through 12.

Aspect 31: An apparatus configured for wireless communication comprising at least one means for performing any one of aspects 1 through 12.

Aspect 32: A non-transitory computer-readable medium storing computer-executable code, comprising code for causing an apparatus to perform any one of aspects 1 through 12.

Aspect 33: A user equipment comprising: a transceiver, a memory, and a processor communicatively coupled to the transceiver and the memory, wherein the processor and the memory are configured to perform any one of aspects 14 through 29.

Aspect 34: An apparatus configured for wireless communication comprising at least one means for performing any one of aspects 14 through 29.

Aspect 35: A non-transitory computer-readable medium storing computer-executable code, comprising code for causing an apparatus to perform any one of aspects 14 through 29.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-28 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 5, 7A, 7B, 7C, 9, 13, 16, 17, and 24 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment, comprising one or more processors communicatively coupled to memory, the one or more processors configured to cause the user equipment to:

receive an uplink transmission transmitted by the user equipment;

generate a beam failure indication based on a determination that a beam failure associated with full-duplex communication has occurred as a result of interference from the uplink transmission; and transmit the beam failure indication to a network entity via (1) an uplink channel of an uplink beam in response to the user equipment being able to communicate with the network entity via the uplink beam or (2) a random access channel (RACH) message in response to the user equipment not being able to communicate with the network entity via the uplink beam or in response to the beam failure being due to downlink quality degradation, wherein the user equipment further comprises a first antenna panel and a second antenna panel, wherein:

the one or more processors are further configured to cause the user equipment to use the first antenna panel to transmit the uplink beam;

the one or more processors are further configured to cause the user equipment to use the second antenna panel to receive a downlink beam; and the interference from the uplink transmission comprises self-interference by the user equipment measured via the second antenna panel from an interference measurement resource (IMR) configured in a radio resource control (RRC) radio link monitoring reference signal (RLM-RS) configuration for beam failure detection.

2. The user equipment of claim 1, wherein to transmit the beam failure indication, the one or more processors are configured to cause the user equipment to transmit the beam failure indication to the network entity via the uplink channel of an uplink beam in response to the user equipment being able to communicate with the network entity via the uplink beam, and wherein the IMR carries a sounding reference signal (SRS) or a demodulation reference signal (DMRS) transmitted from the uplink beam to the downlink beam.

3. The user equipment of claim 1, wherein to transmit the beam failure indication, the one or more processors are configured to cause the user equipment to transmit the beam failure indication to the network entity via the uplink channel of an uplink beam in response to the user equipment being able to communicate with the network entity via the uplink beam, and wherein the beam failure indication indicates a failure for all active beams of the user equipment.

4. The user equipment of claim 1, wherein to transmit the beam failure indication, the one or more processors are configured to cause the user equipment to transmit the beam failure indication to the network entity via the uplink channel of an uplink beam in response to the user equipment being able to communicate with the network entity via the uplink beam, and wherein the beam failure indication indicates a failure for at least one active beam of the user equipment.

5. The user equipment of claim 1, wherein to transmit the beam failure indication, the one or more processors are configured to cause the user equipment to transmit the beam failure indication to the network entity via the uplink channel of an uplink beam in response to the user equipment being able to communicate with the network entity via the uplink beam, and wherein the beam failure indication comprises an identifier of at least one failed beam.

6. The user equipment of claim 1, wherein to transmit the beam failure indication, the one or more processors are configured to cause the user equipment to transmit the beam failure indication to the network entity via the uplink channel of an uplink beam in response to the user equipment being able to communicate with the network entity via the uplink beam.

7. The user equipment of claim 1, wherein to transmit the beam failure indication, the one or more processors are configured to cause the user equipment to transmit the beam failure indication to the network entity via the random access channel (RACH) message in response to the user equipment not being able to communicate with the network entity via the uplink beam or in response to the beam failure being due to downlink quality degradation.

8. A user equipment, comprising: one or more processors communicatively coupled to memory, the one or more processors configured to cause the user equipment to:

receive an uplink transmission transmitted by the user equipment;

generate a beam failure indication based on a determination that a beam failure associated with full-duplex communication has occurred as a result of interference from the uplink transmission; and transmit the beam failure indication to network entity via a random access channel (RACH) message in response to the user equipment not being able to communicate with the network entity via an uplink beam or in response to the beam failure being due to downlink quality degradation, wherein the one or more processors are further configured to cause the user equipment to:

identify an uplink and downlink beam pair to recover the full-duplex communication after a random access channel (RACH) procedure for beam failure recovery, wherein the RACH procedure is a four-step RACH procedure or a two-step RACH procedure;

transmit a first RACH preamble;

transmit a second RACH preamble that is a repetition of the first RACH preamble;

receive the first RACH preamble via a first receive beam of the user equipment;

receive the second RACH preamble via a second receive beam of the user equipment;

select the first receive beam or the second receive beam to pair with an identified beam to form the uplink and downlink beam pair; and determine whether the first receive beam or the second receive beam is associated with a lower cross-beam self-interference by the user equipment.

9. A user equipment, comprising: one or more processors communicatively coupled to memory, the one or more processors configured to cause the user equipment to:

receive an uplink transmission transmitted by the user equipment;

generate a beam failure indication based on a determination that a beam failure associated with full-duplex communication has occurred as a result of interference from the uplink transmission; and transmit the beam failure indication to network entity via a random access channel (RACH) message in response to the user equipment not being able to communicate with the network entity via an uplink beam or in response to the beam failure being due to downlink quality degradation, wherein the one or more processors are further configured to cause the user equipment to:

identify a first uplink and downlink beam pair that has a lowest cross-beam reference signal received power of a plurality of candidate uplink and downlink beam pairs;

transmit an indication of the first uplink and downlink beam pair to the network entity; and
transmit the indication of the first uplink and downlink beam pair via a Msg3 in a four-step RACH procedure, a payload of a MsgA in a two-step RACH procedure, or uplink signaling,
wherein the indication of the first uplink and downlink beam pair comprises synchronization signaling block identifiers for the first uplink and downlink beam pair.

10. A method at a user equipment, the method comprising:
receiving an uplink transmission transmitted by the user equipment; and
generating a beam failure indication based on a determination that a beam failure associated with full-duplex communication has occurred as a result of interference from the uplink transmission, and
(i) wherein the method further comprises:
transmitting the beam failure indication to a network entity via (1) an uplink channel of an uplink beam in response to the user equipment being able to communicate with the network entity via the uplink beam or (2) a random access channel (RACH) message in response to the user equipment not being able to communicate with the network entity via the uplink beam or in response to the beam failure being due to downlink quality degradation;
using the first antenna panel to transmit the uplink beam; and
using the second antenna panel to receive a downlink beam,
wherein the interference from the uplink transmission comprises self-interference by the user equipment measured via the second antenna panel from an interference measurement resource (IMR) configured in a radio resource control (RRC) radio link monitoring reference signal (RLM-RS) configuration for beam failure detection; or
(ii) wherein the method further comprises:
transmitting via the transceiver the beam failure indication to network entity via the random access channel (RACH) message in response to the user equipment not being able to communicate with the network entity via the uplink beam or in response to the beam failure being due to downlink quality degradation,
identifying an uplink and downlink beam pair to recover the full-duplex communication after a random access channel (RACH) procedure for beam failure recovery, wherein the RACH procedure is a four-step RACH procedure or a two-step RACH procedure;
transmitting a first RACH preamble;
transmitting a second RACH preamble that is a repetition of the first RACH preamble;
receiving the first RACH preamble via a first receive beam of the user equipment;
receiving the second RACH preamble via a second receive beam of the user equipment;
selecting the first receive beam or the second receive beam to pair with an identified beam to form the uplink and downlink beam pair; and
determining whether the first receive beam or the second receive beam is associated with a lower cross-beam self-interference by the user equipment; or (iii) wherein the method further comprises:
transmitting via the transceiver the beam failure indication to network entity via the random access channel (RACH) message in response to the user equipment not being able to communicate with the network entity via an uplink beam or in response to the beam failure being due to downlink quality degradation;
identifying the first uplink and downlink beam pair that has a lowest cross-beam reference signal received power of a plurality of candidate uplink and downlink beam pairs;
transmitting an indication of the first uplink and downlink beam pair to the network entity; and
transmitting the indication of the first uplink and downlink beam pair via a Msg3 in a RACH procedure with four steps, a payload of a MsgA in a RACH procedure with two steps, or uplink signaling,
wherein the indication of the first uplink and downlink beam pair comprises synchronization signaling block identifiers for the first uplink and downlink beam pair.

11. The method of claim 10, wherein the method comprises:
transmitting the beam failure indication to the network entity via (1) the uplink channel of the uplink beam in response to the user equipment being able to communicate with the network entity via the uplink beam or (2) the random access channel (RACH) message in response to the user equipment not being able to communicate with the network entity via the uplink beam or in response to the beam failure being due to downlink quality degradation;
using the first antenna panel to transmit the uplink beam; and
using the second antenna panel to receive the downlink beam,
wherein the interference from the uplink transmission comprises self-interference by the user equipment measured via the second antenna panel from an interference measurement resource (IMR) configured in the radio resource control (RRC) radio link monitoring reference signal (RLM-RS) configuration for beam failure detection.

12. The method of claim 10, wherein the method comprises:
transmitting via the transceiver the beam failure indication to network entity via the random access channel (RACH) message in response to the user equipment not being able to communicate with the network entity via the uplink beam or in response to the beam failure being due to downlink quality degradation;
identifying the uplink and downlink beam pair to recover the full-duplex communication after the random access channel (RACH) procedure for beam failure recovery, wherein the RACH procedure is the four-step RACH procedure or the two-step RACH procedure;
transmitting the first RACH preamble;
transmitting the second RACH preamble that is the repetition of the first RACH preamble;
receiving the first RACH preamble via the first receive beam of the user equipment;
receiving the second RACH preamble via the second receive beam of the user equipment;
selecting the first receive beam or the second receive beam to pair with an identified beam to form the uplink and downlink beam pair; and determining whether the first receive beam or the second receive beam is associated with the lower cross-beam self-interference by the user equipment.

13. The method of claim 10, wherein the method comprises:
   transmitting via the transceiver the beam failure indication to network entity via the random access channel (RACH) message in response to the user equipment not being able to communicate with the network entity via an uplink beam or in response to the beam failure being due to downlink quality degradation;
   identifying the first uplink and downlink beam pair that has the lowest cross-beam reference signal received power of the plurality of candidate uplink and downlink beam pairs;
   transmitting the indication of the first uplink and downlink beam pair to the network entity; and
   transmitting the indication of the first uplink and downlink beam pair via the Msg3 in the RACH procedure with four steps, the payload of the MsgA in the RACH procedure with two steps, or uplink signaling,
   wherein the indication of the first uplink and downlink beam pair comprises synchronization signaling block identifiers for the first uplink and downlink beam pair.

14. The method of claim 11, wherein transmitting the beam failure indication comprises transmitting the beam failure indication to the network entity via the uplink channel of an uplink beam in response to the user equipment being able to communicate with the network entity via the uplink beam, and wherein the IMR carries a sounding reference signal (SRS) or a demodulation reference signal (DMRS) transmitted from the uplink beam to the downlink beam.

15. The method of claim 11, wherein transmitting the beam failure indication comprises transmitting the beam failure indication to the network entity via the uplink channel of an uplink beam in response to the user equipment being able to communicate with the network entity via the uplink beam, and wherein the beam failure indication indicates a failure for all active beams of the user equipment.

16. The method of claim 11, wherein transmitting the beam failure indication comprises transmitting the beam failure indication to the network entity via the uplink channel of an uplink beam in response to the user equipment being able to communicate with the network entity via the uplink beam, and wherein the beam failure indication indicates a failure for at least one active beam of the user equipment.

17. The method of claim 11, wherein transmitting the beam failure indication comprises transmitting the beam failure indication to the network entity via the uplink channel of an uplink beam in response to the user equipment being able to communicate with the network entity via the uplink beam, and wherein the beam failure indication comprises an identifier of at least one failed beam.

18. The method of claim 11, wherein transmitting the beam failure indication comprises transmitting the beam failure indication to the network entity via the uplink channel of an uplink beam in response to the user equipment being able to communicate with the network entity via the uplink beam.

19. The method of claim 11, wherein transmitting the beam failure indication comprises transmitting the beam failure indication to the network entity via the random access channel (RACH) message in response to the user equipment not being able to communicate with the network entity via the uplink beam or in response to the beam failure being due to downlink quality degradation.

\* \* \* \* \*